(12) United States Patent
Cherian et al.

(10) Patent No.: US 11,139,929 B2
(45) Date of Patent: Oct. 5, 2021

(54) ENHANCED RELIABILITY TECHNIQUES FOR SHARED SPECTRUM

(71) Applicant: QUALCOMM Incorporated, San Diego, CA (US)

(72) Inventors: George Cherian, San Diego, CA (US); Alfred Asterjadhi, San Diego, CA (US); Abhishek Pramod Patil, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

(21) Appl. No.: 16/506,941

(22) Filed: Jul. 9, 2019

(65) Prior Publication Data

US 2020/0021400 A1 Jan. 16, 2020

Related U.S. Application Data

(60) Provisional application No. 62/696,737, filed on Jul. 11, 2018.

(51) Int. Cl.
*H04L 1/18* (2006.01)
*H04L 5/00* (2006.01)
*H04L 12/24* (2006.01)
*H04L 1/16* (2006.01)

(52) U.S. Cl.
CPC ............ *H04L 1/189* (2013.01); *H04L 1/1685* (2013.01); *H04L 1/1887* (2013.01); *H04L 5/0055* (2013.01); *H04L 41/0893* (2013.01)

(58) Field of Classification Search
CPC ..... H04L 1/189; H04L 1/1685; H04L 1/1887; H04L 5/0055; H04L 41/0893
See application file for complete search history.

(56) References Cited

U.S. PATENT DOCUMENTS

| | | | |
|---|---|---|---|
| 6,665,332 B1* | 12/2003 | Carlson | G01S 11/02 |
| 2003/0198179 A1* | 10/2003 | Koo | H04J 11/00 |
| 2003/0203735 A1* | 10/2003 | Andrus | H04Q 7/20 |
| 2004/0037261 A1 | 2/2004 | Suzuki | |
| 2007/0270146 A1* | 11/2007 | Suzuki | H04Q 7/20 |
| 2009/0010198 A1* | 1/2009 | Boarin | H04Q 7/00 |
| 2009/0082072 A1* | 3/2009 | Ulupinar | H04B 1/38 |
| 2009/0196254 A1* | 8/2009 | Cha | H04W 36/30 |
| 2010/0322144 A1* | 12/2010 | Lee | H04J 3/08 |
| 2011/0242977 A1* | 10/2011 | Tooyama | H04W 28/12 |
| 2015/0365972 A1* | 12/2015 | Seok | H04W 74/0816 |

(Continued)

*Primary Examiner* — Ronald B Abelson
(74) *Attorney, Agent, or Firm* — Holland & Hart LLP

(57) ABSTRACT

Methods, systems, and devices for wireless communications are described. An access point (AP) and a station (STA) may identify an identifier for a shared block acknowledgment (ACK) session between the AP and the STA. The AP and the STA may further identify a set of member APs also for the shared block ACK session. For example, the STA may transmit a probe signal to discover the APs with which to associate. Additionally or alternatively, an AP may broadcast a probe signal to discover the STA. In one example transmission scheme, after associating, a primary AP may transmit a set of protocol data units (PDUs) to the APs, to which the AP may reply with a block ACK. The block ACK may indicate one or more PDUs that were not successfully received. One or more secondary APs may retransmit the PDUs determined to be missing.

30 Claims, 28 Drawing Sheets

(56) References Cited

U.S. PATENT DOCUMENTS

2016/0219475 A1* 7/2016 Kim .................. H04W 36/04
2017/0311169 A1* 10/2017 Cai .................. H04W 16/14
2019/0110212 A1* 4/2019 Tang ................. H04W 24/02
2019/0115972 A1* 4/2019 Braun ................ H04B 7/15

* cited by examiner

ENHANCED RELIABILITY TECHNIQUES FOR SHARED SPECTRUM

CROSS REFERENCES

The present Application for Patent claims benefit of U.S. Patent Application No. 62/696,737 by Cherian et al., entitled "ENHANCED RELIABILITY TECHNIQUES FOR SHARED SPECTRUM," filed Jul. 11, 2018, and expressly incorporated by reference herein.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network, may include an access point (AP) that may communicate with one or more stations (STAs) or mobile devices. The AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink and uplink communications. The downlink (or forward link) may refer to the communication link from the AP to the STA, and the uplink (or reverse link) may refer to the communication link from the STA to the AP.

Some wireless communications system deployments may operate in conditions with fast-moving and rapidly changing sources of interference and blockage. In these situations, multi-link aggregation may be utilized, where transmissions may be communicated in parallel over two or more links between two wireless devices (e.g., AP and STA) during a communications session. In some cases, transmission reliability may be increased through the use of retransmissions. Some retransmission schemes, however, may increase the latency, potentially beyond the latency standards for the system to function efficiently.

SUMMARY

The described techniques relate to improved methods, systems, devices, or apparatuses that support enhanced reliability techniques for shared spectrum in a wireless communications system. Some wireless communications systems may include a station (STA), one or more access points (APs), and a controller.

According to some aspects, an AP and a STA may utilize an identifier (e.g., a group identifier (ID)) for a shared block acknowledgment (ACK) session between the AP and the STA. The AP and the STA may identify a set of member APs for the shared block ACK session. For example, the STA may transmit a probe signal to discover the APs with which to associate. Additionally or alternatively, an AP may broadcast a probe signal to discover the STA. In one example transmission scheme, after association, a primary AP may transmit a set of protocol data units (PDUs) to the APs (e.g., the set of member APs), to which the AP may reply with a block ACK. The block ACK may indicate one or more PDUs that the STA did not successfully receive. One or more secondary APs may retransmit to the STA the PDUs determined to be missing using, for example, a different channel, which may provide channel and spatial diversity.

A method of wireless communications at an AP is described. The method may include identifying an ID associated with a shared block ACK session for one or more STAs, identifying a set of member APs of a wireless communications system for the shared block ACK session, and indicating, to a STA via a shared radio frequency spectrum band, the ID and the set of member APs associated with the ID.

An apparatus for wireless communications is described. The apparatus may include a first interface, a second interface, and a wireless modem configured to identify an ID associated with a shared block ACK session for one or more STAs, identify a set of member APs of a wireless communications system for the shared block ACK session, and indicate, to a STA via a shared radio frequency spectrum band, the ID and the set of member APs associated with the ID (e.g., by outputting the ID over the second interface).

Another apparatus for wireless communications at an AP is described. The apparatus may include a processor, memory in electronic communication with the processor, and instructions stored in the memory. The instructions may be executable by the processor to cause the apparatus to identify an ID associated with a shared block ACK session for one or more STAs, identify a set of member APs of a wireless communications system for the shared block ACK session, and indicate, to a STA via a shared radio frequency spectrum band, the ID and the set of member APs associated with the ID.

Another apparatus for wireless communications at an AP is described. The apparatus may include means for identifying an ID associated with a shared block ACK session for one or more STAs, identifying a set of member APs of a wireless communications system for the shared block ACK session, and indicating, to a STA via a shared radio frequency spectrum band, the ID and the set of member APs associated with the ID.

A non-transitory computer-readable medium storing code for wireless communications at an AP is described. The code may include instructions executable by a processor to identify an ID associated with a shared block ACK session for one or more STAs, identify a set of member APs of a wireless communications system for the shared block ACK session, and indicate, to a STA via a shared radio frequency spectrum band, the ID and the set of member APs associated with the ID.

In some examples of the method, apparatuses, and non-transitory computer-readable medium described herein, indicating the ID and the set of member APs may include operations, features, means, or instructions for transmitting a beacon including an information element that indicates the ID and the set of member APs. In some examples of the method, apparatuses, and non-transitory computer-readable medium described herein, transmitting the beacon may include operations, features, means, or instructions for broadcasting the beacon via a discovery reference signal (DRS). In some examples of the method, apparatuses, and non-transitory computer-readable medium described herein, the information element includes a neighbor report element that carries the ID and the set of member APs, where the neighbor report element may be associated with each of the set of member APs.

Some examples of the method, apparatuses, and non-transitory computer-readable medium described herein may further include operations, features, means, or instructions for receiving, from the STA, a probe signal for discovery of one or more APs associated with the shared block ACK session. Some examples of the method, apparatuses, and non-transitory computer-readable medium described herein may further include operations, features, means, or instructions for transmitting, to a wireless controller of the wireless communications system in communication with the set of member APs, an indication of the probe signal, receiving, from the wireless controller, a response message indicating that the AP may be a member of the set of member APs and transmitting, to the STA, an association response message in response to the probe signal based on the response message received from the wireless controller.

Some examples of the method, apparatuses, and non-transitory computer-readable medium described herein may further include operations, features, means, or instructions for receiving, from a wireless controller of the wireless communications system in communication with the set of member APs, an indication that the AP may be a primary AP for the STA and transmitting, to the STA, the indication that the AP may be the primary AP for the STA. In some examples of the method, apparatuses, and non-transitory computer-readable medium described herein, the indication that the AP may be the primary AP may be transmitted via a public action frame (PAF). Some examples of the method, apparatuses, and non-transitory computer-readable medium described herein may further include operations, features, means, or instructions for receiving, from the wireless controller, a change message indicating that the primary AP may have changed from the AP to a second AP and transmitting, to the STA, an indication that the second AP may be the primary AP for the STA.

Some examples of the method, apparatuses, and non-transitory computer-readable medium described herein may further include operations, features, means, or instructions for configuring the STA for an uplink shared block ACK session or a downlink shared block ACK session based on indicating the ID and the set of member APs. In some examples of the method, apparatuses, and non-transitory computer-readable medium described herein, configuring the STA for the uplink shared block ACK session may include operations, features, means, or instructions for associating the uplink shared block ACK session with multiple receiver addresses (RAs) corresponding to the set of member APs, a transmitter address (TA) associated with the STA, and a transmission ID (TID) associated with an uplink packet. In some examples of the method, apparatuses, and non-transitory computer-readable medium described herein, each RA of the multiple RAs corresponds to a medium access control (MAC) address or a basic service set ID (BSSID) of a member AP of the set of member APs. In some examples of the method, apparatuses, and non-transitory computer-readable medium described herein, each RA of the multiple RAs corresponds to a group address associated with the set of member APs or a MAC address of a wireless controller of the wireless communications system in communication with the set of member APs.

In some examples of the method, apparatuses, and non-transitory computer-readable medium described herein, configuring the STA for the downlink shared block ACK session may include operations, features, means, or instructions for associating the downlink shared block ACK session with an RA associated with the STA, multiple TAs corresponding to the set of member APs, and a TID associated with an downlink packet. In some examples of the method, apparatuses, and non-transitory computer-readable medium described herein, each TA of the multiple TAs corresponds to a MAC address or a BSSID of a member AP of the set of member APs. In some examples of the method, apparatuses, and non-transitory computer-readable medium described herein, each TA of the multiple TAs corresponds to a group address associated with the set of member APs or a MAC address of a wireless controller of the wireless communications system in communication with the set of member APs.

In some examples of the method, apparatuses, and non-transitory computer-readable medium described herein, configuring the STA for the uplink shared block ACK session or the downlink shared block ACK session may include operations, features, means, or instructions for associating the uplink shared block ACK session or the downlink shared block ACK session with a virtual BSSID that corresponds to the set of member APs, where each AP of the set of member APs may be associated with a respective BSSID. In some examples of the method, apparatuses, and non-transitory computer-readable medium described herein, the virtual BSSID may be associated with a master AP of the set of member APs.

Some examples of the method, apparatuses, and non-transitory computer-readable medium described herein may further include operations, features, means, or instructions for receiving, from a wireless controller of the wireless communications system in communication with the set of member APs, a set of PDUs for transmission to the STA, transmitting the set of PDUs to the STA based on a sequence number associated with the AP and monitoring for a feedback message from the STA based on the transmitting. In some examples of the method, apparatuses, and non-transitory computer-readable medium described herein, the set of PDUs may be associated with a retransmission of a data packet to the STA. Some examples of the method, apparatuses, and non-transitory computer-readable medium described herein may further include operations, features, means, or instructions for modifying a block ACK window position or duration based on the monitoring.

Some examples of the method, apparatuses, and non-transitory computer-readable medium described herein may further include operations, features, means, or instructions for receiving, from the wireless controller, the sequence number associated with the AP. In some examples of the method, apparatuses, and non-transitory computer-readable medium described herein, monitoring for the feedback message may include operations, features, means, or instructions for receiving a block ACK feedback message from the STA indicating that at least a portion of the set of PDUs may have been successfully received. Some examples of the method, apparatuses, and non-transitory computer-readable medium described herein may further include operations, features, means, or instructions for transmitting, to the STA, a block ACK request (BAR) message, where the block ACK feedback message may be received in response to the BAR message.

Some examples of the method, apparatuses, and non-transitory computer-readable medium described herein may further include operations, features, means, or instructions for scheduling an uplink transmission for the STA via resources of the shared radio frequency spectrum band, monitoring the resources for the uplink transmission from the STA and determining whether to transmit a feedback message to the STA based on the monitoring. Some examples of the method, apparatuses, and non-transitory computer-readable medium described herein may further include operations, features, means, or instructions for transmitting a block ACK feedback message based on receiving the uplink transmission from the STA, where the block ACK feedback message indicates that at least a portion of the uplink transmission may have been received. Some examples of the method, apparatuses, and non-transitory computer-readable medium described herein may further include operations, features, means, or instructions for receiving, from the STA, a BAR message, where the block ACK feedback message may be transmitted in response to the BAR message.

Some examples of the method, apparatuses, and non-transitory computer-readable medium described herein may further include operations, features, means, or instructions for receiving, from the STA, a block ACK trigger frame, where the block ACK feedback message may be transmitted in response to the block ACK trigger frame. Some examples of the method, apparatuses, and non-transitory computer-readable medium described herein may further include operations, features, means, or instructions for receiving, from a second AP of the set of member APs, a set of PDUs received by the second AP and transmitting a block ACK feedback message based on the set of PDUs received by the second AP.

In some examples, the apparatus may be configured as the STA and may include a receiver configured to receive information obtained over the first interface, and a transmitter configured to transmit information outputted over the second interface.

A method of wireless communications at a STA is described. The method may include identifying an ID associated with a shared block ACK session for the STA, determining a set of member APs of a wireless communications system for the shared block ACK session, associating with the set of member APs for participating in the shared block ACK session, and communicating with an AP of the set of member APs in accordance with the shared block ACK session.

An apparatus for wireless communications is described. The apparatus may include a first interface, a second interface, and a wireless modem configured to identify an ID associated with a shared block ACK session for the STA, determine a set of member APs of a wireless communications system for the shared block ACK session, associate with the set of member APs for participating in the shared block ACK session, and communicate with an AP of the set of member APs in accordance with the shared block ACK session, the communicating including obtaining information over the first interface or outputting information over the second interface.

Another apparatus for wireless communications at a STA is described. The apparatus may include a processor, memory in electronic communication with the processor, and instructions stored in the memory. The instructions may be executable by the processor to cause the apparatus to identify an ID associated with a shared block ACK session for the STA, determine a set of member APs of a wireless communications system for the shared block ACK session, associate with the set of member APs for participating in the shared block ACK session, and communicate with an AP of the set of member APs in accordance with the shared block ACK session.

Another apparatus for wireless communications at a STA is described. The apparatus may include means for identifying an ID associated with a shared block ACK session for the STA, determining a set of member APs of a wireless communications system for the shared block ACK session, associating with the set of member APs for participating in the shared block ACK session, and communicating with an AP of the set of member APs in accordance with the shared block ACK session.

A non-transitory computer-readable medium storing code for wireless communications at a STA is described. The code may include instructions executable by a processor to identify an ID associated with a shared block ACK session for the STA, determine a set of member APs of a wireless communications system for the shared block ACK session, associate with the set of member APs for participating in the shared block ACK session, and communicate with an AP of the set of member APs in accordance with the shared block ACK session.

Some examples of the method, apparatuses, and non-transitory computer-readable medium described herein may further include operations, features, means, or instructions for receiving, from at least one AP of the set of member APs, a beacon including an information element that indicates the ID and the set of member APs. In some examples of the method, apparatuses, and non-transitory computer-readable medium described herein, the beacon may be a broadcast DRS. In some examples of the method, apparatuses, and non-transitory computer-readable medium described herein, the information element includes a neighbor report element that carries the ID and the set of member APs, where the neighbor report element may be associated with each of the set of member APs.

Some examples of the method, apparatuses, and non-transitory computer-readable medium described herein may further include operations, features, means, or instructions for transmitting a probe signal for discovery of one or more APs associated with the shared block ACK session and receiving an association response message in response to the probe signal, where the association message indicates the ID or the set of member APs. Some examples of the method, apparatuses, and non-transitory computer-readable medium described herein may further include operations, features, means, or instructions for receiving, from the AP, an indication that the AP may be the primary AP for the STA, where the indication that the AP may be the primary AP may be received via a PAF. Some examples of the method, apparatuses, and non-transitory computer-readable medium described herein may further include operations, features, means, or instructions for receiving a change message indicating that the primary AP for the STA may have changed from the AP to a second AP.

Some examples of the method, apparatuses, and non-transitory computer-readable medium described herein may further include operations, features, means, or instructions for monitoring resources for reception of a downlink transmission and determining whether to transmit a feedback message based on the monitoring. Some examples of the method, apparatuses, and non-transitory computer-readable medium described herein may further include operations, features, means, or instructions for receiving, from the AP, a set of PDUs of the downlink transmission based on a sequence number associated with the AP and transmitting a block ACK feedback message based on the set of PDUs. Some examples of the method, apparatuses, and non-transitory computer-readable medium described herein may further include operations, features, means, or instructions for receiving, from a second AP of the set of member APs, a second set of PDUs of the downlink transmission based on a sequence number associated with the second AP.

In some examples of the method, apparatuses, and non-transitory computer-readable medium described herein, transmitting the block ACK feedback message may include operations, features, means, or instructions for transmitting a combined block ACK feedback message based on the set of PDUs and the second set of PDUs. Some examples of the method, apparatuses, and non-transitory computer-readable medium described herein may further include operations, features, means, or instructions for transmitting a second block ACK feedback message based on the set of PDUs, where the second block ACK feedback message may be transmitted to the second AP. In some examples of the method, apparatuses, and non-transitory computer-readable medium described herein, the second set of PDUs may be associated with a retransmission of at least a portion of the downlink transmission.

In some examples of the method, apparatuses, and non-transitory computer-readable medium described herein, receiving the set of PDUs of the downlink transmission may include operations, features, means, or instructions for receiving multiple downlink packets from respective APs of the set of member APs, where the block ACK feedback message may be transmitted based on the multiple downlink packets. Some examples of the method, apparatuses, and non-transitory computer-readable medium described herein may further include operations, features, means, or instructions for decoding the multiple downlink packets from the respective APs and dropping duplicate packets based on the decoding.

Some examples of the method, apparatuses, and non-transitory computer-readable medium described herein may further include operations, features, means, or instructions for receiving a BAR message from at least one AP of the set of member APs, where the block ACK feedback message may be transmitted in response to the BAR message. Some examples of the method, apparatuses, and non-transitory computer-readable medium described herein may further include operations, features, means, or instructions for receiving a block ACK trigger frame from at least one AP of the set of member APs, where the block ACK feedback message may be transmitted in response to the block ACK trigger frame.

Some examples of the method, apparatuses, and non-transitory computer-readable medium described herein may further include operations, features, means, or instructions for identifying resources for transmission of an uplink data packet and transmitting the uplink data packet via the resources. In some examples of the method, apparatuses, and non-transitory computer-readable medium described herein, identifying the resources for transmission of the uplink data packet may include operations, features, means, or instructions for receiving a scheduling message that allocates the resources for transmission of the uplink data packet to the STA.

Some examples of the method, apparatuses, and non-transitory computer-readable medium described herein may further include operations, features, means, or instructions for transmitting the uplink data packet on a same channel to each member AP of the set of member APs. Some examples of the method, apparatuses, and non-transitory computer-readable medium described herein may further include operations, features, means, or instructions for receiving, from a first member AP, a block ACK feedback message indicating that at least a portion of the uplink data packet may have been received.

Some examples of the method, apparatuses, and non-transitory computer-readable medium described herein may further include operations, features, means, or instructions for determining that a complete uplink data packet may have not been successfully received, transmitting a BAR message to at least a second member AP of the set of member APs and receiving a second block ACK feedback message from the second member AP based on the BAR message, where the second block ACK feedback message indicates that a second portion of the uplink data packet may have been received. Some examples of the method, apparatuses, and non-transitory computer-readable medium described herein may further include operations, features, means, or instructions for determining that the complete uplink data packet may have been successfully received based on the first and second block ACK feedback messages.

Some examples of the method, apparatuses, and non-transitory computer-readable medium described herein may further include operations, features, means, or instructions for transmitting an uplink trigger frame to each of the member APs and receiving, from each of the member APs, a respective block ACK feedback message in response to the uplink trigger frame, where each block ACK feedback message indicates whether a portion of the uplink data packet may have been successfully received by a respective member AP.

Some examples of the method, apparatuses, and non-transitory computer-readable medium described herein may further include operations, features, means, or instructions for receiving a set of block ACK feedback messages from the set of member APs and determining whether the uplink data packet may have been successfully received based on a combination of the set of block ACK feedback messages.

A method of wireless communications is described. The method may include identifying an ID associated with a shared block ACK session for a STA in a wireless communications system, determining a set of member APs of the wireless communications system for the shared block ACK session, and transmitting an indication of a primary AP of the set of member APs to the primary AP.

An apparatus for wireless communications is described. The apparatus may include a first interface, a second interface, and a wireless modem configured to identify an ID associated with a shared block ACK session for a STA in a wireless communications system, determine a set of member APs of the wireless communications system for the shared block ACK session, and transmit an indication of a primary AP of the set of member APs to the primary AP (e.g., by outputting the indication over the second interface).

Another apparatus for wireless communications is described. The apparatus may include a processor, memory in electronic communication with the processor, and instructions stored in the memory. The instructions may be executable by the processor to cause the apparatus to identify an ID associated with a shared block ACK session for a STA in a wireless communications system, determine a set of member APs of the wireless communications system for the shared block ACK session, and transmit an indication of a primary AP of the set of member APs to the primary AP.

Another apparatus for wireless communications is described. The apparatus may include means for identifying an ID associated with a shared block ACK session for a STA in a wireless communications system, determining a set of member APs of the wireless communications system for the shared block ACK session, and transmitting an indication of a primary AP of the set of member APs to the primary AP.

A non-transitory computer-readable medium storing code for wireless communications is described. The code may include instructions executable by a processor to identify an ID associated with a shared block ACK session for a STA in a wireless communications system, determine a set of member APs of the wireless communications system for the shared block ACK session, and transmit an indication of a primary AP of the set of member APs to the primary AP.

Some examples of the method, apparatuses, and non-transitory computer-readable medium described herein may further include operations, features, means, or instructions for transmitting respective sequence numbers to each of the set of member APs via an upper layer communication link, where the respective sequence numbers may be used for communications via respective physical layer communication links with the STA. Some examples of the method, apparatuses, and non-transitory computer-readable medium described herein may further include operations, features, means, or instructions for determining a change in channel conditions for the STA, assigning a second AP of the set of member APs as the primary AP for the STA and transmitting an indication of the change of the primary AP to at least one AP of the set of member APs or the STA.

Some examples of the method, apparatuses, and non-transitory computer-readable medium described herein may further include operations, features, means, or instructions for receiving, from the primary AP, a block ACK feedback message indicating that at least a portion of a downlink transmission to the STA was not successfully received and transmitting, to a secondary AP of the set of member APs, an indication to retransmit the portion of the downlink transmission to the STA. In some examples of the method, apparatuses, and non-transitory computer-readable medium described herein, the indication to retransmit may be via a channel different from the primary AP. Some examples of the method, apparatuses, and non-transitory computer-readable medium described herein may further include operations, features, means, or instructions for receiving multiple block ACK feedback messages from multiple APs of the set of member APs and determining whether a downlink transmission for the STA was successfully received based on a combination of the multiple block ACK feedback messages.

Some examples of the method, apparatuses, and non-transitory computer-readable medium described herein may further include operations, features, means, or instructions for determining a retransmission scheme for a downlink transmission to the STA and indicating the retransmission scheme to each of the set of member APs. In some examples of the method, apparatuses, and non-transitory computer-readable medium described herein, the retransmission scheme indicates a simultaneous retransmission for multiple APs of the set of member APs. In some examples of the method, apparatuses, and non-transitory computer-readable medium described herein, the retransmission scheme indicates a sequential retransmission for multiple APs of the set of member APs.

DETAILED DESCRIPTION

Figure 1:
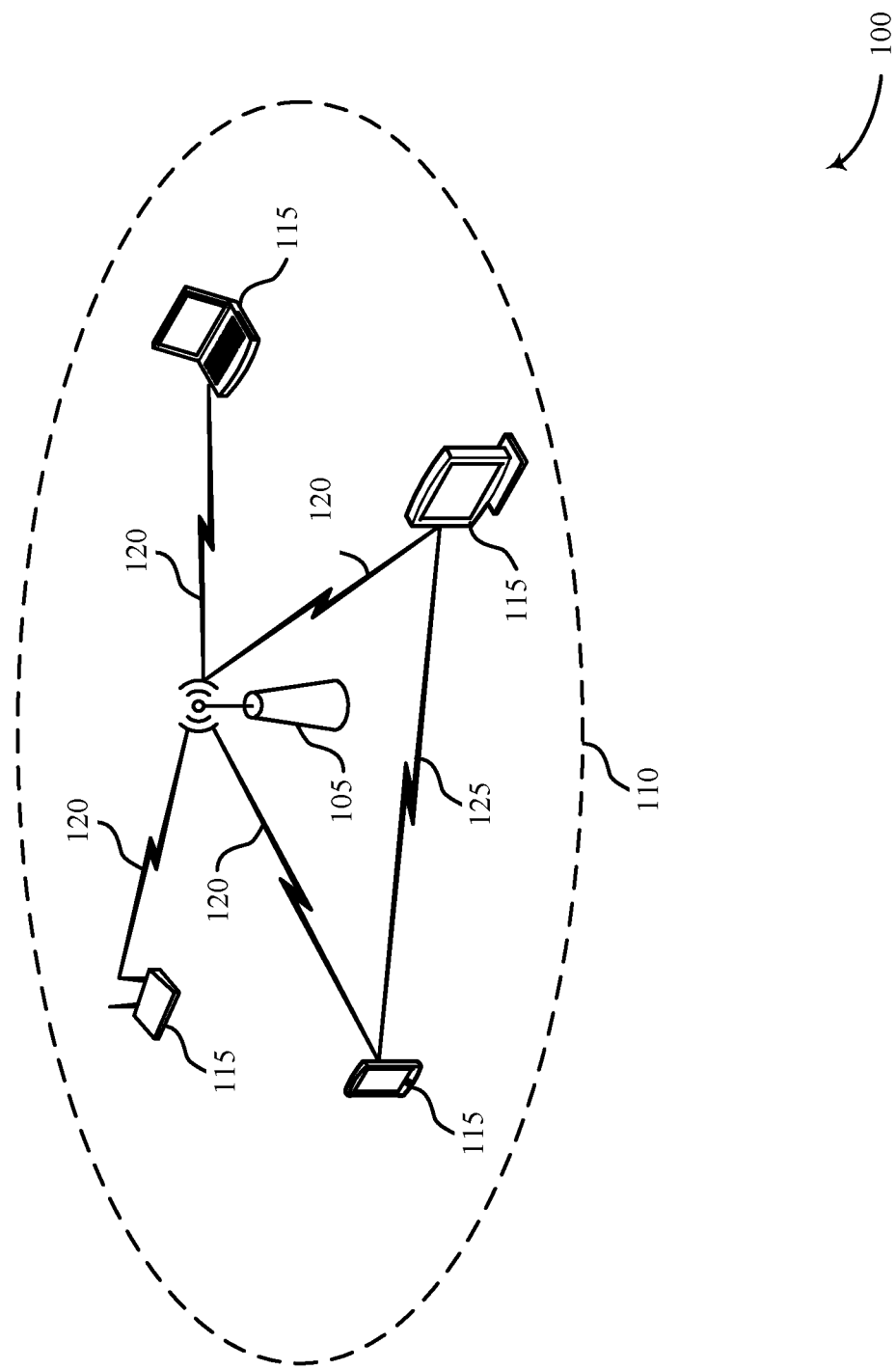
FIG. 1 illustrates a wireless local area network (WLAN) configured to support enhanced reliability techniques for shared spectrum in accordance with aspects of the present disclosure.

The following description relates generally to a wireless local area network (WLAN) (e.g., Wi-Fi), but it should be appreciated that the described techniques may be similarly applied to a variety of radio access technologies (RATs) in a variety of deployments. Some wireless communications system deployments may operate in conditions with fast-moving and rapidly changing sources of interference and blockage. For example, in an Industrial Internet of things (IIoT) network, robotic arms, automatic guided vehicles (AGVs), cranes, conveyer belts, etc., may move in and out of established communication links to the various devices in the wireless communications system. This may lead to, for example, link blockage such that the devices may not be able to fully rely on a single communication link, or reflection (e.g., off of objects), which may cause rapidly varying interference with communications.

In some such deployments, transmission reliability may be increased through the use of retransmissions. Some wireless communications systems, for example, IIoT applications, may desire high reliability as well as low latency. Some retransmission schemes, however, may increase the latency, potentially beyond the latency criteria for the system to function (a system may set criteria such as a failure rate of 10' to 10', with a latency in the tens of milliseconds (ms)).

Further, short-distance or faster retransmissions may also fail in some applications. For example, a robot arm may move resulting in a block of a communication link and may remain in that location such that a retransmission on the same communication link would not be effective. The described techniques provide solutions to these link blockage and interference scenarios through the use of particular medium access control (MAC) layer signaling techniques and physical (PHY) layer signaling.

Some wireless communications systems may support multiple, parallel wireless links between communicating devices to increase throughput, to improve link efficiency, to reduce latency, etc. A wireless link may refer to a communication path between devices, and each wireless link may support one or more channels (e.g., logical entities) that support multiplexing of data, such that during at least some duration of time, transmissions or portions of transmissions may occur at the same time, either synchronously or asynchronously, over multiple wireless links. The wireless links may be in the same or different radio frequency (RF) spectrum bands. Each link of a multi-link session may be associated with respective physical components (e.g., antennas, amplifiers (e.g., power amplifiers and low noise amplifiers), etc.) or logical processing components (e.g., PHY layers, MAC layers, etc.) of a given wireless device, and these components may be configured to support multi-link communications.

Techniques are provided for discovering a set of access points (APs) and a corresponding station (STA), and associating the STA with the set of APs. In some cases, an AP may broadcast a beacon including information indicating a set of APs to which the broadcasting AP belongs. Additionally or alternatively, the AP may not actively advertise group information, in which case the STA may transmit a probe signal to discover one or more neighboring APs with which the STA may associate. The STA and the APs may then use this information to associate with each other and establish respective communication links between the STA and each of the APs of the set of APs. After the STA associates with the APs, a controller or the STA 115 may designate one or more of the APs of the set of APs as a primary AP, which may, for example, be the first AP with which the STA attempts to communicate before communicating with other APs.

Techniques are provided for multi-link transmission schemes. A first multi-link transmission scheme may include using a shared block acknowledgment (ACK) session across multiple APs. Each AP may operate as if in an independent basic service sets (BSSs), and perform link-specific actions for each independent BSS. In a shared block ACK session, the controller (or, in other cases, the STA) may maintain a single block ACK space for every AP participating in the shared block ACK session. That is, the controller may maintain a unified scoreboard and sequence space. Accordingly, MAC packet data units (MPDUs) may be scheduled dynamically on a per-protocol data unit (PDU) basis for each communication link. Thus, for example, for downlink transmissions, when the controller or the STA determines that an MPDU originally transmitted from a primary AP was not correctly received, the controller or the STA may signal to secondary APs to retransmit the MPDU that was not correctly received. This may be analogously applied to uplink transmissions, as described herein. As such, a given MPDU may be retransmitted on a different link from that on which it was originally transmitted.

In a second multi-link transmission scheme, each of the APs of the set of APs may use the same channel for uplink transmissions. Each AP of the group of APs may monitor the same channel or channels for uplink data from the STA. After associating with the APs, the STA may transmit a data packet (e.g., an aggregated MPDU (AMPDU)) on a channel to each of the APs. A first AP of the set of APs may receive the data packet, and in response transmit a block ACK to the STA 115. The STA may use the block ACK to determine whether each of the MPDUs of the AMPDU were indicated to have been successfully received according to the block ACK. If the STA determines that one or more individual ACKs for one or more MPDUs are missing in the block ACK, the STA may request further ACKs or retransmission from the other APs in the set of APs.

A third multi-link transmission scheme may include encoding data for multi-link transmissions. In this case, the STA or the APs may use a forward encoding mechanism, for example, a fountain code (e.g., raptor codes), to encode communicated data. In this way, if a sufficient number of segments are successfully received, the data may be reconstructed irrespective of an order in which the segments are received. The encoded segments may then be transmitted from multiple APs of the set of APs to the STA, or vice versa.

Particular aspects of the subject matter described herein may be implemented to realize one or more advantages. The described techniques may support improvements in channel and spatial diversity for communications between the STA and the APs, which pay provide relatively increased reliability, resource utilization, and power savings, among other advantages. As such, supported techniques may include improved network operations and, in some examples, may promote network efficiencies, among other benefits.

Aspects of the disclosure are initially described in the context of a WLAN. Aspects of the disclosure are then described with reference to a wireless communications system, transmission timelines, and a process flow. Aspects of the disclosure are further illustrated by and described with reference to apparatus diagrams, system diagrams, and flowcharts that relate to enhanced reliability techniques for shared spectrum.

FIG. 1 illustrates a WLAN 100 (also known as a Wi-Fi network) configured to support enhanced reliability techniques for shared spectrum in accordance with aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a BSS or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system that may allow multiple APs 105 to be connected in an ESS. In some cases, WLAN 100 may support second multi-link transmission techniques for parallel transmissions and retransmissions between a STA 115 and associated APs 105.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct communication links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from Institute of Electrical and Electronics Engineers (IEEE) 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., carrier-sense multiple access with collision avoidance (CSMA/CA)) because the STAs 115 may not refrain from transmitting on top of each other. A STA 115 whose transmissions are not identifiable, but that is within the same coverage area 110 may be known as a hidden node. CSMA/CA may be supplemented by the exchange of a ready-to-send (RTS) packet transmitted by a sending STA 115 (or AP 105) and a clear-to-send (CTS) packet transmitted by the receiving STA 115 (or AP 105). This may alert other devices within range of the sender and receiver not to transmit for the duration of the primary transmission. Thus, RTS/CTS may help mitigate a hidden node problem.

In a system supporting multi-link aggregation (which may also be referred to as multi-channel aggregation), some of the traffic associated with a single STA 115 may be transmitted across multiple, parallel communication links 120 (which may also be referred to as "links" or "wireless links" herein). Multi-link aggregation may thus provide a means to increase network capacity and maximize the utilization of available resources. In some cases, each communication link 120 for a given wireless device may be associated with a respective radio of the wireless device (e.g., where a radio includes transmit/receive chains, physical antennas, signal processing components, etc.).

Multi-link aggregation may be implemented in a number of ways. As a first example, the multi-link aggregation may be referred to as packet-based. In packet-based aggregation, frames of a single traffic flow (e.g., all traffic associated with a given transmission ID (TID) may be sent concurrently across multiple communication links 120 (e.g., on multiple channels). In some cases, the multiple communication links 120 may operate in the same RF spectrum band (e.g., each link may be in the 5 GHz band, and use channels in the 5 GHz band). In other cases, the multiple communication links 120 may be in different RF spectrum bands (e.g., one may be in the 2.4 GHz band while another is in the 5 GHz band). Each link may be associated with a different PHY and lower MAC layer, which may perform link-specific operations such as CSMA/CA. In such an implementation, management of the aggregation of the separate communication links 120 may be performed at a higher MAC layer. The multi-link aggregation implemented at the lower MAC layers and PHY layers may be transparent to the upper layers of the wireless device. Packet-based aggregation may in some cases provide improved user-perceived throughput (UPT) and sum throughput (e.g., for a single traffic flow or multiple traffic flows) relative to other aggregation architectures and non-aggregated communications.

As another example, the multi-link aggregation may be referred to as flow-based. In flow-based aggregation, each traffic flow (e.g., all traffic associated with a given TID) may be sent using one of multiple available communication links 120. As an example, a single STA 115 may access a web browser while streaming a video in parallel. The traffic associated with the web browser access may be communicated over a first channel of a first communication link 120 while the traffic associated with the video stream may be communicated over a second channel of a second communication link 120 in parallel (e.g., at least some of the data may be transmitted on the first channel concurrent with data transmitted on the second channel). In some examples, the transmissions on the first communication link 120 and the second communication link 120 may be synchronized. In other examples, the transmissions may be asynchronous. As described herein, the channels may belong to the same RF band or to different RF bands. In the case of three communication links 120 (or other number of communication links greater than two), all three communication links 120 may support operation over the same RF band. In other cases, two communication links 120, but not the third, may support operation over the same RF band. Or, in still other cases each of the three communication links 120 may support operation for a separate RF band. In some cases, flow-based aggregation may not use cross-link packet scheduling and reordering (e.g., which may be used to support packet-based aggregation). Alternatively, in the case of a single flow (e.g., in the case that the STA 115 simply attempts to access a web browser), aggregation gain may not be available. Each link may be associated with a different PHY and lower MAC layer, which may perform link-specific operations such as CSMA/CA. Traffic flows may be mapped to communication links 120 by a higher MAC layer, as described further below.

In other examples, a hybrid of flow-based and packet-based aggregation may be employed. As an example, a device may employ flow-based aggregation in situations in which multiple traffic flows are created and may employ packet-based aggregation in other situations. The decision to switch between multi-link aggregation techniques (e.g., modes) may additionally or alternatively be based on other metrics (e.g., a time of day, traffic load within the network, battery power for a wireless device, etc.). It is to be understood that while aspects of the preceding are described in the context of a multi-link session involving two (or more) communication links 120, the described concepts may be extended to a multi-link session involving multiple direct wireless links 125.

To support the described multi-link aggregation techniques, APs 105 and STAs 115 may exchange supported aggregation capability information (e.g., supported aggregation type, supported frequency bands, etc.). In some cases, the exchange of information may occur via data, control, or management frames. In some examples, the data, control, or management frames may be a beacon signal, a probe request and response, an association request and response, dedicated action frames, an operating mode indicator (OMI), etc. In other examples, other types of data, control, or management frames may be used. In some cases, an AP 105 may designate a given channel in a given band as an anchor link (e.g., the wireless link on which it transmits beacons and other control or management frames), which may also be referred to as an anchor channel. In this case, the AP 105 may transmit beacons (e.g., which may contain less information) on other channels or links for discovery purposes. Although described as being frequency-based, the anchor link could additionally or alternatively refer to a point in time (e.g., an AP 105 may transmit its beacon at a given time on one or more links).

In some examples, in multi-link aggregation, each link may use its own transmit queue. In other examples, a common transmit queue may be used. In some examples, each link may have a unique transmitter address (TA) and receiver address (RA). In other examples, the TA and RA may be common across the multiple links used for multi-link aggregation. In some cases, one or more of a sequence number, frame number (FN), or packet number (PN) may be common across the communication links. Other items that may be common across links include encryption keys, MPDU generation or encryption, aggregated MAC service data unit (AMSDU) constraints, fragment size, reordering, replay check, or de-fragmentation techniques. In other examples, encryption keys may be per-link.

In various examples, block ACKs may be sent in response to multi-link transmissions. A block ACK may refer to an ACK for multiple MPDUs sent together (e.g., an ACK for a block of MPDUs). Both the transmitting device (e.g., the device requesting the block ACK) and the receiving device (e.g., the device transmitting the block ACK) may maintain a sliding block ACK window, and may have negotiated the size of the block ACK. For example, a block ACK session may have a block ACK size of 64 MPDUs (e.g., other block ACK size examples may include 256 MPDUs, 1024 MPDUs, etc.). In such cases, a transmitting device may transmit 64 MPDUs followed by a block ACK request (BAR). In response to the BAR, the receiving device may, upon reception of the 64 MPDUs and the BAR, transmit a block ACK to the transmitting device. The block ACK may indicate whether all 64 MPDUs were received correctly, which MPDUs are missing, etc. In some cases, a block ACK may be used to indicate a longer block ACK window. In some cases, a block ACK may also indicate a capability exchange or agreement defining the larger block ACK window. In other examples, a single sequence number may be used, but with multiple scorecards (e.g., one per channel or link), or with a global scorecard as well as per-link scorecards. Multi-link aggregation (e.g., flow-based or packet-based) may increase network capacity by efficiently allocating utilization of multiple links (and multiple channels).

Figure 2:
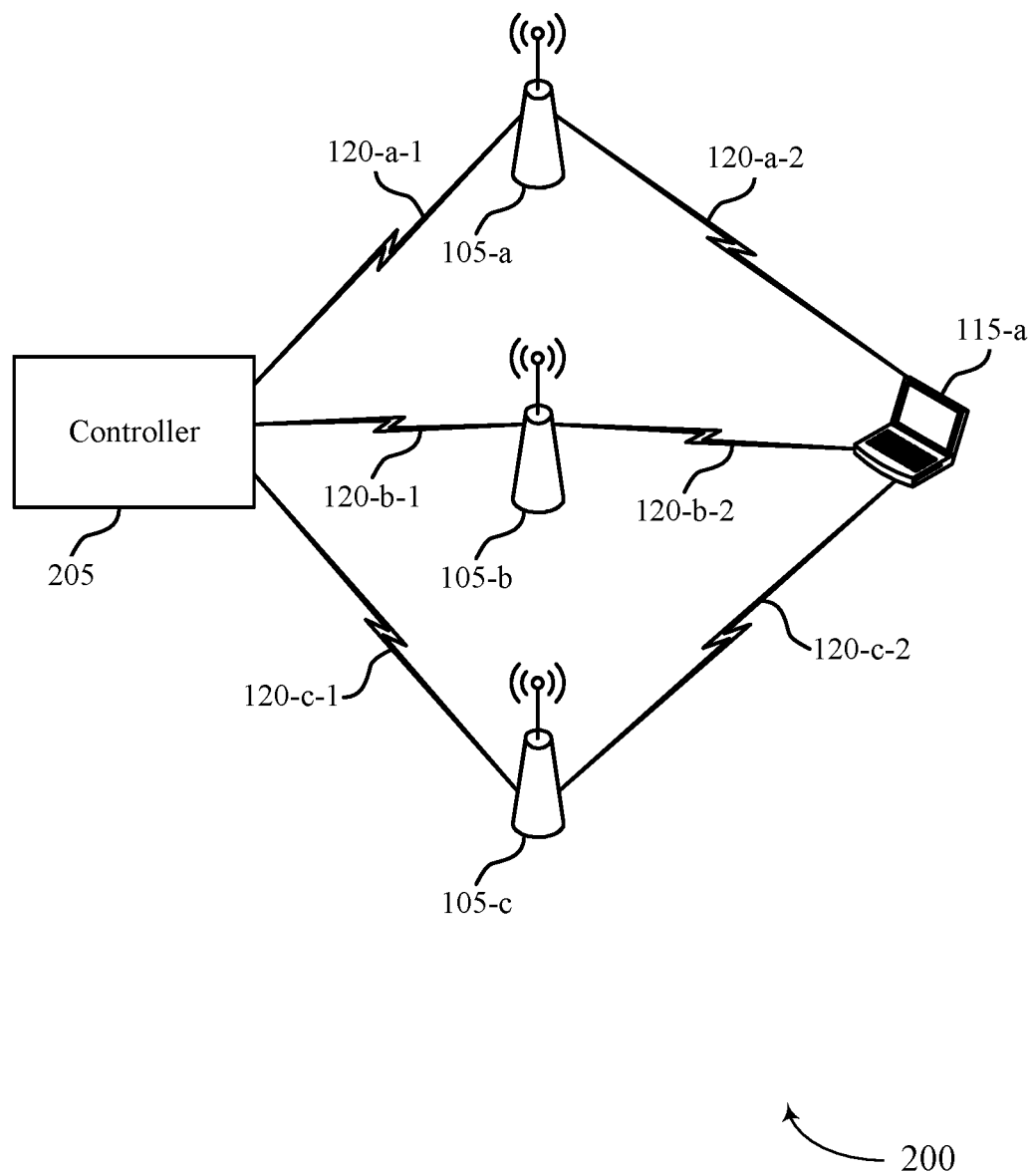
FIG. 2 illustrates an example of a wireless communications system that supports enhanced reliability techniques for shared spectrum in accordance with aspects of the present disclosure.

FIG. 2 illustrates an example of a wireless communications system 200 that supports enhanced reliability techniques for shared spectrum in accordance with aspects of the present disclosure. The wireless communications system 200 illustrates of an example of wireless communications between a controller 205 and each of a first AP 105-*a*, a second AP 105-*b*, and a third AP 105-*c*. The wireless communications system 200 also illustrates an example of wireless communications between a STA 115-*a* and each of the first AP 105-*a*, the second AP 105-*b*, and the third AP 105-*c*. In some cases, the first AP 105-*a*, the second AP 105-*b*, the third AP 105-*c*, and the STA 115-*a* may be examples of the APs 105 and the STAs 115 as described with reference to FIG. 1. The STA 115-*a* and the controller 205 may communicate with the APs 105 over respective communication links 120. The controller 205 may be implemented as a standalone device, as shown in FIG. 2, but may also be integrated into one of the APs 105, as part of a network gateway (not shown) that may interface with another computer network (e.g., the Internet), or another wireless device. The communication links 120 may be examples of the communication links 120 as described with reference to FIG. 1.

As shown in FIG. 2, the wireless communications system 200 may support multi-link aggregation such that the STA 115-*a* may communicate in parallel with multiple APs 105 over two or more communication links 120 (e.g., over two or more of communication link 120-*a*-2, communication link 120-*b*-2, or communication link 120-*c*-2). STA 115-*a* may transmit and receive packets (e.g., MPDUs) with an AP 105 (e.g., AP 105-*a*, AP 105-*b*, or AP 105-*c*) over each of communication link 120-*a*-2, communication link 120-*b*-2, or communication link 120-*c*-2, in some cases simultaneously or concurrently. Such communications over communication links 120 may be synchronized (e.g., simultaneous) or unsynchronized (e.g., asynchronous), and may be uplink, or downlink, or a combination of uplink and downlink during a particular duration of time.

In some cases, parallel transmissions between the STA 115-*a* and each of the APs 105 may be simultaneous or concurrent. These simultaneous transmissions may further use different radio frequency bandwidths (i.e., multi-band transmissions). That is, the STA 115-*a* may be capable of multi-band and simultaneous transmissions to different ones of the APs 105 and maintaining independent associations with each of the APs 105. Such multi-band transmission techniques may provide channel diversity between the transmissions to the different APs 105. Channel diversity may provide benefits, for example, when managing fluctuations in channel interference. Further, transmissions to different APs 105, which may be located in different physical locations (e.g., APs 105 that are not co-located with each other), may provide spatial diversity. Spatial diversity may provide performance improvements, for example, in the case of fluctuations in blockage (e.g., physical blockage) of the communication links 120.

In some cases, an upper layer sequence number may be included in these parallel transmissions. Including the upper layer sequence number may avoid potential duplication between the parallel transmissions to and from the different APs 105. In some cases, the STA 115-*a* and each AP 105 may manage a sequence number (e.g., an upper layer sequence number, or a Wi-Fi sequence number) associated with the respective AP 105. For example, each AP 105 may be associated with a unique sequence number to identify communications on the respective communication links 120. In some cases, a gateway may indicate the sequence number to each of the APs 105 or the controller 205, where the gateway may manage each of the sequence numbers for each of the APs 105, and correspondingly detect duplicate transmissions. For example, if the gateway detects the same information in transmissions associated with different sequence numbers, the gateway may determine that some of the information may be duplicate information. According to this scheme, each data packet may be transmitted on multiple communication links 120 (i.e., duplicated across each of the communication links 120). This scheme may also use additional overheard to include the sequence numbers in each data packet. Techniques described herein may, in some cases, improve resource utilization by mitigating some of the duplicate transmission or reducing the overhead used in signaling sequence numbers.

Techniques are provided for discovery of a set of APs 105 (e.g., the AP 105-*a*, the AP 105-*b*, and the AP 105-*c*) and a corresponding STA 115 (e.g., the STA 115-*a*), and correspondingly associating the STA 115-*a* with the set of APs 105. The described techniques may be used in conjunctions with the multi-link transmission schemes further as described herein. In some cases, an AP 105 may broadcast a beacon including information indicating a set of APs 105 to which the broadcasting AP 105 belongs. In addition to other information, the beacon may include an information element that indicates a list of member APs 105 (i.e., a list of APs 105 that are members of the group of APs 105 to which the broadcasting AP 105 belongs); or an ID for the AP 105, such as a group ID, a MAC address of the AP 105, a virtual MAC address of the AP 105 (e.g., shared with one or more of the other member APs 105), or an association ID (e.g., identifying an association for uplink or downlink communications for the AP 105, which may be uniquely shared between one or more of the member APs 105).

Additionally or alternatively, the beacon may include one or more neighbor report elements, where the neighbor report elements may indicate neighboring APs 105 that are members of the group of APs 105 of broadcasting AP 105. In some cases, such a neighbor report element may be extended to carry a group ID or other information relevant to the group of APs 105. The STA 115-*a* may scan for such beacon signals, and upon receiving one or more beacon signals from one or more APs 105, the STA 115-*a* may determine whether to associated with one or more of the respective APs 105 (e.g., based on signal strength and other connection characteristics). The STA 115-*a* may then associate with the one or more APs 105 for which it has determined to associate. In the case that the STA 115-*a* receives multiple association response messages, the STA 115-*a* may set or be configured with an upper bound on an number of APs 105 with which the STA 115-*a* may associate.

In some cases, the AP 105 may not actively advertise group information, for example, by broadcasting a beacon. Thus, in addition to, or alternatively to, an AP 105 broadcasting the beacon, the STA 115-*a* may transmit a probe signal to discover one or more neighboring APs 105 with which the STA 115-*a* may associate. An AP 105 that receives the probe signal may transmit an indication of the probe signal to the controller 205 to determine whether the AP 105 is to associate with the STA 115-*a* (e.g., based on signal strength and other connection characteristics). If the controller 205 determines that the AP 105 is to associate with the STA 115-*a*, the AP 105 may transmit an association response message back to the STA 115-*a*. The STA 115-*a* may then associate with the APs 105 from which the STA 115-*a* has received an association response message. In the case that the STA 115-*a* receives multiple association response messages, the STA 115-*a* may set or be configured with an upper bound on an number of APs 105 with which the STA 115-*a* may associate.

After the STA 115-*a* associates with multiple APs 105, the controller 205 or the STA 115-*a* may determine and designate one or more of the APs 105 of the set of APs 105 as a primary AP 105. The controller 205 or the STA 115-*a* may determine the primary AP 105 based on, for example, a signal strength, a number of other devices (e.g., other STAs 115 or other APs 105) with which the AP 105 is associated, and other connection characteristics. In some cases, the controller 205 may have additional information related to the overall wireless communications system 200, so may make the determination or override a conflicting determination made at the STA 115-*a*. The STA 115-*a* may signal to the APs 105 and the controller 205, or the controller 205 may signal to the APs 105 and the STA 115-*a*, an indication of the AP 105 determined to be the primary AP 105. The indication may be signaled, for example, duration an association frame exchange or after associating via a public action frame (PAF). In some cases, the STA 115-*a* or the controller 205 may determine a new primary AP 105 after having selected an original primary AP 105, for example, due to changes in network conditions and the like. An indication of the new primary AP 105 may similarly be signaled, for example, in a further PAF. In some cases, the remaining APs 105 in the set of APs 105 may be designated as secondary APs 105 or tertiary APs 105. Similar determination and designation techniques may be performed to designate some of the APs as secondary APs 105 (e.g., the non-primary APs 105 that have a signal quality above a given threshold), and the remainder of the APs 105 in the set of APs 105 may be designated as tertiary APs 105.

A first multi-link transmission scheme may include using a shared block ACK session across multiple of the APs 105. The STA 115-*a* may share the sequence number with one or more of the APs 105 (for example, the STA 115-*a* may use single link sequence number for a shared block ACK session with each of the AP 105-*a*, the AP 105-*b*, and the AP 105-*c*). In this scheme, each of the APs 105 may, or may not, occupy different channels. For example, if the STA 115-*a* supports multi-band simultaneous transmission scheme, each of the APs 105 may occupy different channels or different non-overlapping bandwidths.

The shared block ACK session scheme may, in some situations, provide advantages versus some other multi-link transmission schemes. For example, the shared block ACK session scheme may have a relatively greater synchronization tolerance between different APs 105, and may be readily adaptable for single or multi-band deployments as well as other types of deployments (e.g., Coordinated Multipoint (CoMP) deployments). Further, the shared block ACK session scheme may provide reliability improvements both in terms of interference as well as in terms of link blockage. In some cases, however, some applications (e.g., some uplink-only applications) may have relatively more stringent latency standards (e.g., less than 1 ms) that may be shorter than a potential retransmission delay.

As described herein, a block ACK session may be associated and identified by one or more unique IDs. For example, the block ACK session may be identified by one or more of a TA, a RA, or a TID. To share the block ACK session between one or more the APs 105, one or more of these IDs may be shared between the different APs 105 for the respective communication links 120, while one or more of the other IDs may vary. For example, for uplink transmissions, the TA and TID may be shared across each of the APs 105, but different RAs may be used for different APs 105. In this case, the different RAs may correspond to a MAC address or a BSS ID (BSSID) of the respective APs 105. In the downlink direction, for example, the RA and TID may be shared across each of the APs 105, but different TAs may be used for different APs 105, where the different TAs may correspond to the MAC address or the BSSID of the respective APs 105. Additionally or alternatively, a virtual BSSID may be shared among each of the APs 105. The virtual BSSID may be the ID of the cluster of APs 105, or a master AP of a set of APs (i.e., of the AP 105-*a*, the AP 105-*b*, and the AP 105-*c*), to be used for the block ACK session. In some cases, over-the-air processing may share an actual (e.g., defined) BSSID (e.g., instead of a virtual BSSID).

Each AP 105 may operate as if part of an independent BSS, and perform link-specific actions for each independent BSS. In a shared block ACK session, the controller 205 (or, in other cases, the STA 115-*a*) may maintain a single block ACK space for every AP 105 participating in the shared block ACK session. That is, the controller 205 may maintain a unified scoreboard and sequence space. Accordingly, MPDUs may be scheduled dynamically on a per PDU (or per physical PDU (PPDU)) basis for each communication link 120. As such, a given MPDU may be retransmitted on a different link from that on which it was originally transmitted).

In some cases (e.g., for single link operation), one communication link 120 may be associated with a unique TA, RA, or TID. For ACK procedures in such cases, a TA, RA, and TID tuple (e.g., <TA, RA, TID>) may correspond to a block ACK agreement on a particular communication link 120, and the block ACK agreement may be set up or established on a per TID basis. For example, an add block ACK (ADDBA) frame may be per <RA, TA> and per TID (e.g., per access category). In the case of multi-link operation, however, the ADDblock ACK mechanism may be modified. For example, for uplink communication, the block ACK tuple <TA, RA, TID> may be modified according to [RA*, TA, TID], where RA* is a MAC or BSSID of each member AP 105, a special group address, or a MAC address of the controller 205. For example, for uplink communication, the block ACK tuple <TA, RA, TID> may be modified according to [RA, TA*, TID], where TA* is a MAC or BSSID of each member AP 105, a special group address, or the MAC address of the controller 205. When, for example, RA* or TA* is set according to the MAC or BSSID of each member AP 105, the block ACK session may be set such that the different RA or TA values map to the same scoreboard and sequence space.

In the shared block ACK session scheme, one AP 105 of the set of APs 105 may be assigned as the primary AP 105 for the STA 115-*a*, for example, according to the techniques described herein. The remaining APs 105 of the set of APs 105 may be designated as either secondary APs 105 or tertiary APs 105. For downlink, the STA 115-*a* may first attempt to receive packets from the primary AP 105. If the STA 115-*a* successfully receives the packet, the STA 115-*a* may transmit a feedback message (e.g., a block ACK message) acknowledging that the packet was received. Each of the APs 105 may forward to the controller 205 block ACKs received or generated by the APs 105. The controller 205 may compile block ACKs received from the APs 105 to maintain a unified scoreboard and sequence space in a single block ACK space, and may thus be aware of more information than the individual APs 105. In this way, if the primary AP 105 does not receive the block ACK (in some cases, in addition to the other APs 105), the controller 205 may identify that while the primary AP 105 transmitted data packets to the STA 115-*a*, none of the APs 105 received a block ACK that would indicate that the data packets were received correctly. Alternatively, the APs 105 may forward a block ACK indicating that a portion of the transmitted data packet was received correctly (e.g., a portion of the MPDUs of an AMPDU). The controller 205 may accordingly determine a retransmission scheme for the data packets. For example, the controller 205 may signal to the secondary APs 105 to retransmit the data packet to the STA 115-*a*. In some cases, in addition to the secondary APs 105 retransmitting the data packet, the controller 205 may also signal to the primary AP 105 to retransmit the data packet.

In some cases, one or more APs 105 may be designated as tertiary STAs 115-*a*, which may provide a further iteration of retransmitting the data packet if the transmitted data packets are not received correctly after the primary and the secondary APs 105 have attempted to retransmit the packet. For example, if the primary AP 105 and the secondary APs do not receive the block ACK (or receive block ACKs indicating that a portion of the data packet was not received correctly), the controller 205 may identify that while the primary AP 105 and the secondary AP 105 transmitted data packets to the STA 115-*a*, the STA 115-*a* may still not have correctly received some or all of the data packet. In this case, the controller 205 may determine a further retransmission scheme for the data packets. For example, the controller 205 may signal to the tertiary APs 105 to retransmit the data packet to the STA 115-*a*. In some cases, in addition to the tertiary APs 105, the controller 205 may also signal to the primary AP 105 or the secondary APs 105 to retransmit the data packet to the STA 115-*a*.

As in these situations, more than one AP 105 may retransmit the same packet, the STA 115-*a* may detect and drop any duplicate packets that the STA 115-*a* receives. The STA 115-*a* may report the combined scoreboard in a block ACK based on all of the packets received from the different APs 105. If a same AMPDU is transmitted from multiple APs 105 (due to, e.g., short-range interference conditions), the STA 115-*a* may receive and reconcile the different sets of MPDUs of the AMPDU. In some cases, the primary AP 105 may determine and signal to the STA 115-*a* to modify the block ACK window position or duration based on the block ACK reports received from the STA 115-*a*. In some cases, one or more of the APs 105 may transmit a BAR to the STA 115-*a* to prompt a feedback message, which the AP 105 may then forward to the controller 205. The STA 115-*a* may reply to the BAR by transmitting the block ACK message to the APs 105, as described herein.

For uplink, the STA 115-*a* may first attempt to transmit packets to the primary AP 105. If the primary AP 105 successfully receives the packet, the AP 105 may transmit to STA 115-*a* a feedback message (e.g., a block ACK message) acknowledging that the packet was received. If the STA 115-*a* does not receive the block ACK message, the STA 115-*a* may retransmit to the secondary APs 105. In some cases, in addition to retransmitting to the secondary APs 105, the STA 115-*a* may attempt to retransmit to the primary AP 105 again. The primary AP 105 may detect duplicate information after retransmission. As described herein, some APs 105 may be designated as tertiary STAs 115-*a*, which may provide further iteration if packets are not transmitted correctly after attempting retransmission to the secondary APs 105 (and the retransmission to the tertiary APs 105 may include further retransmissions to the primary and secondary APs 105). The STA 115-*a* may generate a combined scoreboard based on scoreboards reported from each of the APs 105 in their respective block ACKs, and based on the combined scoreboard the STA 115-*a* may determine whether to perform further retransmissions. In some cases, the STA 115-*a* may transmit a BAR to one or more of the APs 105 to prompt a feedback message. The APs 105 that receive the BAR may reply by transmitting the block ACK message to the STA 115-*a*, as described herein.

According to some aspects, each AP 105 of the set of APs 105 may operate an independent BSS and perform link-specific procedures (i.e., the AP 105 adapt its particular link specifically to its BSS). As described herein, for example, during association, the controller 205 may assign a sequence of APs 105 (e.g., primary APs 105, secondary APs 105, then tertiary APs 105) for uplink and downlink transmission from and to the STA 115-*a*. In some cases, the controller 205 may configure multiple APs 105 to be each of the secondary APs 105 or the tertiary APs 105. Based on this sequence, the primary AP 105 may configure its corresponding communication link 120 as a primary communication link 120. Accordingly, uplink and downlink transmissions may first be attempted on the primary communication link 120. In some cases, the APs 105 may exchange capability information either directly or through the controller 205. Based on this capability information, the APs 105 may determine to alter the retransmission scheme (e.g., by determining some APs 105 to be secondary APs 105 and others to be tertiary APs 105).

A second multi-link transmission scheme addresses uplink data transmissions that may relatively lower latency standards. In the second multi-link transmission scheme, each of the APs 105 of the set of APs 105 may use the same channel for uplink transmissions. The set of APs 105 and corresponding associated STAs 115 may be referred to as a cluster. As shown in FIG. 2, the cluster is made up of at least the group of APs 105 including the AP 105-a, the AP 105-b, and the AP 105-c, as well as the STA 115-a. Each AP 105 of the group of APs 105 may monitor the same channel or channels for uplink data from the STA 115-a. This scheme may mitigate both interference and link-blockage issues. For example, because each of the APs 105 in the group of APs 105 may be in geographically different locations (e.g., the APs not being co-located), a single source would be unlikely to interfere with transmissions to each of the APs 105, and similarly would be unlikely to block each of the respective communication links 120. In this way, a single channel may be used for all transmissions, and may provide for relatively fewer retransmissions than some other schemes, as multiple differently located APs 105 are monitoring for uplink transmissions.

According to the second scheme, the STA 115-a may associate with each of the AP 105-a, the AP 105-b, and the AP 105-c for a BS session. For uplink transmissions, the block ACK session may be associated with and identified by, for example, multiple RAs, a TA, and a TID, where the RAs may be the BSSIDs of the different APs 105. Alternatively, the session may be identified by virtual BSSIDs. Additionally or alternatively, a virtual BSSID may be shared among each of the APs 105. As described herein, the virtual BSSID may be the ID of the cluster of APs 105, or a master AP of a set of APs (i.e., of the AP 105-a, the AP 105-b, and the AP 105-c), to be used for the block ACK session. In some cases, over-the-air processing may share a real BSSID (e.g., instead of a virtual BSSID).

After associating with the APs 105, the STA 115-a may transmit a data packet (e.g., an AMPDU) on a channel to each of the APs 105. A first AP 105 of the set of APs 105 may receive the data packet, and in response transmit a block ACK to the STA 115-a. The STA 115-a may use the block ACK to determine whether each of the MPDUs of the AMPDU were indicated to have been successfully received according to the block ACK. If the STA 115-a determines that one or more individual ACKs for one or more MPDUs are missing in the block ACK, the STA 115-a may transmit a BAR to the remaining APs 105.

In some cases, the STA may further transmit an uplink trigger frame (e.g., a multi-user (MU) BAR (MU-BAR) trigger frame) to each of the APs 105 in the set of APs 105. In response to the MU-BAR trigger frame, each of the APs 105 may respond with a block ACK. In some cases, the STA 115-a may combine an uplink trigger frame with the data packet transmission. When the uplink trigger frame is combined with the data packet transmission, each of the APs 105 may respond to the data packet transmission with a block ACK, for example after a short interframe spacing (SIFS) for the APs 105 to process the received data packet transmission and respond with the block ACK.

The STA 115-a may combine the block ACK score reports received from each of the APs 105. In some cases, the STA 115-a may use this combined block ACK scoreboard to determine a window advancement to modify the block ACK window position.

In some cases, wireless communications system 200 may not include the controller 205. In these cases, a primary receiver and originator (e.g., for uplink, one of the APs 105 and the STA 115 may be the primary receiver and originator, respectively) may maintain the block ACK scoreboard for the block ACK session. Other receivers not maintaining the block ACK scoreboard may act on a per-PPDU basis. The primary receiver may update the block ACK scoreboard for the block ACK session independently of the TA at which the primary receiver received the MPDU of the corresponding sequence number. The secondary receivers may forward the received MPDUs to the primary receiver, for example, via a second connection (e.g., via Ethernet or a second radio frequency band different from the radio frequency band on which the MPDUs are communicated). The originator may request a block ACK from each of the receivers (e.g., via a trigger frame included in an AMPDU transmission). Based on the received block ACKs, the originator may determine which MPDUs were received successfully and which were not. For an MPDU that was successfully received by at least one receiver, the originator may update the block ACK scoreboard for that corresponding sequence number. The scoreboard may be maintained by, for example, using an OR operation, per sequence number, between the bits of the bitmap received in different block ACKs. Alternatively, for an MPDUs that were not successfully received by at least one receiver, then the originator may retransmit the MPDU with PHY parameters determined based on, for example, a received channel quality indicator (CQI) from each of the APs 105 (e.g., based on CQI feedback within the received block ACKs). Additionally or alternatively, each of the APs 105 may directly indicate to the STA 115-a the PHY parameters to be used for retransmission from which the STA 115-a may select one set to be used (i.e., the set of PHY parameters the STA 115-a may determine to be suitable for retransmission).

A third multi-link transmission scheme may include encoding data for multi-link transmissions. In this scheme, the STA 115-a may associate with one or more of the APs 105 of the set of APs 105 as similarly described herein. The STA 115-a may maintain the associations with each of the APs 105 on different channels or radio frequency bandwidths. In some cases, the STA 115-a may be associated with one or more APs 105 using multiple interfaces, where each interface using different channels or radio frequency bandwidths. In this case, the STA 115-a or the APs 105 may use a forward encoding mechanism, such as a fountain code (raptor codes, etc.), to encode communicated data. For example, N frames may be encoded to K segments such that the original data may be reconstructed as long as M segments are received. In this way, if a sufficient number of segments (e.g., a threshold number of segments) are successfully received, the data may be reconstructed irrespective of an order in which the segments are received. The encoded segments may be transmitted from multiple APs 105 of the set of APs 105 to the STA 115-a, thus maintaining both channel and spatial diversity. In some cases, each segment may include a sequence number to identify potential duplicates of the same segment (e.g., in the case of retransmission, or duplicate transmissions from different APs 105).

The STA 115-a may then reconstruct the original data if the STA 115-a correctly receives a sufficient number of the transmitted segments. The STA 115-a may then determine a block ACK based on a number of received segments (rather than, e.g., a sequence in which the segments were received), and transmit the block ACK to the one or more APs 105. Based on the received block ACK, one or more of the APs 105 may retransmit respective subsets of the segments such that the STA 115-a may reconstruct the original data stream. While described herein with respect to downlink transmissions, this scheme may be similarly used for uplink transmissions. For instance, after associating, the STA 115-a may encode and transmit multiple segments of data to multiple APs 105, similarly maintaining channel and spatial diversity for uplink transmissions.

In this multi-link transmission scheme, the communication links 120 operating on different channels provides channel diversity, such that interference on one channel may not affect the performance of other channels. Further, a lower number of retransmissions due to the forward encoding mechanism may meet stricter latency standards of the system as compared to techniques that employ a higher number of retransmissions. As described herein, the parallel multi-link transmission scheme with spatial diversity of the APs 105 may mitigate both potential interference and potential link-blockage.

Figure 3:
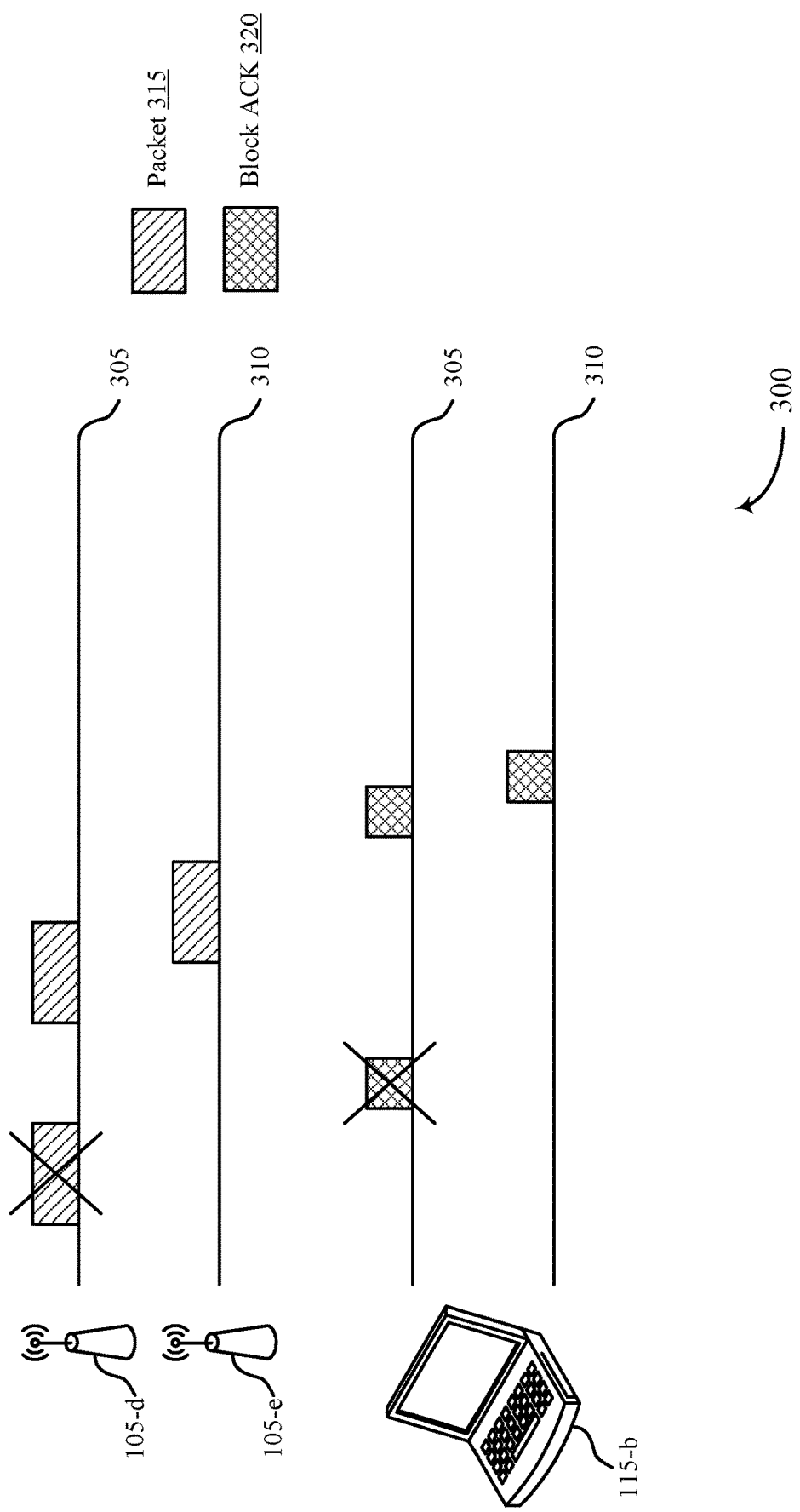
FIGS. 3 to 7 illustrate examples of transmission timelines that support enhanced reliability techniques for shared spectrum in accordance with aspects of the present disclosure.

FIG. 3 illustrates an example of a transmission timeline 300 that supports enhanced reliability techniques for shared spectrum in accordance with aspects of the present disclosure. In some examples, the transmission timeline 300 may implement aspects of the WLAN 100 or the wireless communications system 200 as described with reference to FIGS. 1 and 2. The transmission timeline 300 may include operations performed by a primary AP 105-d, a secondary AP 105-e, and a STA 115-b. Each of the STA 115-b and the APs 105 may be examples of the corresponding devices as described with reference to FIGS. 1 and 2. The primary AP 105-d and the secondary AP 105-e may be members of a group of APs 105 with which the STA 115-b has associated.

The transmission timeline 300 illustrates an example of the first multi-link transmission scheme, as described with reference to FIG. 2, which may support a shared block ACK session across multiple APs 105. The transmission timeline 300 includes transmissions on a first channel 305 and transmissions on a second channel 310. In some cases, the first channel 305 and the second channel 310 may occupy different, non-overlapping radio frequency spectrum bands. The primary AP 105-d may transmit downlink transmissions on the first channel 305 and the secondary AP 105-e may transmit downlink transmissions on the second channel 310. The STA 115-b may transmit uplink transmissions on both the first channel 305 and the second channel 310.

After associating with the STA 115-b, the primary AP 105-d may first transmit a packet 315 (e.g., an AMPDU) to the STA 115-b using the first channel 305. If the STA 115-b successfully receives the packet 315, the STA 115-b may transmit a block ACK 320 acknowledging that the packet was received. If the STA 115-b does not successfully receive the packet 315, as indicated in the transmission timeline 300 by the crossing out of the transmitted packet 315 and the corresponding block ACK 320, the STA 115-b does not transmit a block ACK 320 in response. Thus, because the primary AP 105-d does not receive a block ACK 320 from the STA 115-b, the primary AP 105-d and the secondary AP 105-e may retransmit the packet 315 to the STA 115-a. As shown, the primary AP 105-d may retransmit the packet 315 using the first channel 305, and the secondary AP 105-e may retransmit the packet 315 using the second channel 310.

In the example transmission timeline 300, the STA 115-b successfully receives the packet 315 from both the primary AP 105-d and the secondary AP 105-e. Because the packets 315 included information based on, for example, a same AMPDU, the STA 115-b may reconcile the different sets of MPDUs of the AMPDU of the packet 315. The STA 115-b may accordingly detect and drop any duplicate information between the packet 315 received from the primary AP 105-d and the packet 315 received from the secondary AP 105-e. The STA 115-b may update and report the combined scoreboard in a block ACK 320 based on the packets 315 received from both the primary AP 105-d and the secondary AP 105-e. That is, the STA 115-b may transmit the block ACK 320 to the primary AP 105-d using the first channel 305 and to the secondary AP 105-e using the second channel 310, thus acknowledging successful receipt of the packet 315 (or, the successfully received portions of the AMPDU).

Figure 4:
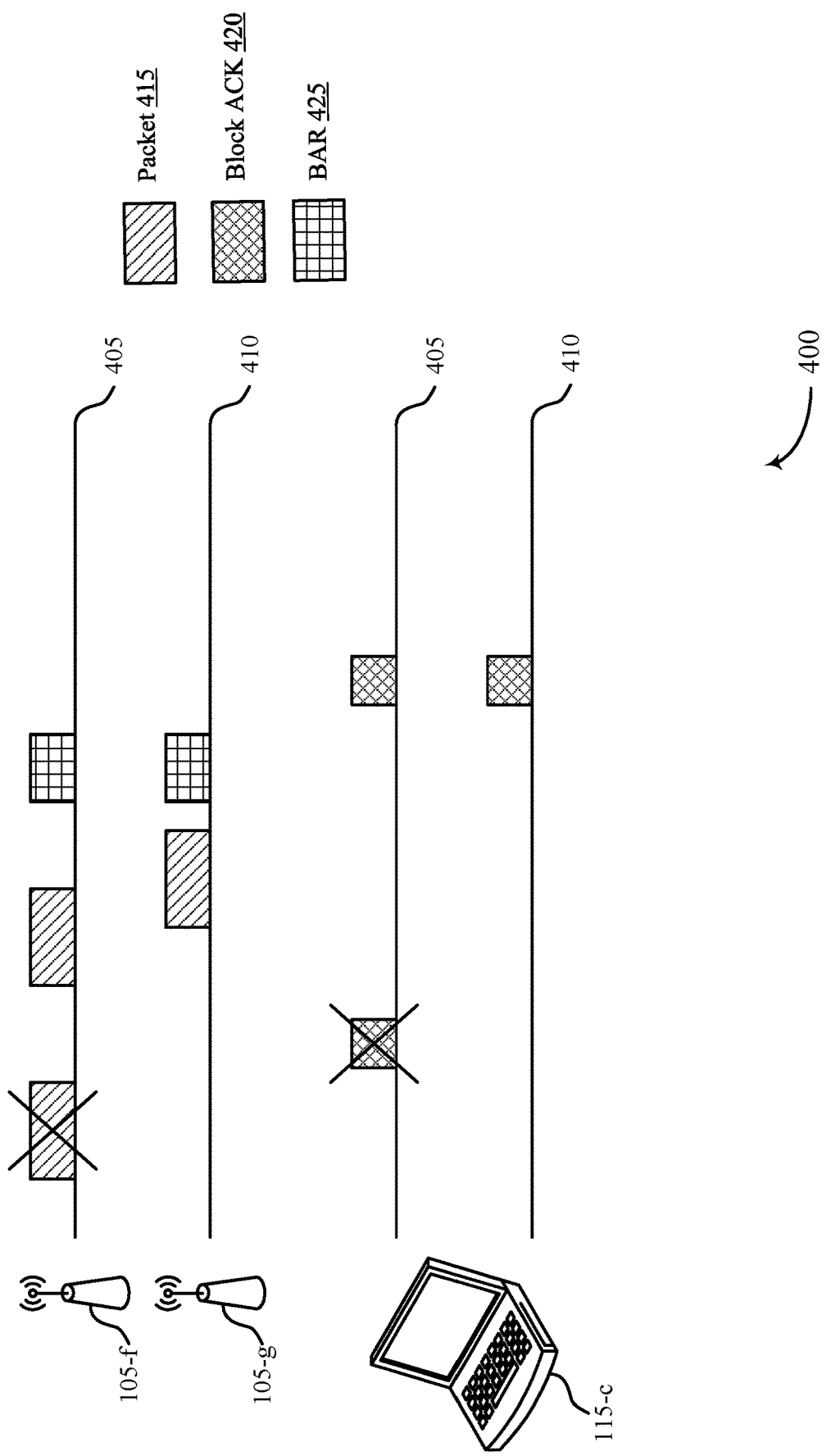

FIG. 4 illustrates an example of a transmission timeline 400 that supports enhanced reliability techniques for shared spectrum in accordance with aspects of the present disclosure. In some examples, the transmission timeline 400 may implement aspects of the WLAN 100 or the wireless communications system 200 as described with reference to FIGS. 1 and 2. The transmission timeline 400 may include operations performed by a primary AP 105-f, a secondary AP 105-g, and a STA 115-c. Each of the STA 115-c and the APs 105 may be examples of the corresponding devices as described with reference to FIGS. 1 and 2. The primary AP 105-f and the secondary AP 105-g may be members of a group of APs 105 with which the STA 115-c has associated.

The transmission timeline 400 illustrates an example of the first multi-link transmission scheme, as described with reference to FIG. 2, which support a shared block ACK session across multiple of APs 105. The transmission timeline 400 includes transmissions on a first channel 405 and transmissions on a second channel 410. In some cases, the first channel 405 and the second channel 410 may occupy different, non-overlapping radio frequency spectrum bands. The primary AP 105-f may transmit downlink transmissions on the first channel 405 and the secondary AP 105-g may transmit downlink transmissions on the second channel 410. The STA 115-c may transmit uplink transmissions on both the first channel 405 and the second channel 410.

As similarly described with reference to FIG. 3, after associating with the STA 115-c, the primary AP 105-f may first transmit a packet 415 (e.g., an AMPDU) to the STA 115-c using the first channel 405. If the STA 115-c successfully receives the packet 415, the STA 115-c may transmit a block ACK 420 acknowledging that the packet was received. If the STA 115-c does not successfully receive the packet 415, as indicated in the transmission timeline 400 by the crossing out of the transmitted packet 415 and the corresponding block ACK 420, the STA 115-c does not transmit a block ACK 420 in response. Thus, because the primary AP 105-f does not receive a block ACK 420 from the STA 115-c, the primary AP 105-f and the secondary AP 105-g may retransmit the packet 415 to the STA 115-c. As shown, the primary AP 105-f may retransmit the packet 415 using the first channel 405, and the secondary AP 105-g may retransmit the packet 415 using the second channel 410.

In the example transmission timeline 400, before the STA 115-c responds to the transmission of the packet 415, the primary AP 105-f and the secondary AP 105-g may transmit respective BARs 425 to the STA 115-*c*, using first channel 405 and the second channel 410, respectively. As shown in the example transmission timeline 400, the STA 115-*c* correctly receives the transmitted BARs 425.

The STA 115-*c* may then reconcile the different sets of MPDUs in the packet 415 that were received correctly. The STA 115-*c* may detect and drop any duplicate information between the packet 415 received from the primary AP 105-*f* and the packet 415 received from the secondary AP 105-*g*. The STA 115-*c* may update and, in response to the received BARs 425, report the combined scoreboard in the block ACK 420 based on the packets 415 received from both the primary AP 105-*f* and the secondary AP 105-*g*. That is, the STA 115-*b* may transmit the block ACK 420 to the primary AP 105-*f* using the first channel 405 and to the secondary AP 105-*g* using the second channel 410, thus indicating the portions of the AMPDU of the packet 415 that were successfully received.

Figure 5:
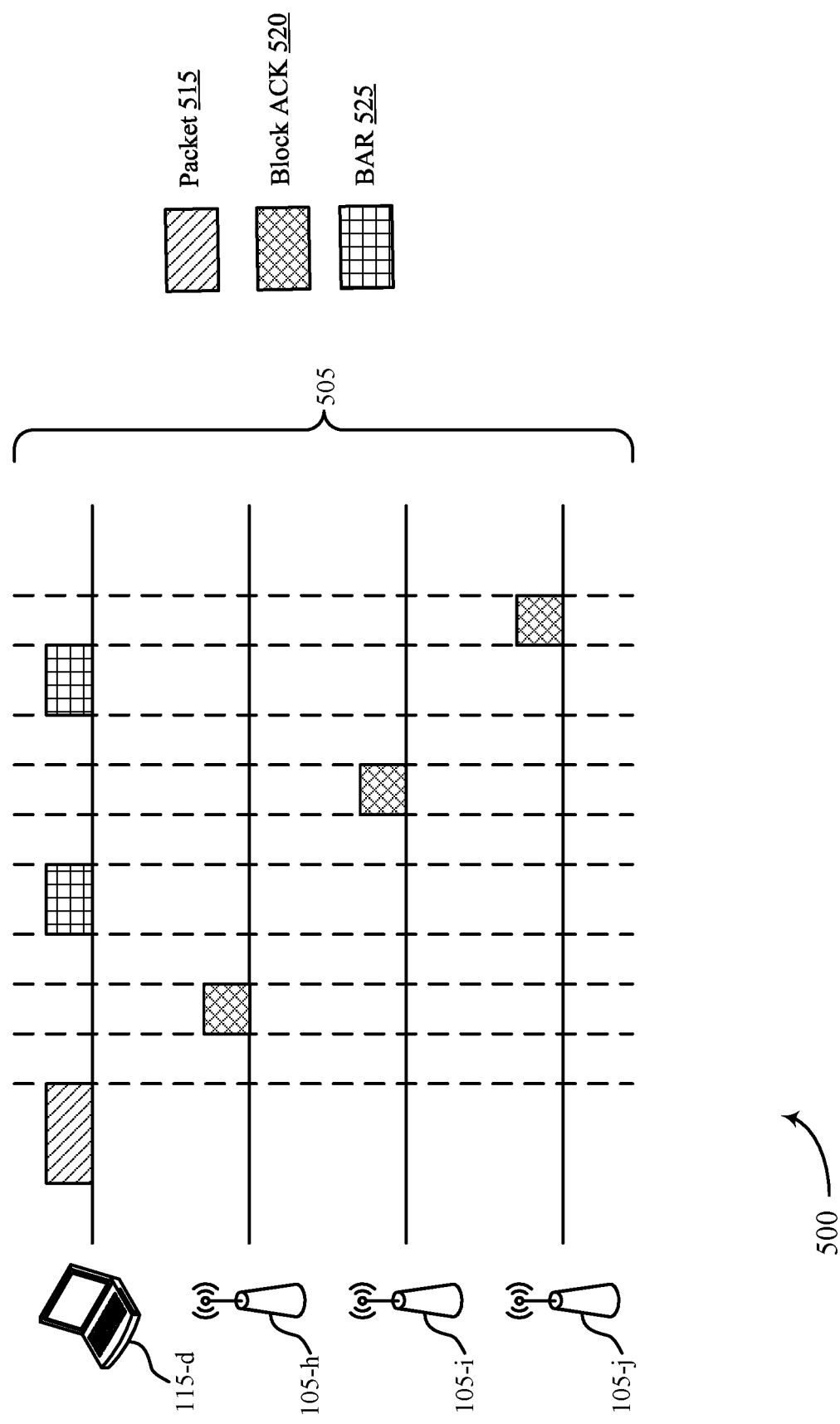

FIG. 5 illustrates an example of a transmission timeline 500 that supports enhanced reliability techniques for shared spectrum in accordance with aspects of the present disclosure. In some examples, the transmission timeline 500 may implement aspects of the WLAN 100 or the wireless communications system 200 as described with reference to FIGS. 1 and 2. The transmission timeline 500 may include operations performed by a STA 115-*d*, a first AP 105-*h*, a second AP 105-*i*, and a third AP 105-*j*. Each of the STA 115-*d* and the APs 105 may be examples of the corresponding devices as described with reference to FIGS. 1 and 2. The APs 105 may be members of a group of APs 105 with which the STA 115-*d* has associated.

The transmission timeline 500 illustrates an example of the second multi-link transmission scheme, as described with reference to FIG. 2, in which each of the APs 105 of the set of APs 105 may use the same channel 505 for uplink data transmissions.

After associating with each of the APs 105, the STA 115-*d* may transmit a data 515 (e.g., an AMPDU) to each of the first AP 105-*h*, the second AP 105-*i*, and the third AP 105-*j*. The first AP 105-*h* may receive the packet 515, and in response transmit a block ACK 520 to the STA 115-*d*. The STA 115-*d* may use the block ACK 520 to determine whether each of the MPDUs received in the packet 515 were indicated to have been successfully received according to the block ACK 520. As shown in the example transmission timeline 500, the STA 115-*d* determines that one or more individual ACKs for one or more certain MPDUs are missing in the block ACK 520.

The STA 115-*d* may then transmit a BAR 525 to the second AP 105-*i*. In response to receiving the BAR 525 from the STA 115-*d*, the second AP 105-*i* may transmit a further block ACK 520 to the STA 115-*d*. The STA 115-*d* may reconcile the set of MDPUs indicated to have been received in the second block ACK 520 with the set of MDPUs indicated to have been received in the first block ACK 520. The STA 115-*d* may accordingly determine whether any ACKs are still missing for MPDUs of the AMPDU. As shown in the example transmission timeline 500, the STA 115-*d* determines that one or more individual ACKs for one or more certain MPDUs are still missing, and transmits a further BAR 525 to the third AP 105-*j*. In response to receiving the BAR 525 from the STA 115-*d*, the third AP 105-*j* may transmit a further block ACK 520 to the STA 115-*d*. The STA 115-*d* may reconcile the sets of MDPUs indicated to have been received via the first, second, and third block ACKs 520 to determine whether data may still be missing.

Figure 6:
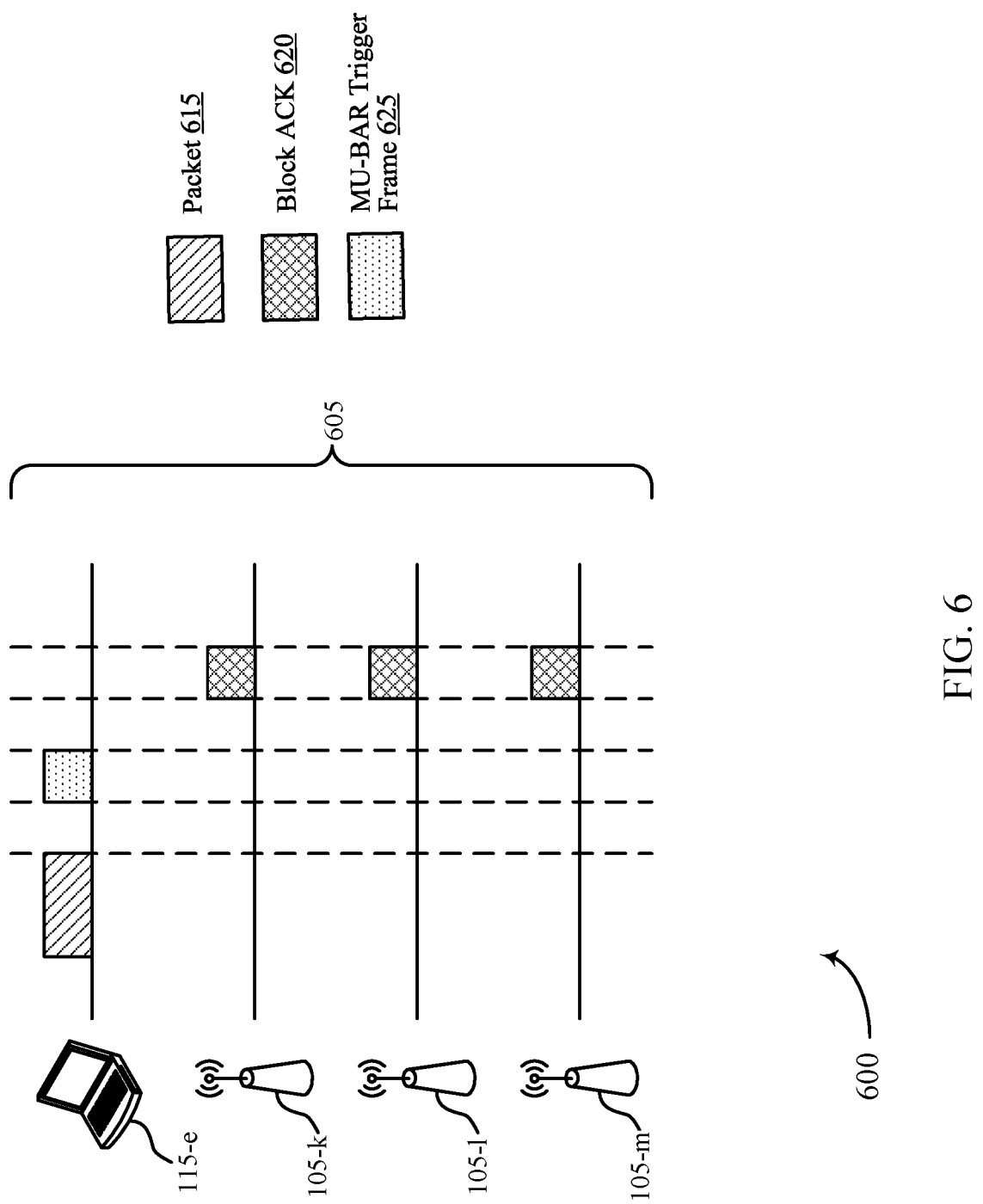

FIG. 6 illustrates an example of a transmission timeline 600 that supports enhanced reliability techniques for shared spectrum in accordance with aspects of the present disclosure. In some examples, the transmission timeline 600 may implement aspects of the WLAN 100 or the wireless communications system 200 as described with reference to FIGS. 1 and 2. The transmission timeline 600 may include operations performed by a STA 115-*e*, a first AP 105-*k*, a second AP 105-*l*, and a third AP 105-*m*. Each of the STA 115-*d* and the APs 105 may be examples of the corresponding devices as described with reference to FIGS. 1 and 2. The APs 105 may be members of a group of APs 105 with which the STA 115-*e* has associated.

The transmission timeline 600 illustrates an example of the second multi-link transmission scheme, as described with reference to FIG. 2, in which each of the APs 105 of the set of APs 105 may use a same channel 605 for uplink data transmissions.

After associating with each of the APs 105, the STA 115-*e* may transmit a packet 615 (e.g., an AMPDU) to each of the first AP 105-*k*, the second AP 105-*l*, and the third AP 105-*m*. The STA 115-*e* may then transmit an uplink trigger frame, for example a MU-BAR trigger frame 625 to each of the first AP 105-*k*, the second AP 105-*l*, and the third AP 105-*m*. In response to the MU-BAR trigger frame 625, each of the first AP 105-*k*, the second AP 105-*l*, and the third AP 105-*m* may respond with a block ACK 620. In some cases, as shown in the example transmission timeline 600, the APs 105 may each respond to the MU-BAR trigger frame 625 substantially simultaneously or concurrently, which may allow for potentially reduced retransmission delays. The STA 115-*e* may combine the block ACK score reports received from each of the APs 105 to reconcile the sets of MDPUs indicated to have been received via the block ACKs 620 to determine whether any data from the transmitted packet 615 may not have been received correctly by the APs 105.

Figure 7:
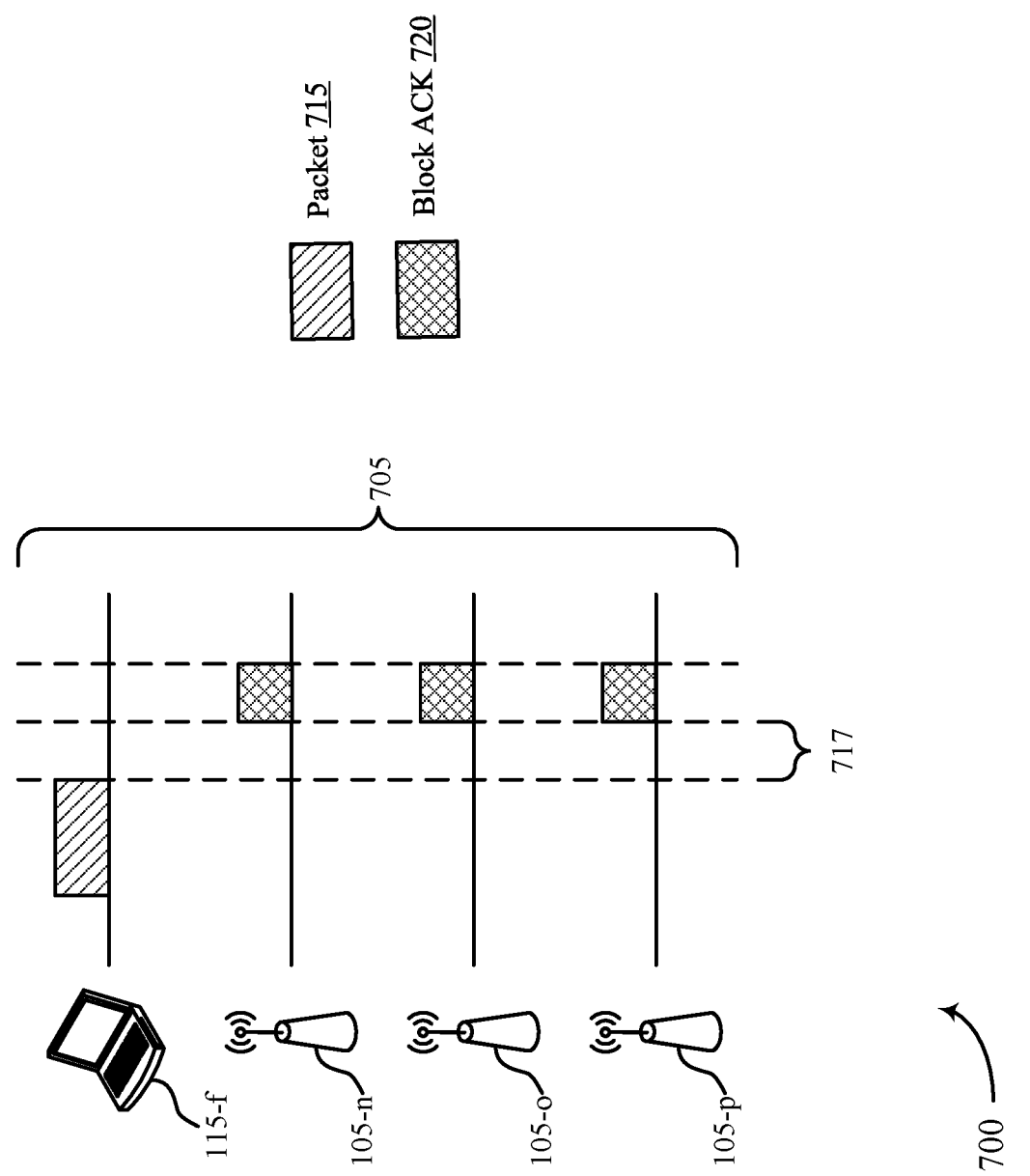

FIG. 7 illustrates an example of a transmission timeline 700 that supports enhanced reliability techniques for shared spectrum in accordance with aspects of the present disclosure. In some examples, the transmission timeline 700 may implement aspects of the WLAN 100 or the wireless communications system 200 as described with reference to FIGS. 1 and 2. The transmission timeline 700 may include operations performed by a STA 115-*f*, a first AP 105-*n*, a second AP 105-*o*, and a third AP 105-*p*. Each of the STA 115-*f* and the APs 105 may be examples of the corresponding devices as described with reference to FIGS. 1 and 2. The APs 105 may be members of a group of APs 105 with which the STA 115-*f* has associated.

The transmission timeline 700 illustrates an example of the second multi-link transmission scheme, as described with reference to FIG. 2, in which each of the APs 105 of the set of APs 105 may use the same channel 705 for uplink data transmissions.

After associating with each of the APs 105, the STA 115-*f* may transmit a packet 715 (e.g., an AMPDU) to each of the first AP 105-*n*, the second AP 105-*o*, and the third AP 105-*p*. In some cases, as shown in the example transmission timeline 700, the STA 115-*e* may include an uplink trigger frame with the packet 715. When the uplink trigger frame is transmitted with the packet 715, each of the APs 105 may respond to the packet 715 with respective block ACKs 720, for example after a SIFS 717 for the APs 105 to process the received packet 715 and respond with the block ACK 720.

In some cases, as shown in the example transmission timeline 700, the APs 105 may each respond to receiving the packet 715 substantially simultaneously or concurrently after the SIFS 717, which may allow for potentially reduced retransmission delays. The STA 115-$f$ may combine the block ACK score reports received from each of the APs 105 to reconcile the sets of MDPUs indicated to have been received via the block ACKs 720 to determine whether any data from the transmitted packet 715 may not have been received correctly by the APs 105.

Figure 8A:
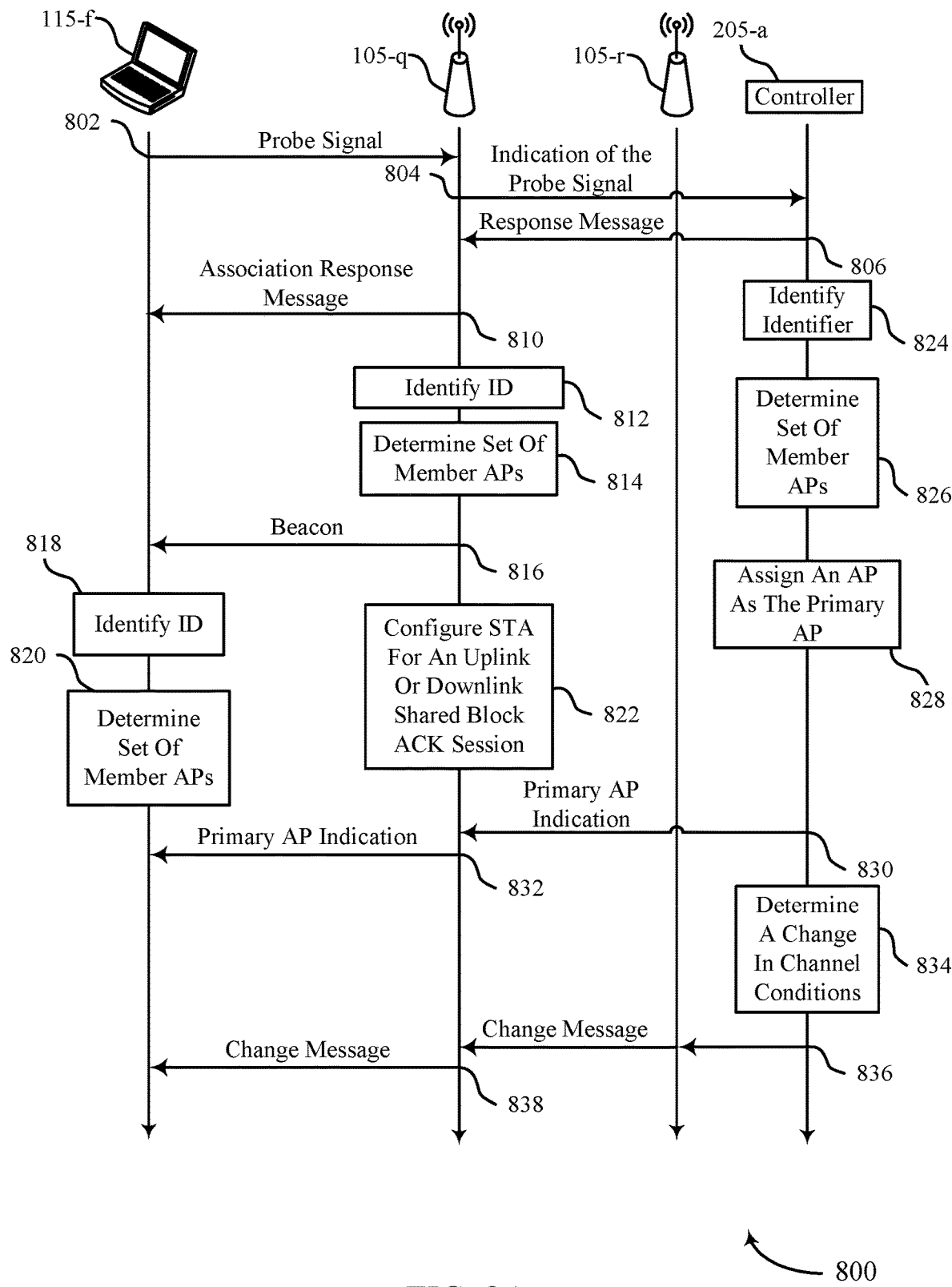
FIGS. 8A and 8B illustrate an example of a process flow that supports enhanced reliability techniques for shared spectrum in accordance with aspects of the present disclosure.
Figure 8B:
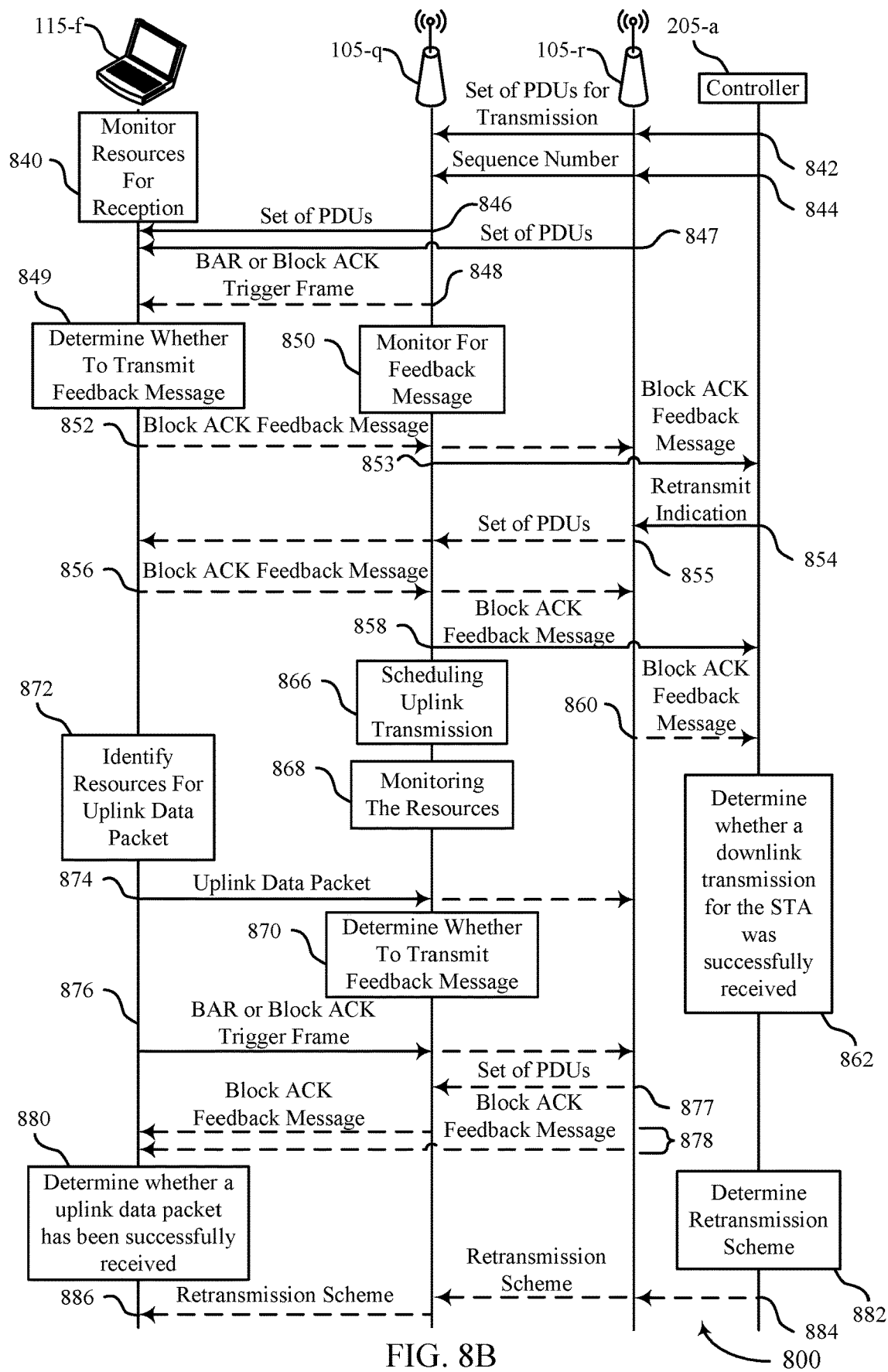

FIGS. 8A and 8B illustrate an example of a process flow 800 that supports enhanced reliability techniques for shared spectrum in accordance with aspects of the present disclosure. In some examples, the process flow 800 may implement aspects of the WLAN 100 or wireless communications system 200 of FIGS. 1 and 2. The process flow 800 includes a STA 115-$f$, an AP 105-$q$, an AP 105-$r$, and a controller 205-$a$, each of which may be examples of the corresponding devices described with reference to FIGS. 1 through 7. FIG. 8A first shows an example discovery procedure for a set of APs 105 (e.g., the AP 105-$q$ and the AP 105-$r$) and a corresponding STA 115 (e.g., the STA 115-$f$), and correspondingly associating the STA 115-$f$ with the set of APs 105. FIG. 8B is shown as a continuation of the process flow 800 shown in FIG. 8A. FIG. 8B shows an example of performing a multi-link transmission scheme.

At 802, the STA 115-$f$ may transmit to the AP 105-$q$ a probe signal for discovery of one or more APs associated with the shared block ACK session. The probe signal may be transmitted to associate with, and subsequently communicate with the APs 105 (e.g., AP 105-$q$ or AP 105-$r$) of set of APs 105.

At 804, the AP 105-$q$ may transmit an indication of the probe signal to the controller 205-$a$, as may have been received at 802.

At 806, the controller 205-$a$ may transmit, to the AP 105-$q$, a response message indicating that the AP 105-$q$ is a member of the set of APs 105.

At 810, the AP 105-$q$ may transmit to the STA 115-$f$ an association response message in response to the probe signal and based on the response message received from the controller 205-$a$.

At 812, the AP 105-$q$ may identify an ID (e.g., a group ID) associated with a shared block ACK session for one or more stations STAs (e.g., STA 115-$f$).

At 814, the AP 105-$q$ may determine a set of member APs 105 of a wireless communications system for the shared block ACK session (e.g., here, AP 105-$q$ and AP 105-$r$).

At 816, the AP 105-$q$ may transmit or broadcast a beacon, where the broadcasted beacon may be received by the STA 115-$f$. The beacon may indicate to the STA 115-$f$, via a shared radio frequency spectrum band, the ID and the set of member APs 105 associated with the ID. In some cases, the AP 105-$q$ may broadcast the beacon via a reference signal, for example, discovery reference signal (DRS). In some cases, the beacon may include an information element that indicates the ID and the set of member APs 105. In some cases, the information element may include a neighbor report element that carries the ID and the set of member APs 105, and the neighbor report element is associated with each of the set of member APs 105.

At 818, the STA 115-$f$ may identify an ID (e.g., a group ID) associated with a shared block ACK session for the STA 115-$f$.

At 820, the STA 115-$f$ may determine a set of member APs 105 of a wireless communications system for the shared block ACK session (e.g., here, AP 105-$q$ and AP 105-$r$).

At 822, the AP 105-$q$ may configure the STA 115-$f$ for an uplink shared block ACK session or a downlink shared block ACK session based on indicating the ID and the set of member APs. In some cases, configuring the STA 115-$f$ may include associating the uplink shared block ACK session with multiple RAs corresponding to the set of member APs 105, a TA associated with the STA 115-$f$, or a TID associated with an uplink packet. In some cases, each RA of the multiple RAs corresponds to a MAC address or a BSSID of a member AP 105 of the set of member APs 105. In some cases, each RA of the multiple RAs may correspond to a group address associated with the set of member APs 105 or a MAC address of the controller 205-$a$. Additionally or alternatively, configuring the STA 115-$f$ may include associating the downlink shared block ACK session with an RA associated with the STA 115-$f$, multiple TAs corresponding to the set of member APs 105, or a TID associated with an downlink packet. In some cases, each TA of the multiple TAs corresponds to a MAC address or a BSSID of a member AP 105 of the set of member APs 105. In some cases, each TA of the multiple TAs may correspond to a group address associated with the set of member APs 105 or a MAC address of the controller 205-$a$. In some cases, configuring the STA 115-$f$ may include associating the uplink shared block ACK session or the downlink shared block ACK session with a virtual BSSID that corresponds to the set of member APs 105, where each AP 105 of the set of member APs 105 is associated with a respective BSSID. In some cases, the virtual BSSID is associated with a master AP 105 of the set of member APs 105.

At 824, the controller 205-$a$ may identify an ID (e.g., a group ID) associated with a shared block ACK session for the STA 115-$f$.

At 826, the controller 205-$a$ may determine a set of member APs 105 of a wireless communications system for the shared block ACK session (e.g., here, AP 105-$q$ and AP 105-$r$).

At 828, the controller 205-$a$ may assign an AP 105 (e.g., one of AP 105-$q$ or AP 105-$r$) as the primary AP 105-$a$.

At 830, the controller 205-$a$ may transmit a primary AP indication to the AP 105-$q$ to signal to the AP 105-$q$ that it is the primary AP 105 for the STA 115-$f$.

At 832, the AP 105-$q$ may transmit to the STA 115-$f$ an indication that the AP 105-$q$ is the primary AP 105 for the STA 115-$f$. In some cases, the indication may be transmitted via a PAF.

At 834, the controller 205-$a$ may determine a change in channel conditions, for example, a channel for communications with the STA 115-$f$. Based on the determined change in channel conditions, the controller 205-$a$ may assign the AP 105-$r$ as the primary AP 105 for the STA 115-$f$.

At 836, the controller 205-$a$ may transmit to the AP 105-$q$ or the AP 105-$r$ a change message indicating that the primary AP 105 has changed from the AP 105-$q$ to the AP 105-$r$.

At 838, the AP 105-$q$ may transmit to the STA 115-$f$ a change message indicating that the AP 105-$r$ is the primary AP 105 for the STA 115-$f$.

At 840, the STA 115-$f$ may begin monitoring resources for reception of a downlink transmission.

At 842, the controller 205-$a$ may transmit to the AP 105-$q$ or the AP 105-$r$ a set of PDUs for transmission to the STA 115-$f$.

At 844, the controller 205-$a$ may transmit to the AP 105-$q$ or the AP 105-$r$, via an upper layer communication link, respective sequence numbers associated with the AP 105-$q$ or the AP 105-$r$. The respective sequence numbers may be used for communications via respective PHY layer communication links between the APs 105 and the STA 115-$f$.

At 846, the AP 105-$q$ may transmit the set of PDUs to the STA 115-$f$, for example, based on the sequence number as may have been received at 844. In some cases, the set of PDUs transmitted to the STA 115-$f$ may be associated with a retransmission to the STA 115-$f$ (e.g., after having received a previous block ACK report indicating that one or more PDUs were not successfully received). Transmitting the set of PDUs may include, for example, transmitting multiple downlink packets.

At 847, the AP 105-$r$ may transmit a further set of PDUs to the STA 115-$f$, for example, based on the sequence number as may have been received at 844. In some cases, the set of PDUs transmitted to the STA 115-$f$ may be associated with a retransmission to the STA 115-$f$ (e.g., after having received a previous block ACK report indicating that one or more PDUs were not successfully received). Transmitting the set of PDUs may include, for example, transmitting multiple downlink packets.

At 848, the AP 105-$q$ may optionally transmit a BAR or a block ACK trigger frame to the STA 115-$f$.

At 849, the STA 115-$f$ may determine whether to transmit a feedback message based monitoring the resources at 840 and the set of PDUs, as may have been received at 846. The STA 115-$f$ may further decode downlink packets that the STA 115-$f$ may have received at 846 and 847. The STA 115-$f$ may then drop duplicates of the decoded packets.

At 850, the AP 105-$q$ may monitor for a feedback message from the STA 115-$f$ based on transmitting the set of PDUs at 846. In some cases, the AP 105-$q$ may modify a block ACK window position or duration based on monitoring for the feedback message.

At 852, the STA 115-$f$ may transmit a block ACK feedback message to the AP 105-$q$ or the AP 105-$r$. The block ACK feedback message may indicate that at least a portion of the set of PDUs has been successfully received. In some cases, the block ACK feedback message may be transmitted based on the multiple downlink packets, as may have been received at 846 and 847. In some cases, the STA 115-$f$ may transmit the block ACK feedback message in response to the BAR or the block ACK trigger frame, as may have been received at 848. In some cases, transmitting the block ACK feedback message may include transmitting a combined block ACK feedback message based on PDUs received from AP 105-$q$ and AP 105-$r$. In some cases, transmitting the block ACK feedback message may be based on the BAR or the block ACK trigger frame, as may have been received at 848.

At 853, the AP 105-$q$ may transmit to the controller 205-$a$ a block ACK feedback message indicating that at least a portion of the downlink transmissions at 846 or 847 to the STA 115-$f$ were not successfully received.

At 854, the controller 205-$a$ may transmit to the AP 105-$r$ an indication to retransmit a portion of a downlink transmission to the STA 115-$f$, for example, a portion of the downlink transmissions at 846 or 847 that the STA 115-$f$ may have indicated were not correctly received. In some cases, the indication to retransmit indicates for the AP 105-$r$ to retransmit via a channel different than the channel on which the AP 105-$q$ used to transmit the data, for example, at 846.

At 855, the AP 105-$r$ may transmit a second set of PDUs to the STA 115-$f$. In some cases, the second AP 105-$r$ may additionally transmit the second set of PDUs to the AP 105-$q$. In some cases, the set PDUs transmitted at 855 may be, or may be associated with, a transmission of at least a portion of a downlink transmission (e.g., a retransmission of at least some of the PDUs transmitted at 846 and 847, based on the indication to retransmit received at 854). In some cases, the transmission of the second set of PDUs may be on a channel different than the channel on which the primary AP 105-$q$ used to transmit the data, for example, at 846.

At 856, the STA 115-$f$ may transmit a second block ACK feedback message to the AP 105-$q$ or the AP 105-$r$. The second block ACK feedback message may be based on the set of PDUs, for example, received at 855.

At 858, the AP 105-$q$ may transmit a block ACK feedback message to the controller 205-$a$.

At 860, the AP 105-$r$ may transmit a block ACK feedback message to the controller 205-$a$.

At 862, the controller 205-$a$ may determine whether a downlink transmission (e.g., with which the set of PDUs are associated) for the STA 115-$f$ was successfully received. Determining whether the downlink transmission was successfully received may be based on a combination of the multiple block ACK feedback messages received by the controller 205-$a$, for example, at 853, 858, and 860.

At 866, the AP 105-$q$ may schedule an uplink transmission for the STA 115-$f$ via resources of the shared radio frequency spectrum band.

At 872, the STA 115-$f$ may identify resources for transmission of an uplink data packet. In some cases, the STA 115-$f$ may identify the resources by way of receiving a scheduling message that allocates the resources for transmission of the uplink data packet to the STA.

At 868, the AP 105-$q$ may monitor the resources for the uplink transmission from the STA 115-$f$.

At 870, the AP 105-$q$ may determine whether to transmit a feedback message to the STA based on monitoring the resources for the uplink transmission.

At 874, the STA 115-$f$ may transmit to the AP 105-$q$ an uplink data packet. In some cases, the STA 115-$f$ may optionally transmit the uplink data packet to the AP 105-$r$. The STA 115-$f$ may transmit the uplink data packet using the resources as identified at 872. In some cases, the STA 115-$f$ may transmit the uplink data packet on a same channel to each member AP 105 (e.g., each of APs 105-$q$ and 105-$r$) of the set of APs 105.

At 876, the STA 115-$f$ may transmit to the AP 105-$q$ a BAR or a block ACK trigger frame. In some cases, the STA 115-$f$ may additionally transmit the BAR or the block ACK trigger frame to the second AP 105-$r$.

At 877, the second AP 105-$r$ may signal to the AP 105-$q$ a set of PDUs that the AP 105-$r$ has received, for example, of the uplink data packet at 874.

At 878, the AP 105-$q$ or the AP 105-$r$ may transmit to the STA 115-$r$ a block ACK feedback message. Transmitting a block ACK feedback message may be based on receiving the uplink transmission (e.g., the uplink data packet received at 874) from the STA 115-$f$, where the block ACK feedback message indicates that at least a portion of the uplink transmission has been received. In some cases, the block ACK feedback messages may be transmitted in response to the BAR or the block ACK trigger frame, as may have been received at 876. In some cases, the AP 105-$q$ may transmit the block ACK feedback message based on the set of PDUs that the second AP 105-$r$ received correctly, for example, as signaled by the second AP 105-$r$ at 877.

At 880, the STA 115-$f$ may determine whether a complete uplink data packet has been successfully received by the APs 105. Determining whether a complete uplink data packet has been successfully received may be based on the one or more block ACK feedback messages, as may have been received at 878. For example, the STA 115-$f$ may determine that the complete uplink data packet has been successfully received based on the first and second block ACK feedback messages from the AP 105-*q* and the AP 105-*r*, respectively, acknowledging that each PDU of the transmitted PDUs has been received correctly by the AP 105-*q* or the AP 105-*r*.

At 882, the controller 205-*a* may determine a retransmission scheme for a further downlink transmission to the STA 115-*f*. In some cases, the retransmission scheme may indicate a simultaneous retransmission for multiple APs 105 of the set of APs 105 (e.g., using the second multi-link transmission scheme, as described herein with reference to FIG. 2). In some cases, the retransmission scheme may indicate a sequential retransmission for multiple APs 105 of the set of APs 105 (e.g., using the first multi-link transmission scheme or the third multi-link transmission scheme, as described herein with reference to FIG. 2). The retransmission scheme may be any, or a combination, of the various multi-link transmission schemes described herein.

At 884, the controller 205-*a* may transmit the retransmission scheme to the AP 105-*q* or the AP 105-*r* to indicate the determined retransmission scheme.

At 886, the AP 105-*q* may transmit the retransmission scheme to the STA 115-*f* to indicate the determined retransmission scheme.

Figure 9:
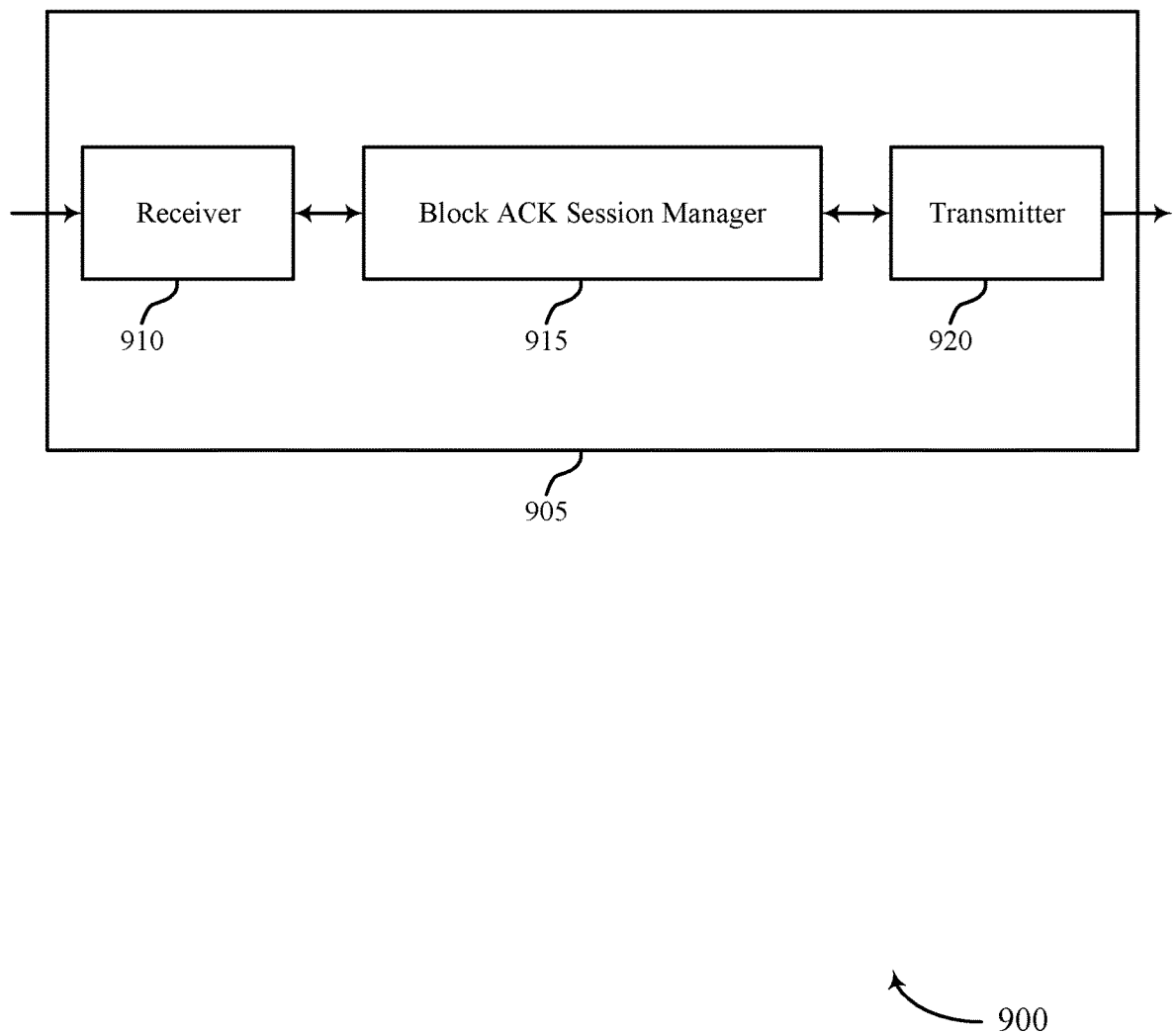
FIGS. 9 and 10 show block diagrams of devices that support enhanced reliability techniques for shared spectrum in accordance with aspects of the present disclosure.

FIG. 9 shows a block diagram 900 of a device 905 that supports enhanced reliability techniques for shared spectrum in accordance with aspects of the present disclosure. The device 905 may be an example of aspects of an AP as described herein. The device 905 may include a receiver 910, a block ACK session manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to enhanced reliability techniques for shared spectrum, etc.). Information may be passed on to other components of the device. The receiver 910 may be an example of aspects of the transceiver 1220 described with reference to FIG. 12. The receiver 910 may utilize a single antenna or a set of antennas.

The block ACK session manager 915 may identify an ID (e.g., a group ID) associated with a shared block ACK session for one or more STAs, identify a set of member APs of a wireless communications system for the shared block ACK session, and indicate, to a STA via a shared radio frequency spectrum band, the ID and the set of member APs associated with the ID. The block ACK session manager 915 may be an example of aspects of the block ACK session manager 1015 described herein.

The block ACK session manager 915, or its sub-components, may be implemented in hardware, code (e.g., software or firmware) executed by a processor, or any combination thereof. If implemented in code executed by a processor, the functions of the block ACK session manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The block ACK session manager 915, or its sub-components, may be physically located at various positions, including being distributed such that portions of functions are implemented at different physical locations by one or more physical components. In some examples, the block ACK session manager 915, or its sub-components, may be a separate and distinct component in accordance with various aspects of the present disclosure. In some examples, the block ACK session manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

The actions performed by the block ACK session manager 915 as described herein may be implemented to realize one or more potential advantages discussed herein. One implementation may facilitate packet-based aggregation through the shared block ACK sessions. Packet-based aggregation may in some cases provide improved UPT and sum throughput (e.g., for a single traffic flow or multiple traffic flows) relative to other aggregation architectures and non-aggregated communications. Further, the techniques provided herein may achieve increased spatial diversity by way of the communications between different APs and STAs. The increased spatial diversity may provide performance improvements for the device 905, for example, in the case of fluctuations in blockage (e.g., physical blockage) of the communication links. For example, reliability may be relatively improved due to a higher probability of transmissions being successfully communications, and power may be conserved at the APs and the STAs due to fewer retransmission. By implementing the feedback mechanism techniques as described herein, a processor of an AP (e.g., controlling the receiver 910, the transmitter 920, or the transceiver 1220 as described with reference to FIG. 12) may more efficiently utilize power and spectral resources, for example, due to mitigated duplicate transmission or reduced overhead used in signaling sequence numbers.

Figure 10:
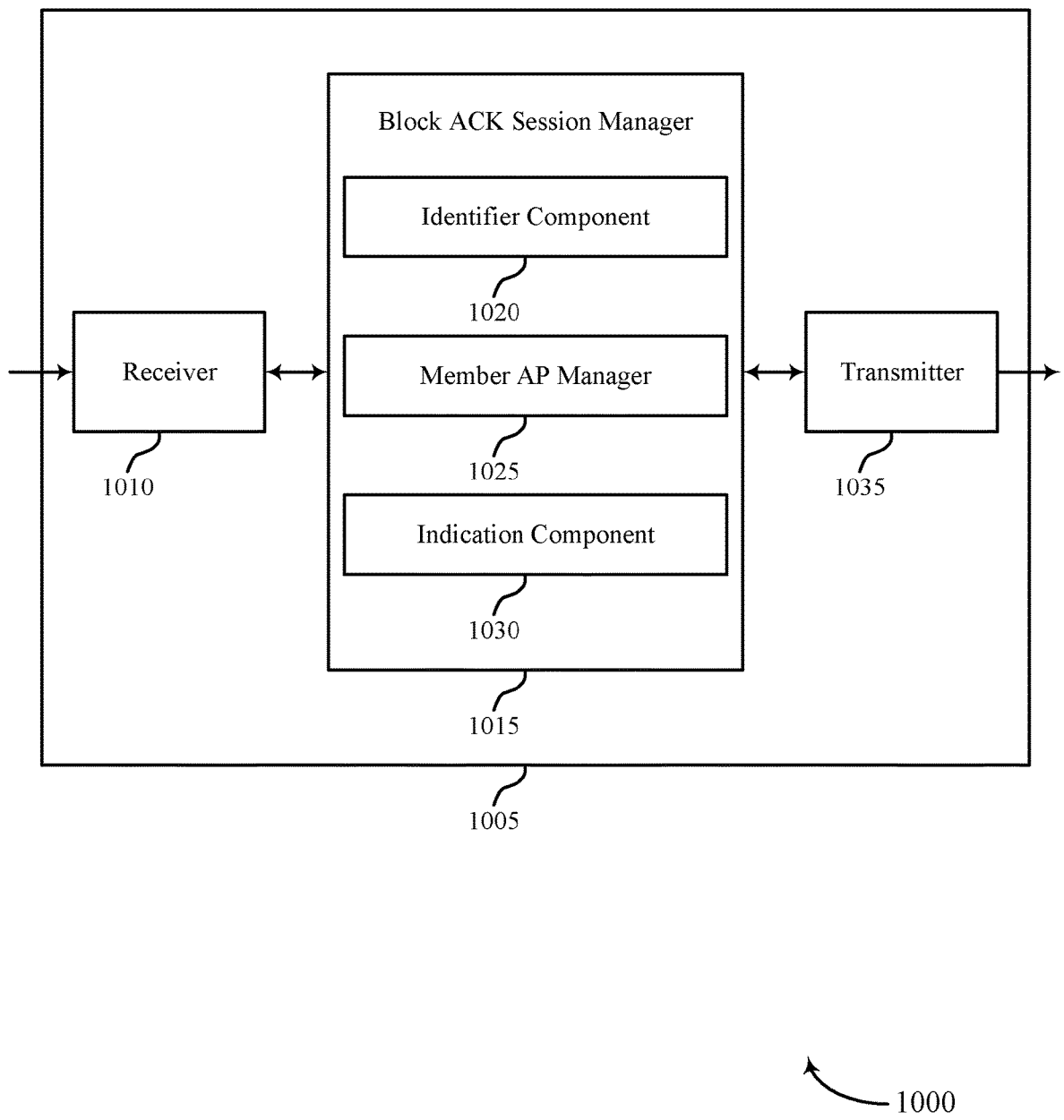

FIG. 10 shows a block diagram 1000 of a device 1005 that supports enhanced reliability techniques for shared spectrum in accordance with aspects of the present disclosure. The device 1005 may be an example of aspects of a device 905 or an AP 105 as described herein. The device 1005 may include a receiver 1010, a block ACK session manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to enhanced reliability techniques for shared spectrum, etc.). Information may be passed on to other components of the device. The receiver 1010 may be an example of aspects of the transceiver 1220 described with reference to FIG. 12. The receiver 1010 may utilize a single antenna or a set of antennas.

The block ACK session manager 1015 may be an example of aspects of the block ACK session manager 915 as described herein. The block ACK session manager 1015 may include an ID component 1020, a member AP manager 1025, and an indication component 1030. The block ACK session manager 1015 may be an example of aspects of the block ACK session manager 1210 described herein.

The ID component 1020 may identify an ID (e.g., a group ID) associated with a shared block ACK session for one or more STAs.

The member AP manager 1025 may identify a set of member APs of a wireless communications system for the shared block ACK session. In some implementations, the actions performed by the member AP manager 1025, included in the block ACK session manager 1015, as described herein may facilitate the processor 1240, as described with reference to FIG. 12, to more efficiently cause the device 1005 to perform various functions. For example, the device 805 may achieve increased spatial diversity by way of the communications between different APs and STAs. The increased spatial diversity may provide performance improvements for the device 1005, for example, in the case of fluctuations in blockage (e.g., physical blockage) of the communication links. For example, resource utilization may be relatively improved by mitigating some of the duplicate transmission or reducing the overhead used in signaling sequence numbers. Thus, power and spectral resources may be conserved at the device 1005.

The indication component 1030 may indicate, to a STA via a shared radio frequency spectrum band, the ID and the set of member APs associated with the ID.

The transmitter 1035 may transmit signals generated by other components of the device. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
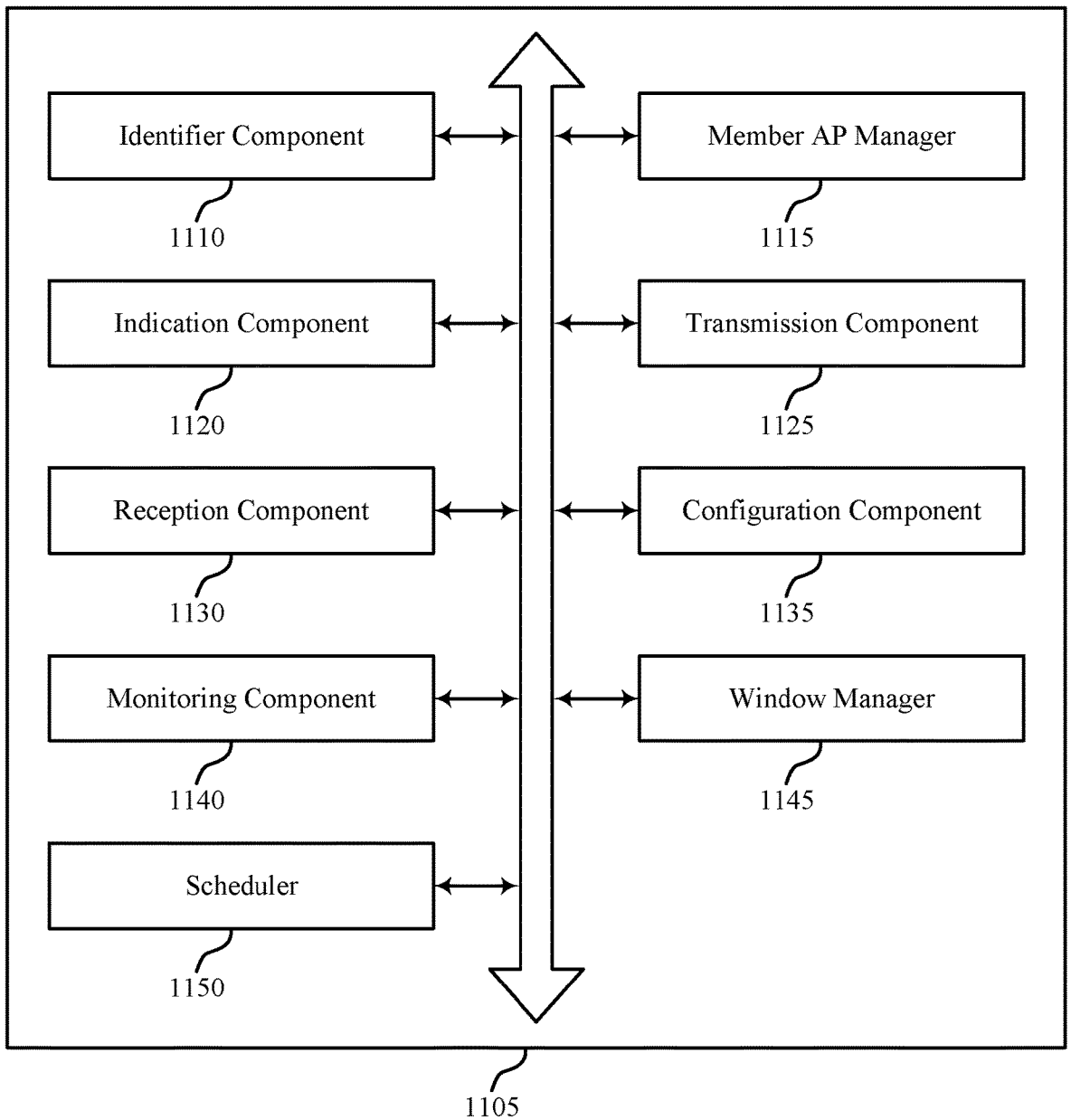
FIG. 11 shows a block diagram of a block acknowledgment (ACK) session manager that supports enhanced reliability techniques for shared spectrum in accordance with aspects of the present disclosure.

FIG. 11 shows a block diagram 1100 of a block ACK session manager 1105 that supports enhanced reliability techniques for shared spectrum in accordance with aspects of the present disclosure. The block ACK session manager 1105 may be an example of aspects of a block ACK session manager 915, a block ACK session manager 1015, or a block ACK session manager 1210 described herein. The block ACK session manager 1105 may include an ID component 1110, a member AP manager 1115, an indication component 1120, a transmission component 1125, a reception component 1130, a configuration component 1135, a monitoring component 1140, a window manager 1145, and a scheduler 1150. Each of these modules may communicate, directly or indirectly, with one another (e.g., via one or more buses).

The ID component 1110 may identify an ID (e.g., a group ID) associated with a shared block ACK session for one or more STAs.

The member AP manager 1115 may identify a set of member APs of a wireless communications system for the shared block ACK session.

The indication component 1120 may indicate, to a STA via a shared radio frequency spectrum band, the ID and the set of member APs associated with the ID.

The transmission component 1125 may transmit a beacon including an information element that indicates the ID and the set of member APs. In some aspects, the information element includes a neighbor report element that carries the ID and the set of member APs, where the neighbor report element is associated with each of the set of member APs. In some examples, the transmission component 1125 may broadcast the beacon via a DRS. In some cases, the transmission component 1125 may transmit, to a wireless controller of the wireless communications system in communication with the set of member APs, an indication of the probe signal. In some instances, the transmission component 1125 may transmit, to the STA, an association response message in response to the probe signal based on the response message received from the wireless controller.

In some aspects, the transmission component 1125 may transmit, to the STA, an indication that the AP is the primary AP for the STA. In some instances, the indication that the AP is the primary AP is transmitted via a PAF. In some examples, the transmission component 1125 may transmit, to the STA, an indication that the second AP is the primary AP for the STA. In some cases, the transmission component 1125 may transmit the set of PDUs to the STA based on a sequence number associated with the AP. In some aspects, the transmission component 1125 may transmit, to the STA, a BAR message, where the block ACK feedback message is received in response to the BAR message. In some instances, the transmission component 1125 may determine whether to transmit a feedback message to the STA based on the monitoring.

In some examples, the transmission component 1125 may transmit a block ACK feedback message based on receiving the uplink transmission from the STA, where the block ACK feedback message indicates that at least a portion of the uplink transmission has been received. In some cases, the transmission component 1125 may transmit a block ACK feedback message based on the set of PDUs received by the second AP.

The reception component 1130 may receive, from the STA, a probe signal for discovery of one or more APs associated with the shared block ACK session. In some examples, the reception component 1130 may receive, from the wireless controller, a response message indicating that the AP is a member of the set of member APs. In some cases, the reception component 1130 may receive, from a wireless controller of the wireless communications system in communication with the set of member APs, an indication that the AP is a primary AP for the STA. In some instances, the reception component 1130 may receive, from the wireless controller, a change message indicating that the primary AP has changed from the AP to a second AP. In some aspects, the reception component 1130 may receive, from a wireless controller of the wireless communications system in communication with the set of member APs, a set of PDUs for transmission to the STA.

In some examples, the reception component 1130 may receive, from the wireless controller, the sequence number associated with the AP. In some cases, the reception component 1130 may receive a block ACK feedback message from the STA indicating that at least a portion of the set of PDUs has been successfully received. In some instances, the reception component 1130 may receive, from the STA, a BAR message, where the block ACK feedback message is transmitted in response to the BAR message. In some aspects, the reception component 1130 may receive, from the STA, a block ACK trigger frame, where the block ACK feedback message is transmitted in response to the block ACK trigger frame. In some examples, the reception component 1130 may receive, from a second AP of the set of member APs, a set of PDUs received by the second AP. In some cases, the set of PDUs is associated with a retransmission of a data packet to the STA.

The configuration component 1135 may configure the STA for an uplink shared block ACK session or a downlink shared block ACK session based on indicating the ID and the set of member APs. In some examples, the configuration component 1135 may associate the uplink shared block ACK session with multiple RAs corresponding to the set of member APs, a TA associated with the STA, and a TID associated with an uplink packet. In some cases, the configuration component 1135 may associate the downlink shared block ACK session with a RA associated with the STA, multiple TAs corresponding to the set of member APs, and a TID associated with an downlink packet. In some aspects, the configuration component 1135 may associate the uplink shared block ACK session or the downlink shared block ACK session with a virtual BSSID that corresponds to the set of member APs, where each AP of the set of member APs is associated with a respective BSSID.

In some cases, each RA of the multiple RAs corresponds to a MAC address or a BSSID of a member AP of the set of member APs. In some instances, each RA of the multiple RAs corresponds to a group address associated with the set of member APs or a MAC address of a wireless controller of the wireless communications system in communication with the set of member APs. In some examples, each TA of the multiple TAs corresponds to a MAC address or a BSSID of a member AP of the set of member APs. In some aspects, each TA of the multiple TAs corresponds to a group address associated with the set of member APs or a MAC address of a wireless controller of the wireless communications system in communication with the set of member APs. In some cases, the virtual BSSID is associated with a master AP of the set of member APs.

The monitoring component 1140 may monitor for a feedback message from the STA based on the transmitting. In some examples, the monitoring component 1140 may monitor the resources for the uplink transmission from the STA.

The window manager 1145 may modify a block ACK window position or duration based on the monitoring.

The scheduler 1150 may schedule an uplink transmission for the STA via resources of the shared radio frequency spectrum band.

Figure 12:
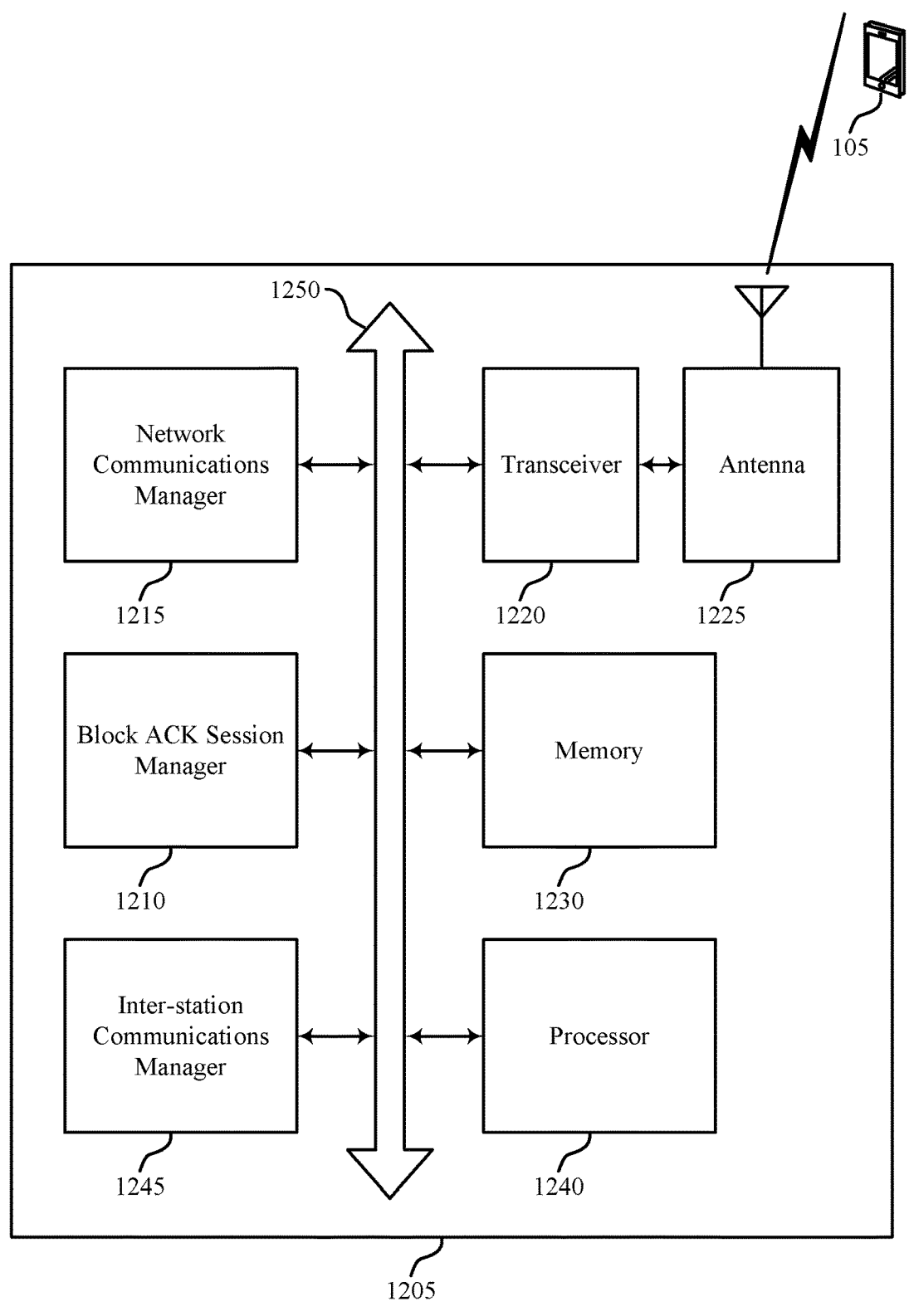
FIG. 12 shows a diagram of a system including a device that supports enhanced reliability techniques for shared spectrum in accordance with aspects of the present disclosure.

FIG. 12 shows a diagram of a system 1200 including a device 1205 that supports enhanced reliability techniques for shared spectrum in accordance with aspects of the present disclosure. The device 1205 may be an example of or include the components of device 905, device 1005, or an AP as described herein. The device 1205 may include components for bi-directional voice and data communications including components for transmitting and receiving communications, including a block ACK session manager 1210, a network communications manager 1215, a transceiver 1220, an antenna 1225, memory 1230, a processor 1240, and an inter-station communications manager 1245. These components may be in electronic communication via one or more buses (e.g., bus 1250).

The block ACK session manager 1210 may identify an ID (e.g., a group ID) associated with a shared block ACK session for one or more STAs, identify a set of member APs of a wireless communications system for the shared block ACK session, and indicate, to a STA via a shared radio frequency spectrum band, the ID and the set of member APs associated with the ID.

The network communications manager 1215 may manage communications with the core network (e.g., via one or more wired backhaul links). For example, the network communications manager 1215 may manage the transfer of data communications for client devices, such as one or more STAs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a Basic I/O System (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into processor 1240. The processor 1240 may be configured to execute computer-readable instructions stored in a memory to perform various functions (e.g., functions or tasks supporting enhanced reliability techniques for shared spectrum).

The inter-station communications manager 1245 may manage communications with other APs 105, and may include a controller or scheduler for controlling communications with STAs 115 in cooperation with other APs 105. For example, the inter-station communications manager 1245 may coordinate scheduling for transmissions to STAs 115 for various interference mitigation techniques such as beamforming or joint transmission. In some examples, the inter-station communications manager 1245 may provide an X2 interface (e.g., within an LTE/LTE-A wireless communication network technology) to provide communication between APs 105.

Figure 13:
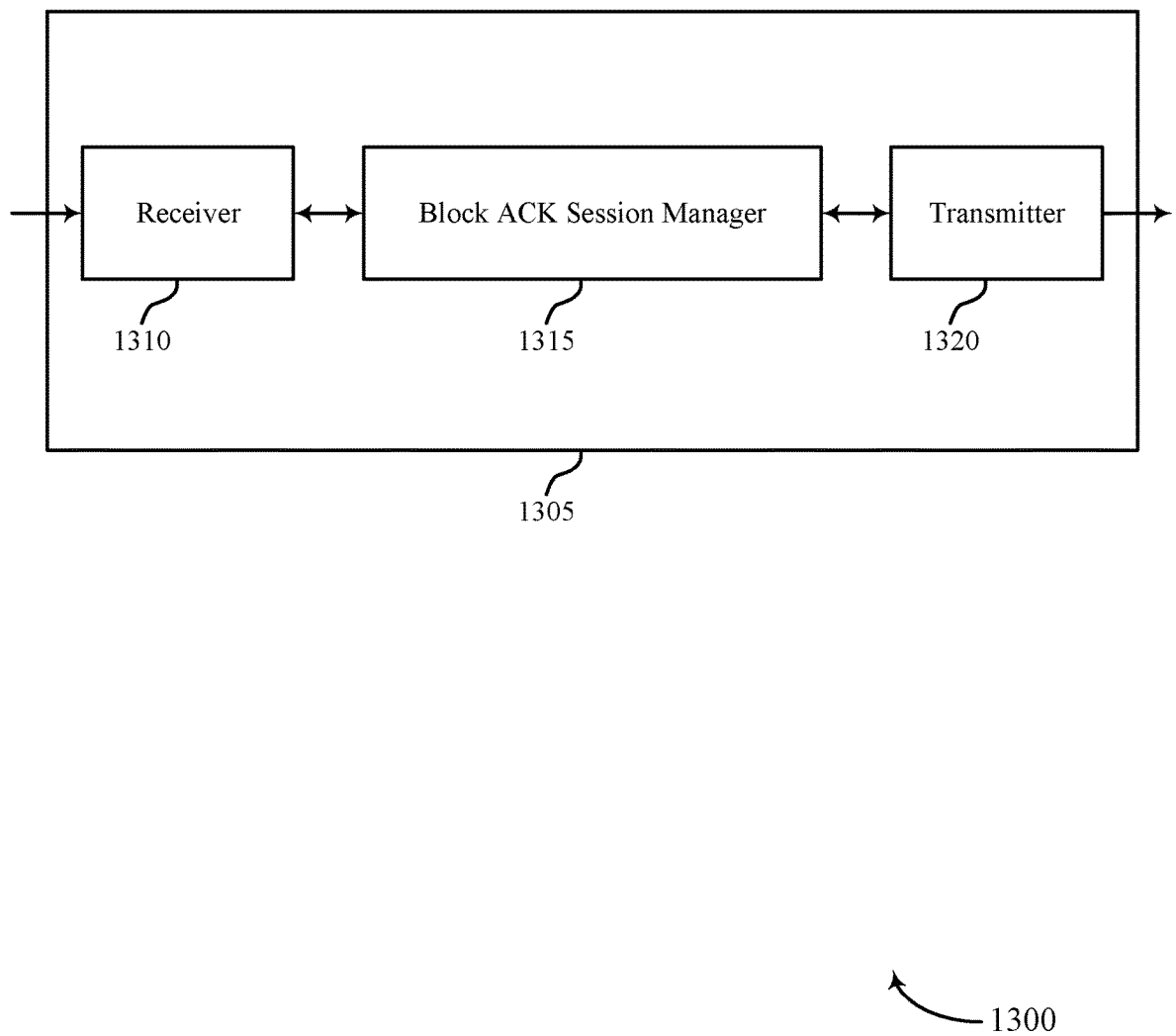
FIGS. 13 and 14 show block diagrams of devices that support enhanced reliability techniques for shared spectrum in accordance with aspects of the present disclosure.

FIG. 13 shows a block diagram 1300 of a device 1305 that supports enhanced reliability techniques for shared spectrum in accordance with aspects of the present disclosure. The device 1305 may be an example of aspects of a STA as described herein. The device 1305 may include a receiver 1310, a block ACK session manager 1315, and a transmitter 1320. The device 1305 may also include a processor. Each of these components may be in communication with one another (e.g., via one or more buses).

Receiver 1310 may receive information such as packets, user data, or control information associated with various information channels (e.g., control channels, data channels, and information related to enhanced reliability techniques for shared spectrum, etc.). Information may be passed on to other components of the device. The receiver 1310 may be an example of aspects of the transceiver 1620 described with reference to FIG. 16. The receiver 1310 may utilize a single antenna or a set of antennas.

The block ACK session manager 1315 may identify an ID (e.g., a group ID) associated with a shared block ACK session for the STA, determine a set of member APs of a wireless communications system for the shared block ACK session, associate with the set of member APs for participating in the shared block ACK session, and communicate with an AP of the set of member APs in accordance with the shared block ACK session. The block ACK session manager 1315 may be an example of aspects of the block ACK session manager 1610 described herein.

The block ACK session manager 1315, or its sub-components, may be implemented in hardware, code (e.g., software or firmware) executed by a processor, or any combination thereof. If implemented in code executed by a processor, the functions of the block ACK session manager 1315, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The block ACK session manager 1315, or its sub-components, may be physically located at various positions, including being distributed such that portions of functions are implemented at different physical locations by one or more physical components. In some examples, the block ACK session manager 1315, or its sub-components, may be a separate and distinct component in accordance with various aspects of the present disclosure. In some examples, the block ACK session manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

In some examples, the block ACK session manager 1315 may be implemented as an integrated circuit or chipset for a mobile device modem, and the receiver 1310 and transmitter 1320 may be implemented as analog components (e.g., amplifiers, filters, antennas) coupled with the mobile device modem to enable wireless transmission and reception over one or more bands. The wireless modem may be coupled to the receiver 1310 over a first interface and coupled to the transmitter 1320 over a second interface. In some examples, the wireless modem may obtain messages and signaling received at the receiver 1310 over the first interface. In other examples, the wireless modem may output messages or signaling for transmission by the transmitter 1320 over a second interface.

The actions performed by the block ACK session manager 1315 as described herein may be implemented to realize one or more potential advantages discussed herein. One implementation may facilitate packet-based aggregation through the shared block ACK sessions. Packet-based aggregation may in some cases provide improved UPT and sum throughput (e.g., for a single traffic flow or multiple traffic flows) relative to other aggregation architectures and non-aggregated communications. Further, the techniques provided herein may achieve increased spatial diversity by way of the communications between different APs and STAs. The increased spatial diversity may provide performance improvements for the device 1305, for example, in the case of fluctuations in blockage (e.g., physical blockage) of the communication links. For example, reliability may be relatively improved due to a higher probability of transmissions being successfully communications, and power may be conserved at the APs and the STAs due to fewer retransmission.

Based on implementing the feedback mechanism techniques as described herein, a processor of a STA (e.g., controlling the receiver 1310, the transmitter 1320, or the transceiver 1620 as described with reference to FIG. 16) may more efficiently utilize power and spectral resources, for example, due to mitigated duplicate transmission or reduced overhead used in signaling sequence numbers.

Figure 14:
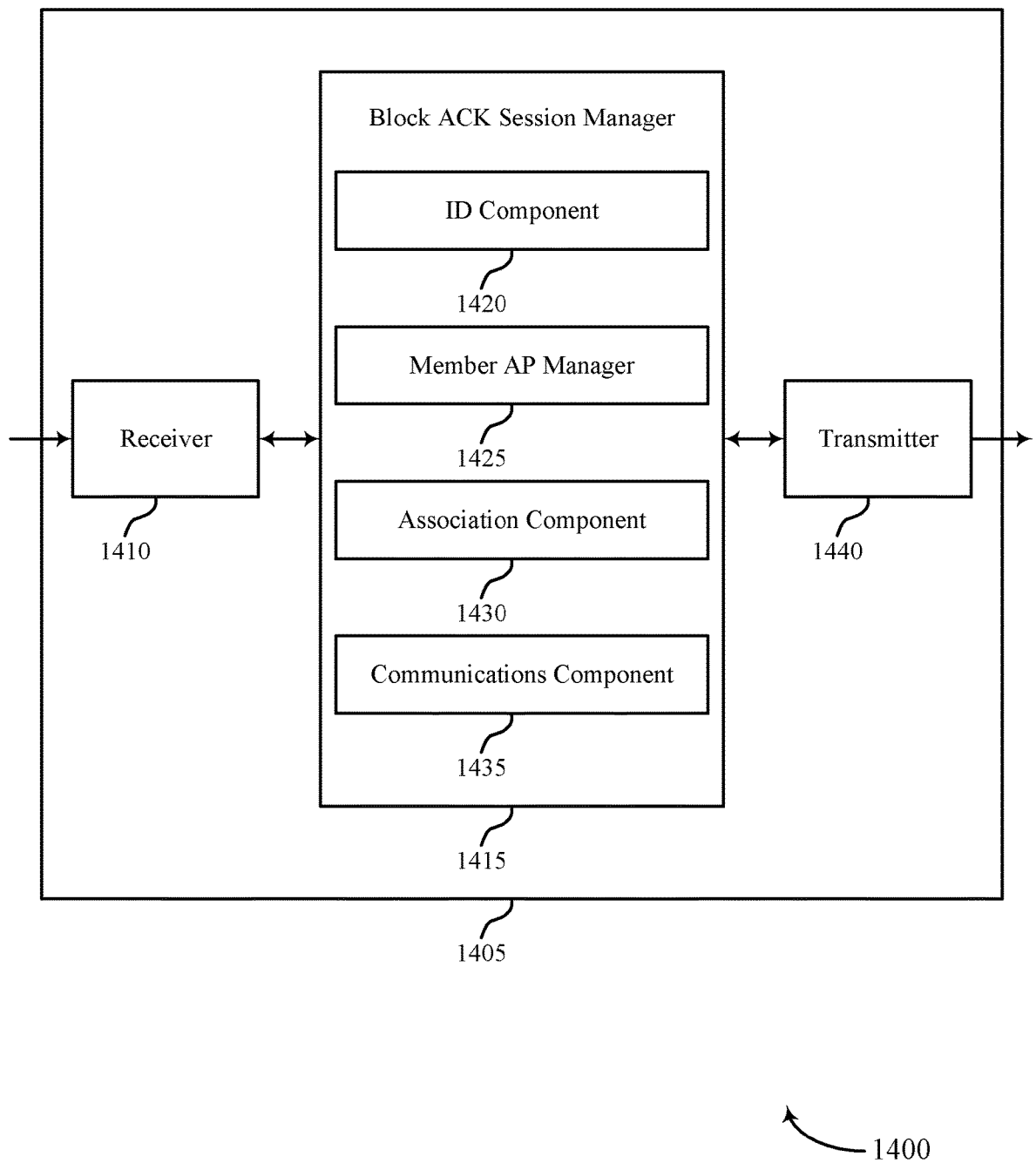

FIG. 14 shows a block diagram 1400 of a device 1405 that supports enhanced reliability techniques for shared spectrum in accordance with aspects of the present disclosure. The device 1405 may be an example of aspects of a device 1305 or a STA 115 as described herein. The device 1405 may include a receiver 1410, a block ACK session manager 1415, and a transmitter 1440. The device 1405 may also include a processor. Each of these components may be in communication with one another (e.g., via one or more buses).

Receiver 1410 may receive information such as packets, user data, or control information associated with various information channels (e.g., control channels, data channels, and information related to enhanced reliability techniques for shared spectrum, etc.). Information may be passed on to other components of the device. The receiver 1410 may be an example of aspects of the transceiver 1620 described with reference to FIG. 16. The receiver 1410 may utilize a single antenna or a set of antennas.

The block ACK session manager 1415 may be an example of aspects of the block ACK session manager 1315 as described herein. The block ACK session manager 1415 may include an ID component 1420, a member AP manager 1425, an association component 1430, and a communications component 1435. The block ACK session manager 1415 may be an example of aspects of the block ACK session manager 1610 described herein.

The ID component 1420 may identify an ID (e.g., a group ID) associated with a shared block ACK session for the STA.

The member AP manager 1425 may determine a set of member APs of a wireless communications system for the shared block ACK session. In some implementations, the actions performed by the member AP manager 1425, included in the block ACK session manager 1415, as described herein may facilitate the processor 1640, as described with reference to FIG. 16, to more efficiently cause the device 1405 to perform various functions. For example, the device 1405 may provide increased spatial diversity by way of the communications between different APs and STAs. The increased spatial diversity may provide performance improvements for the device 1405, for example, in the case of fluctuations in blockage (e.g., physical blockage) of the communication links. For example, resource utilization may be relatively improved by mitigating some of the duplicate transmission or reducing the overhead used in signaling sequence numbers. Thus, power and spectral resources may be conserved at the device 1405.

The association component 1430 may associate with the set of member APs for participating in the shared block ACK session.

The communications component 1435 may communicate with an AP of the set of member APs in accordance with the shared block ACK session.

Transmitter 1440 may transmit signals generated by other components of the device. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
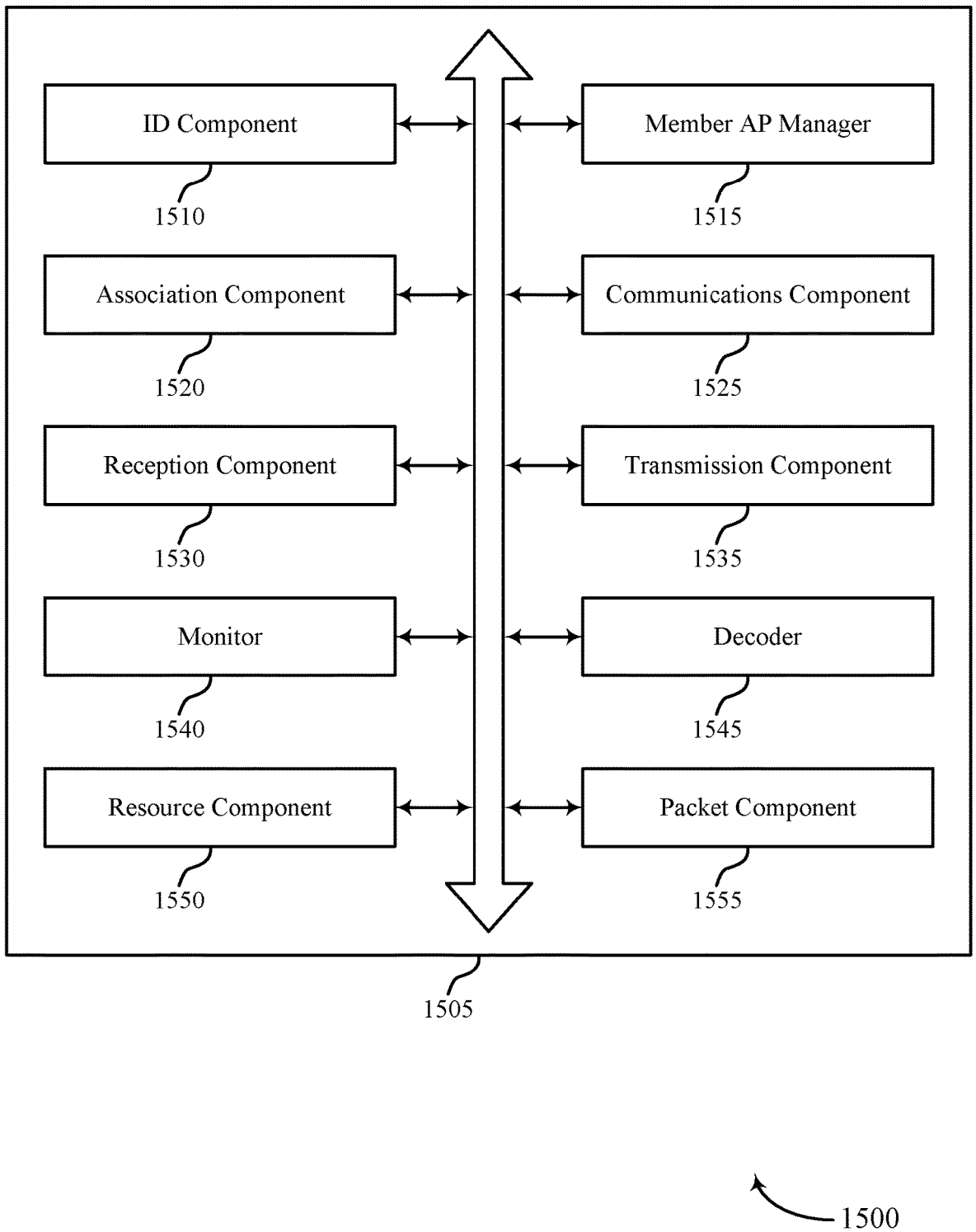
FIG. 15 shows a block diagram of a block ACK session manager that supports enhanced reliability techniques for shared spectrum in accordance with aspects of the present disclosure.

FIG. 15 shows a block diagram 1500 of a block ACK session manager 1505 that supports enhanced reliability techniques for shared spectrum in accordance with aspects of the present disclosure. The block ACK session manager 1505 may be an example of aspects of a block ACK session manager 1315, a block ACK session manager 1415, or a block ACK session manager 1610 described herein. The block ACK session manager 1505 may include an ID component 1510, a member AP manager 1515, an association component 1520, a communications component 1525, a reception component 1530, a transmission component 1535, a monitor 1540, a decoder 1545, a resource component 1550, and a packet component 1555. Each of these modules may communicate, directly or indirectly, with one another (e.g., via one or more buses).

The ID component 1510 may identify an ID (e.g., a group ID) associated with a shared block ACK session for the STA.

The member AP manager 1515 may determine a set of member APs of a wireless communications system for the shared block ACK session.

The association component 1520 may associate with the set of member APs for participating in the shared block ACK session.

The communications component 1525 may communicate with an AP of the set of member APs in accordance with the shared block ACK session.

The reception component 1530 may receive, from at least one AP of the set of member APs, a beacon including an information element that indicates the ID and the set of member APs. In some examples, the reception component 1530 may receive an association response message in response to the probe signal, where the association message indicates the ID or the set of member APs. In some cases, the reception component 1530 may receive, from the AP, an indication that the AP is a primary AP for the STA, where the indication that the AP is the primary AP is received via a PAF. In some examples, the reception component 1530 may receive a change message indicating that the primary AP for the STA has changed from the AP to a second AP. In some instances, the reception component 1530 may receive, from the AP, a set of PDUs of the downlink transmission based on a sequence number associated with the AP. In some aspects, the reception component 1530 may receive, from a second AP of the set of member APs, a second set of PDUs of the downlink transmission based on a sequence number associated with the second AP.

In some examples, the reception component 1530 may receive multiple downlink packets from respective APs of the set of member APs, where the block ACK feedback message is transmitted based on the multiple downlink packets. In some cases, the reception component 1530 may receive a BAR message from at least one AP of the set of member APs, where the block ACK feedback message is transmitted in response to the BAR message. In some aspects, the reception component 1530 may receive a block ACK trigger frame from at least one AP of the set of member APs, where the block ACK feedback message is transmitted in response to the block ACK trigger frame. In some instances, the reception component 1530 may receive a scheduling message that allocates the resources for transmission of the uplink data packet to the STA.

In some examples, the reception component 1530 may receive, from a first member AP, a block ACK feedback message indicating that at least a portion of the uplink data packet has been received. In some cases, the reception component 1530 may receive a second block ACK feedback message from the second member AP based on the BAR message, where the second block ACK feedback message indicates that a second portion of the uplink data packet has been received. In some aspects, the reception component 1530 may receive, from each of the member APs, a respective block ACK feedback message in response to the uplink trigger frame, where each block ACK feedback message indicates whether a portion of the uplink data packet has been successfully received by a respective member AP. In some instances, the reception component 1530 may receive a set of block ACK feedback messages from the set of member APs.

In some cases, the beacon is a broadcast DRS. In some examples, the information element includes a neighbor report element that carries the ID and the set of member APs, where the neighbor report element is associated with each of the set of member APs. In some aspects, the second set of PDUs is associated with a retransmission of at least a portion of the downlink transmission.

The transmission component 1535 may transmit a probe signal for discovery of one or more APs associated with the shared block ACK session. In some examples, the transmission component 1535 may determine whether to transmit a feedback message based on the monitoring. In some cases, the transmission component 1535 may transmit a block ACK feedback message based on the set of PDUs. In some instances, the transmission component 1535 may transmit a combined block ACK feedback message based on the set of PDUs and the second set of PDUs. In some aspects, the transmission component 1535 may transmit a second block ACK feedback message based on the set of PDUs, where the second block ACK feedback message is transmitted to the second AP.

In some examples, the transmission component 1535 may transmit the uplink data packet via the resources. In some cases, the transmission component 1535 may transmit the uplink data packet on a same channel to each member AP of the set of member APs. In some instances, the transmission component 1535 may transmit a BAR message to at least a second member AP of the set of member APs. In some aspects, the transmission component 1535 may transmit an uplink trigger frame to each of the member APs.

The monitor 1540 may monitor resources for reception of a downlink transmission.

The decoder 1545 may decode the multiple downlink packets from the respective APs. In some examples, the decoder 1545 may drop duplicate packets based on the decoding.

The resource component 1550 may identify resources for transmission of an uplink data packet.

The packet component 1555 may determine that a complete uplink data packet has not been successfully received. In some examples, the packet component 1555 may determine that the complete uplink data packet has been successfully received based on the first and second block ACK feedback messages. In some cases, the packet component 1555 may determine whether the uplink data packet has been successfully received based on a combination of the set of block ACK feedback messages.

Figure 16:
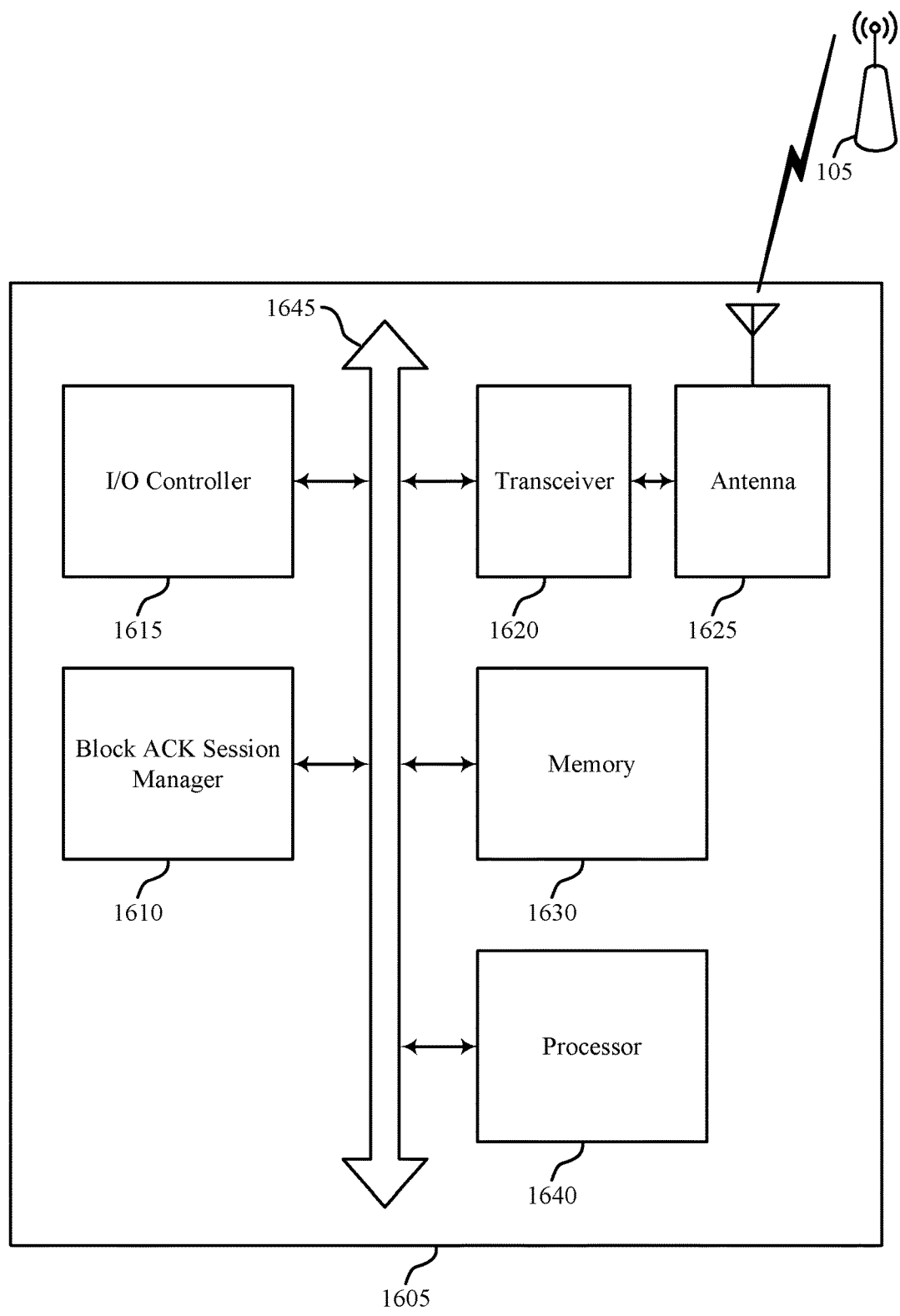
FIG. 16 shows a diagram of a system including a device that supports enhanced reliability techniques for shared spectrum in accordance with aspects of the present disclosure.

FIG. 16 shows a diagram of a system 1600 including a device 1605 that supports enhanced reliability techniques for shared spectrum in accordance with aspects of the present disclosure. The device 1605 may be an example of or include the components of device 1305, device 1405, or a STA as described herein. The device 1605 may include components for bi-directional voice and data communications including components for transmitting and receiving communications, including a block ACK session manager 1610, an I/O controller 1615, a transceiver 1620, an antenna 1625, memory 1630, and a processor 1640. These components may be in electronic communication via one or more buses (e.g., bus 1645).

The block ACK session manager 1610 may identify an ID (e.g., a group ID) associated with a shared block ACK session for the STA, determine a set of member APs of a wireless communications system for the shared block ACK session, associate with the set of member APs for participating in the shared block ACK session, and communicate with an AP of the set of member APs in accordance with the shared block ACK session.

I/O controller 1615 may manage input and output signals for device 1605. I/O controller 1615 may also manage peripherals not integrated into device 1605. In some cases, I/O controller 1615 may represent a physical connection or port to an external peripheral. In some cases, I/O controller 1615 may utilize an operating system such as iOS®, ANDROID®, MS-DOS®, MS-WINDOWS®, OS/2®, UNIX®, LINUX®, or another known operating system. In other cases, I/O controller 1615 may represent or interact with a modem, a keyboard, a mouse, a touchscreen, or a similar device. In some cases, I/O controller 1615 may be implemented as part of a processor. In some cases, a user may interact with device 1605 via I/O controller 1615 or via hardware components controlled by I/O controller 1615.

Transceiver 1620 may communicate bi-directionally, via one or more antennas, wired, or wireless links as described herein. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

Memory 1630 may include RAM and ROM. The memory 1630 may store computer-readable, computer-executable software 1635 including instructions that, when executed, cause the processor to perform various functions described herein. In some cases, the memory 1630 may contain, among other things, a BIOS which may control basic hardware or software operation such as the interaction with peripheral components or devices.

Processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1640 may be configured to operate a memory array using a memory controller. In other cases, a memory controller may be integrated into processor 1640. Processor 1640 may be configured to execute computer-readable instructions stored in a memory to perform various functions (e.g., functions or tasks supporting enhanced reliability techniques for shared spectrum).

Figure 17:
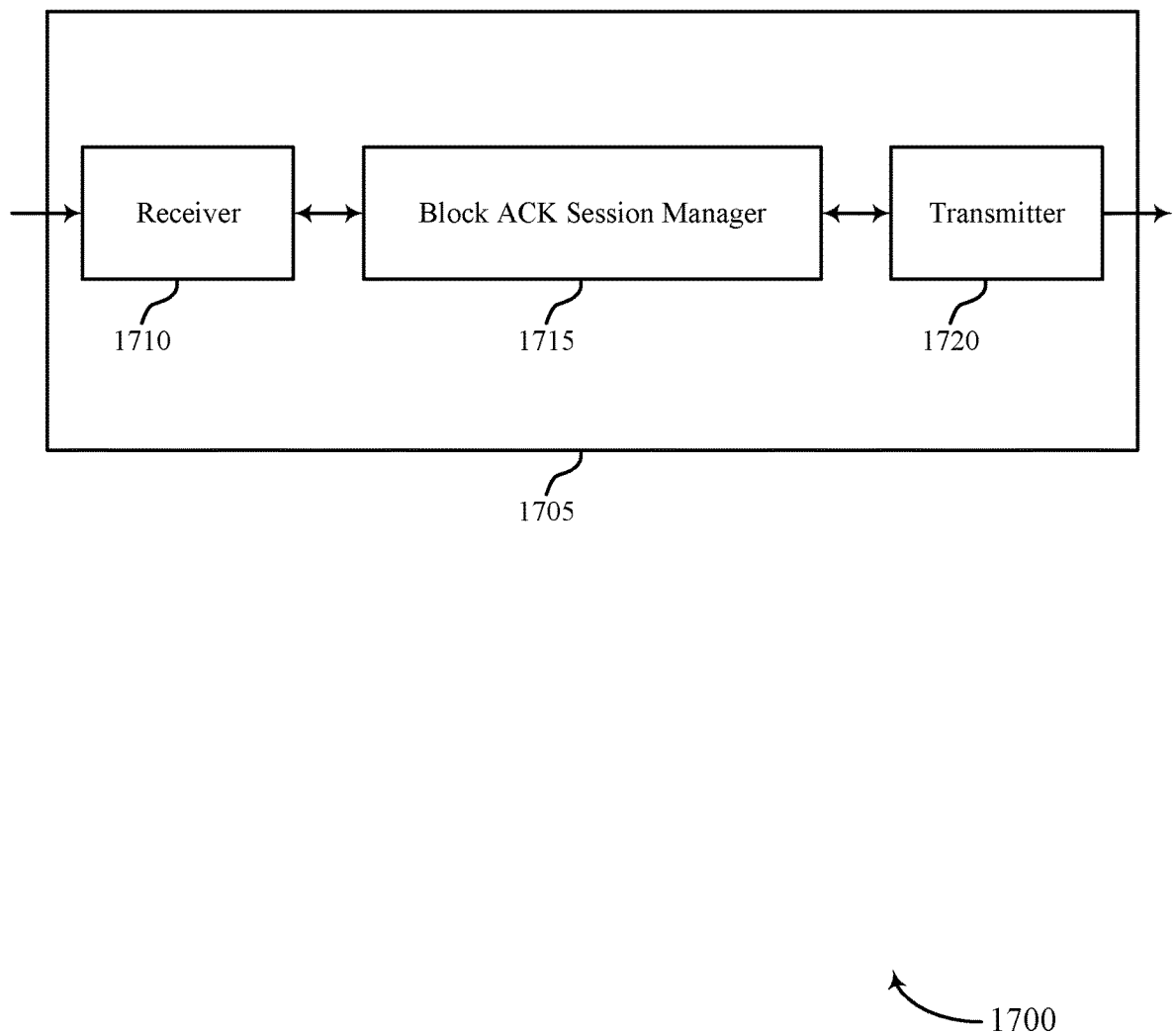
FIGS. 17 and 18 show block diagrams of devices that support enhanced reliability techniques for shared spectrum in accordance with aspects of the present disclosure.

FIG. 17 shows a block diagram 1700 of a device 1705 that supports enhanced reliability techniques for shared spectrum in accordance with aspects of the present disclosure. The device 1705 may be an example of aspects of a device as described herein. The device 1705 may include a receiver 1710, a block ACK session manager 1715, and a transmitter 1720. The device 1705 may also include a processor. Each of these components may be in communication with one another (e.g., via one or more buses).

The receiver 1710 may receive information such as packets, user data, or control information associated with various information channels (e.g., control channels, data channels, and information related to enhanced reliability techniques for shared spectrum, etc.). Information may be passed on to other components of the device 1705. The receiver 1710 may be an example of aspects of the transceiver 2020 described with reference to FIG. 20. The receiver 1710 may utilize a single antenna or a set of antennas.

The block ACK session manager 1715 may identify an ID (e.g., a group ID) associated with a shared block ACK session for a STA in a wireless communications system, determine a set of member APs of the wireless communications system for the shared block ACK session, and transmit an indication of a primary AP of the set of member APs to the primary AP. The block ACK session manager 1715 may be an example of aspects of the block ACK session manager 2010 described herein.

The block ACK session manager 1715, or its sub-components, may be implemented in hardware, code (e.g., software or firmware) executed by a processor, or any combination thereof. If implemented in code executed by a processor, the functions of the block ACK session manager 1715, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The block ACK session manager 1715, or its sub-components, may be physically located at various positions, including being distributed such that portions of functions are implemented at different physical locations by one or more physical components. In some examples, the block ACK session manager 1715, or its sub-components, may be a separate and distinct component in accordance with various aspects of the present disclosure. In some examples, the block ACK session manager 1715, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1720 may transmit signals generated by other components of the device 1705. In some examples, the transmitter 1720 may be collocated with a receiver 1710 in a transceiver module. For example, the transmitter 1720 may be an example of aspects of the transceiver 2020 described with reference to FIG. 20. The transmitter 1720 may utilize a single antenna or a set of antennas.

In some examples, the block ACK session manager 1715 may be implemented as an integrated circuit or chipset for a mobile device modem, and the receiver 1710 and transmitter 1720 may be implemented as analog components (e.g., amplifiers, filters, antennas) coupled with the mobile device modem to enable wireless transmission and reception over one or more bands. The wireless modem may be coupled to the receiver 1710 over a first interface and coupled to the transmitter 1720 over a second interface. In some examples, the wireless modem may obtain messages and signaling received at the receiver 1710 over the first interface. In other examples, the wireless modem may output messages or signaling for transmission by the transmitter 1720 over a second interface.

The actions performed by the block ACK session manager 1715 as described herein may be implemented to realize one or more potential advantages discussed herein. One implementation may facilitate packet-based aggregation through the shared block ACK sessions. Packet-based aggregation may in some cases provide improved UPT and sum throughput (e.g., for a single traffic flow or multiple traffic flows) relative to other aggregation architectures and non-aggregated communications. Further, the techniques provided herein may provide achieve spatial diversity by way of the communications between different APs and STAs. The increased spatial diversity may provide performance improvements for the device 1705, for example, in the case of fluctuations in blockage (e.g., physical blockage) of the communication links. For example, reliability may be relatively improved due to a higher probability of transmissions being successfully communications, and power may be conserved at the APs and the STAs due to fewer retransmission. Accordingly, a controller (e.g., at an AP) may utilize computing resources more efficiently.

Based on implementing the feedback mechanism techniques as described herein, a processor of a controller (e.g., at an AP, and, e.g., controlling the receiver 1710, the transmitter 1720, or the transceiver 2020 as described with reference to FIG. 20) may more efficiently utilize power and spectral resources, for example, due to mitigated duplicate transmission or reduced overhead used in signaling sequence numbers.

Figure 18:
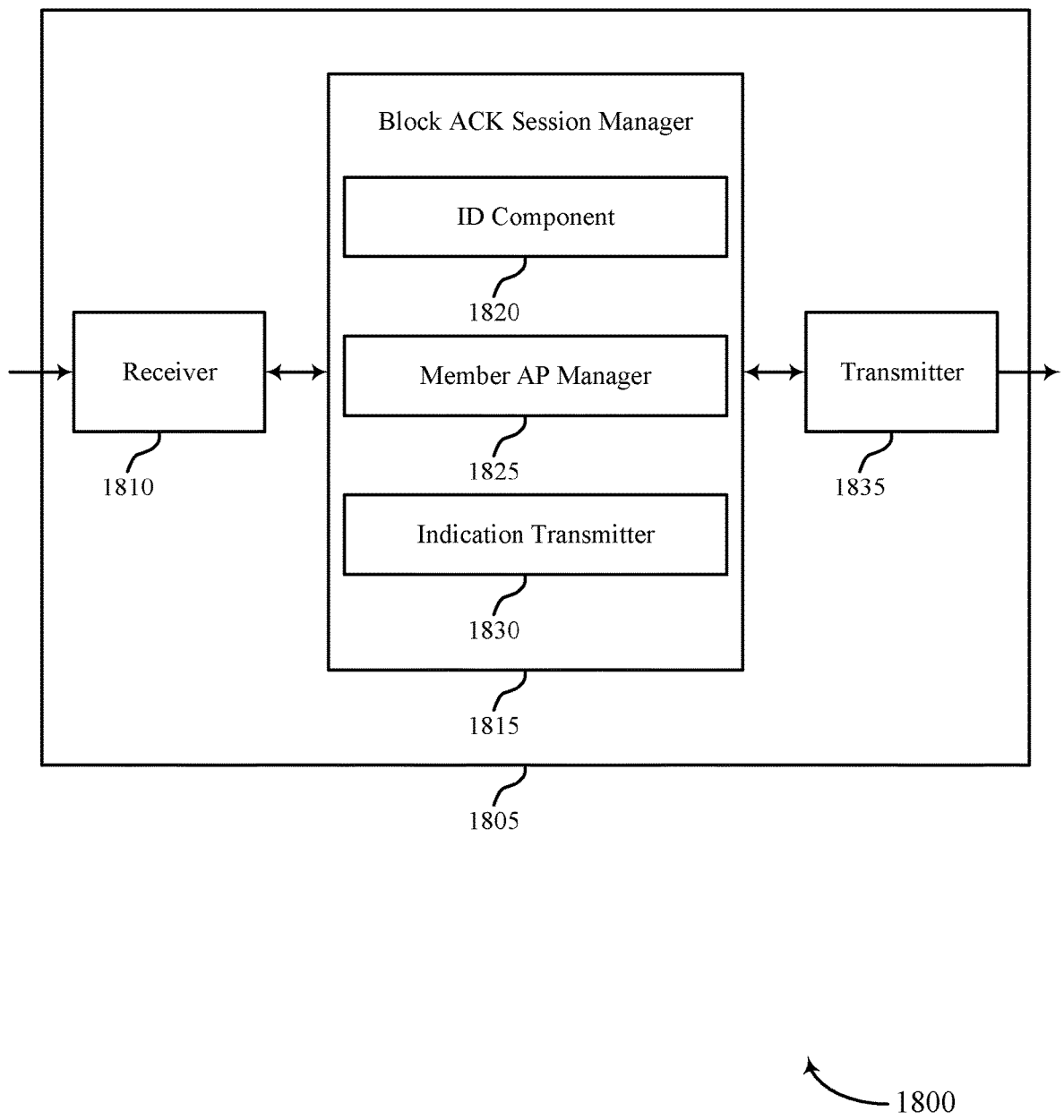

FIG. 18 shows a block diagram 1800 of a device 1805 that supports enhanced reliability techniques for shared spectrum in accordance with aspects of the present disclosure. The device 1805 may be an example of aspects of a device 1705 as described herein. The device 1805 may include a receiver 1810, a block ACK session manager 1815, and a transmitter 1835. The device 1805 may also include a processor. Each of these components may be in communication with one another (e.g., via one or more buses).

The receiver 1810 may receive information such as packets, user data, or control information associated with various information channels (e.g., control channels, data channels, and information related to enhanced reliability techniques for shared spectrum, etc.). Information may be passed on to other components of the device 1805. The receiver 1810 may be an example of aspects of the transceiver 2020 described with reference to FIG. 20. The receiver 1810 may utilize a single antenna or a set of antennas.

The block ACK session manager 1815 may be an example of aspects of the block ACK session manager 1715 as described herein. The block ACK session manager 1815 may include an ID component 1820, a member AP manager 1825, and an indication transmitter 1830. The block ACK session manager 1815 may be an example of aspects of the block ACK session manager 2010 described herein.

The ID component 1820 may identify an ID (e.g., a group ID) associated with a shared block ACK session for a STA in a wireless communications system.

The member AP manager 1825 may determine a set of member APs of the wireless communications system for the shared block ACK session.

In some implementations, the actions performed by the member AP manager 1825, included in the block ACK session manager 1815 as described herein may facilitate the processor 2040, as described with reference to FIG. 20, to more efficiently cause the device 1805 to perform various functions. For example, the described techniques may allow to device 1805 to provide increased spatial diversity by way of the communications between different respective APs and STAs. The increased spatial diversity may provide performance improvements for the device 1805, for example, in the case of fluctuations in blockage (e.g., physical blockage) of the communication links. For example, resource utilization may be relatively improved by mitigating some of the duplicate transmission or reducing the overhead used in signaling sequence numbers. Thus, power and spectral resources may be conserved at the device 1805, accordingly providing power savings and computing efficiency at the device 1805.

The indication transmitter 1830 may transmit an indication of a primary AP of the set of member APs to the primary AP.

The transmitter 1835 may transmit signals generated by other components of the device 1805. In some examples, the transmitter 1835 may be collocated with a receiver 1810 in a transceiver module. For example, the transmitter 1835 may be an example of aspects of the transceiver 2020 described with reference to FIG. 20. The transmitter 1835 may utilize a single antenna or a set of antennas.

Figure 19:
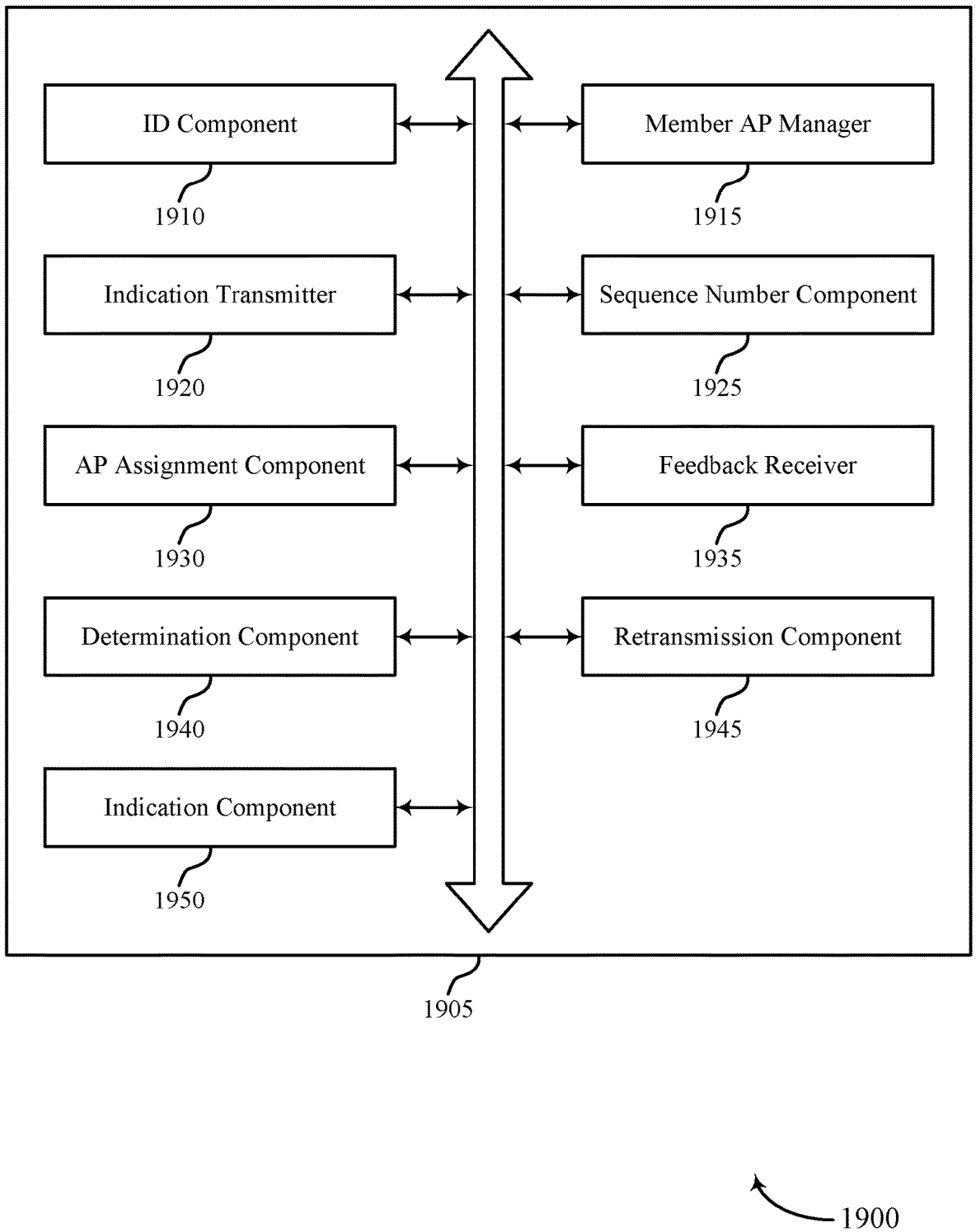
FIG. 19 shows a block diagram of a block ACK session manager that supports enhanced reliability techniques for shared spectrum in accordance with aspects of the present disclosure.

FIG. 19 shows a block diagram 1900 of a block ACK session manager 1905 that supports enhanced reliability techniques for shared spectrum in accordance with aspects of the present disclosure. The block ACK session manager 1905 may be an example of aspects of a block ACK session manager 1715, a block ACK session manager 1815, or a block ACK session manager 2010 described herein. The block ACK session manager 1905 may include an ID component 1910, a member AP manager 1915, an indication transmitter 1920, a sequence number component 1925, an AP assignment component 1930, a feedback receiver 1935, a determination component 1940, a retransmission component 1945, and an indication component 1950. Each of these modules may communicate, directly or indirectly, with one another (e.g., via one or more buses).

The ID component 1910 may identify an ID (e.g., a group ID) associated with a shared block ACK session for a STA in a wireless communications system.

The member AP manager 1915 may determine a set of member APs of the wireless communications system for the shared block ACK session.

The indication transmitter 1920 may transmit an indication of a primary AP of the set of member APs to the primary AP. In some examples, the indication transmitter 1920 may transmit, to a secondary AP of the set of member APs, an indication to retransmit the portion of the downlink transmission to the STA. In some cases, the indication to retransmit is via a channel different from the primary AP.

The sequence number component 1925 may transmit respective sequence numbers to each of the set of member APs via an upper layer communication link, where the respective sequence numbers are used for communications via respective physical layer communication links with the STA.

The AP assignment component 1930 may determine a change in channel conditions for the STA. In some examples, the AP assignment component 1930 may assign a second AP of the set of member APs as the primary AP for the STA. In some cases, the AP assignment component 1930 may transmit an indication of the change of the primary AP to at least one AP of the set of member APs or the STA.

The feedback receiver 1935 may receive, from the primary AP, a block ACK feedback message indicating that at least a portion of a downlink transmission to the STA was not successfully received. In some examples, the feedback receiver 1935 may receive multiple block ACK feedback messages from multiple APs of the set of member APs.

The determination component 1940 may determine whether a downlink transmission for the STA was successfully received based on a combination of the multiple block ACK feedback messages.

The retransmission component 1945 may determine a retransmission scheme for a downlink transmission to the STA. In some cases, the retransmission scheme indicates a simultaneous retransmission for multiple APs of the set of member APs. In some examples, the retransmission scheme indicates a sequential retransmission for multiple APs of the set of member APs.

The indication component 1950 may indicate the retransmission scheme to each of the set of member APs.

Figure 20:
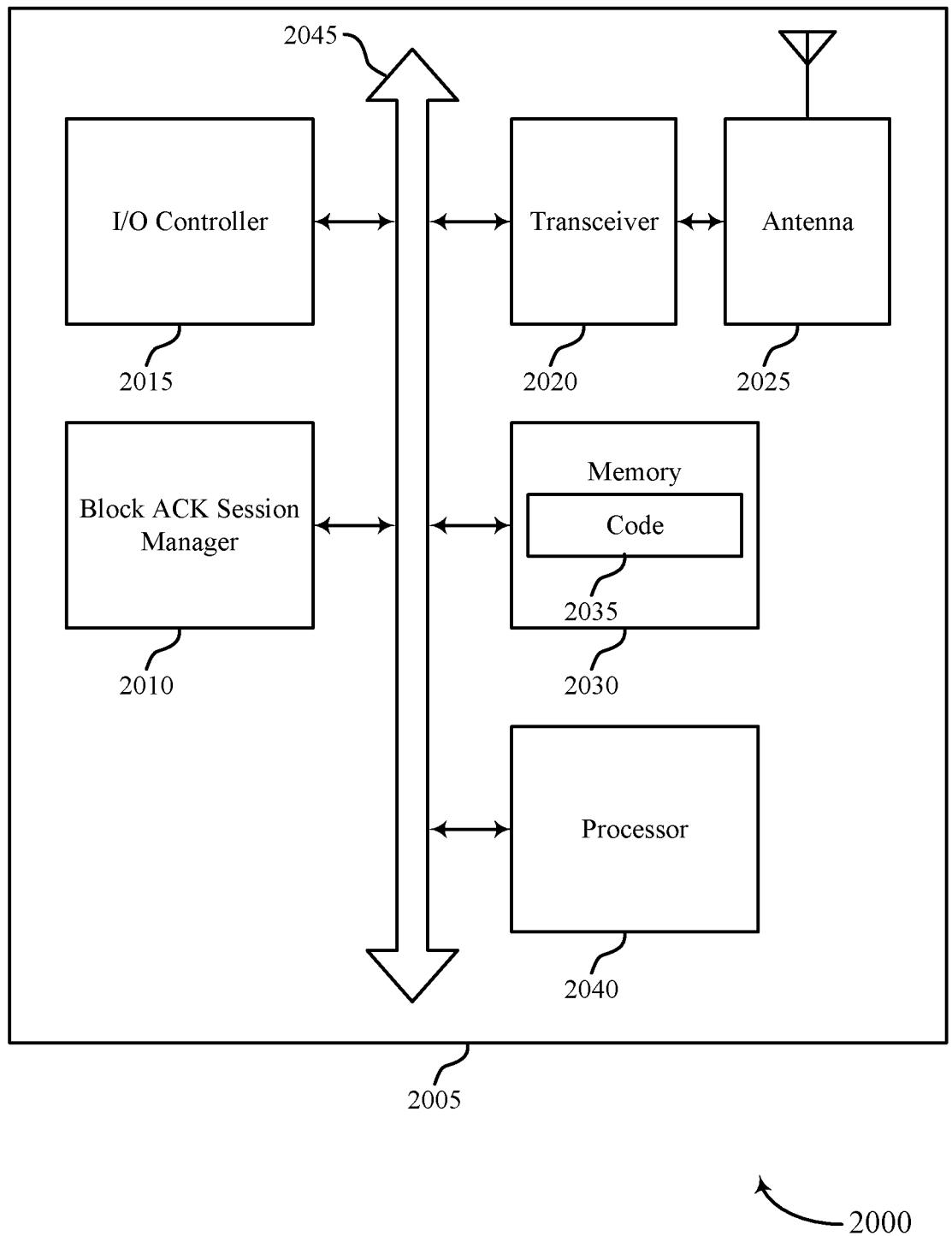
FIG. 20 shows a diagram of a system including a device that supports enhanced reliability techniques for shared spectrum in accordance with aspects of the present disclosure.

FIG. 20 shows a diagram of a system 2000 including a device 2005 that supports enhanced reliability techniques for shared spectrum in accordance with aspects of the present disclosure. The device 2005 may be an example of or include the components of device 1705, device 1805, or a device as described herein. The device 2005 may include components for bi-directional voice and data communications including components for transmitting and receiving communications, including a block ACK session manager 2010, an I/O controller 2015, a transceiver 2020, an antenna 2025, memory 2030, and a processor 2040. These components may be in electronic communication via one or more buses (e.g., bus 2045).

The block ACK session manager 2010 may identify an ID (e.g., a group ID) associated with a shared block ACK session for a STA in a wireless communications system, determine a set of member APs of the wireless communications system for the shared block ACK session, and transmit an indication of a primary AP of the set of member APs to the primary AP.

The I/O controller 2015 may manage input and output signals for the device 2005. The I/O controller 2015 may also manage peripherals not integrated into the device 2005. In some cases, the I/O controller 2015 may represent a physical connection or port to an external peripheral. In some cases, the I/O controller 2015 may utilize an operating system such as iOS®, ANDROID®, MS-DOS®, MS-WINDOWS®, OS/2®, UNIX®, LINUX®, or another known operating system. In other cases, the I/O controller 2015 may represent or interact with a modem, a keyboard, a mouse, a touchscreen, or a similar device. In some cases, the I/O controller 2015 may be implemented as part of a processor. In some cases, a user may interact with the device 2005 via the I/O controller 2015 or via hardware components controlled by the I/O controller 2015.

The transceiver 2020 may communicate bi-directionally, via one or more antennas, wired, or wireless links as described herein. For example, the transceiver 2020 may represent a wireless transceiver and may communicate bi-directionally with another wireless transceiver. The transceiver 2020 may also include a modem to modulate the packets and provide the modulated packets to the antennas for transmission, and to demodulate packets received from the antennas.

In some cases, the wireless device may include a single antenna 2025. However, in some cases the device may have more than one antenna 2025, which may be capable of concurrently transmitting or receiving multiple wireless transmissions.

The memory 2030 may include RAM and ROM. The memory 2030 may store computer-readable, computer-executable code 2035 including instructions that, when executed, cause the processor to perform various functions described herein. In some cases, the memory 2030 may contain, among other things, a BIOS which may control basic hardware or software operation such as the interaction with peripheral components or devices.

The processor 2040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2040 may be configured to operate a memory array using a memory controller. In other cases, a memory controller may be integrated into the processor 2040. The processor 2040 may be configured to execute computer-readable instructions stored in a memory (e.g., the memory 2030) to cause the device 2005 to perform various functions (e.g., functions or tasks supporting enhanced reliability techniques for shared spectrum).

The code 2035 may include instructions to implement aspects of the present disclosure, including instructions to support wireless communications. The code 2035 may be stored in a non-transitory computer-readable medium such as system memory or other type of memory. In some cases, the code 2035 may not be directly executable by the processor 2040 but may cause a computer (e.g., when compiled and executed) to perform functions described herein.

Figure 21:
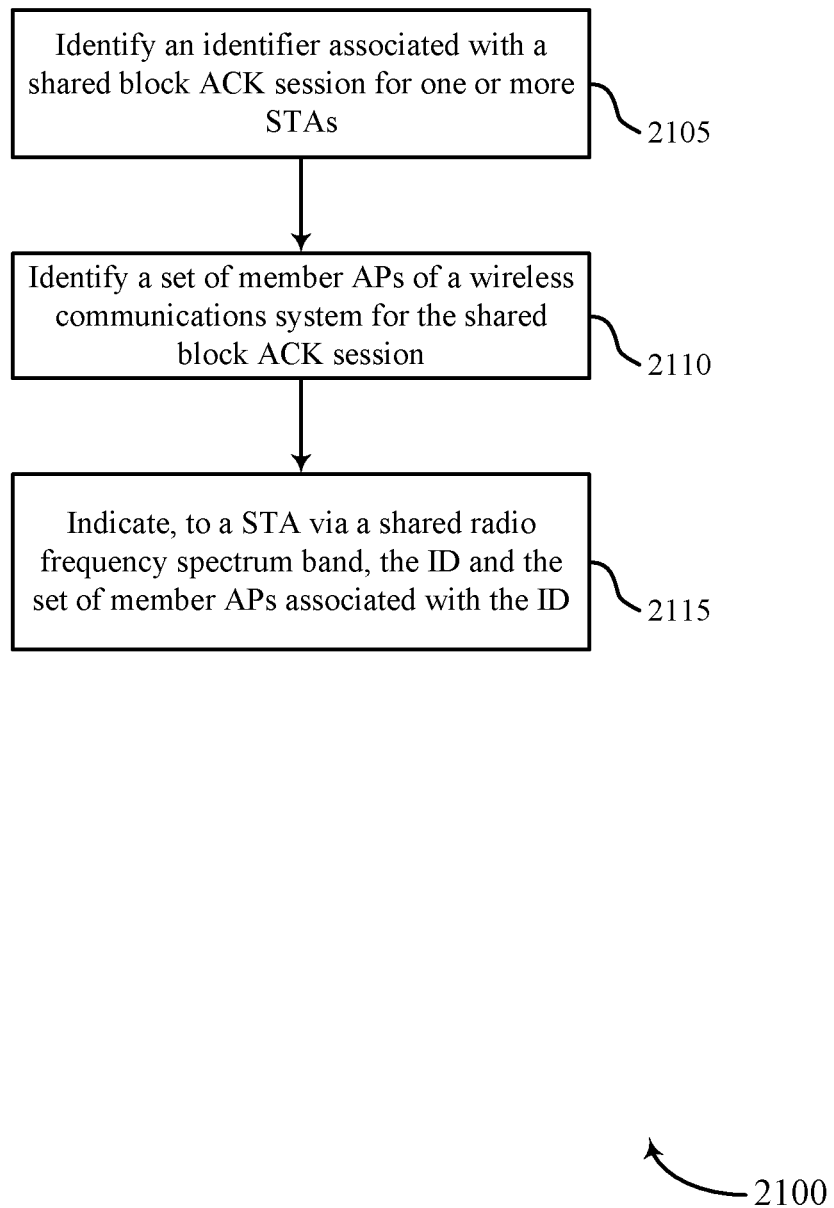
FIGS. 21 through 27 show flowcharts illustrating methods that support enhanced reliability techniques for shared spectrum in accordance with aspects of the present disclosure.

FIG. 21 shows a flowchart illustrating a method 2100 that supports enhanced reliability techniques for shared spectrum in accordance with aspects of the present disclosure. The operations of method 2100 may be implemented by an AP or its components as described herein. For example, the operations of method 2100 may be performed by a block ACK session manager as described with reference to FIGS. 9 through 12. In some examples, an AP may execute a set of instructions to control the functional elements of the AP to perform the functions described herein. Additionally or alternatively, an AP may perform aspects of the functions described herein using special-purpose hardware.

At 2105, the AP may identify an ID (e.g., a group ID) associated with a shared block ACK session for one or more STAs. The operations of 2105 may be performed according to the methods described herein. In some examples, aspects of the operations of 2105 may be performed by an ID component as described with reference to FIGS. 9 through 12.

At 2110, the AP may identify a set of member APs of a wireless communications system for the shared block ACK session. The operations of 2110 may be performed according to the methods described herein. In some examples, aspects of the operations of 2110 may be performed by a member AP manager as described with reference to FIGS. 9 through 12.

At 2115, the AP may indicate, to a STA via a shared radio frequency spectrum band, the ID and the set of member APs associated with the ID. The operations of 2115 may be performed according to the methods described herein. In some examples, aspects of the operations of 2115 may be performed by an indication component as described with reference to FIGS. 9 through 12.

Figure 22:
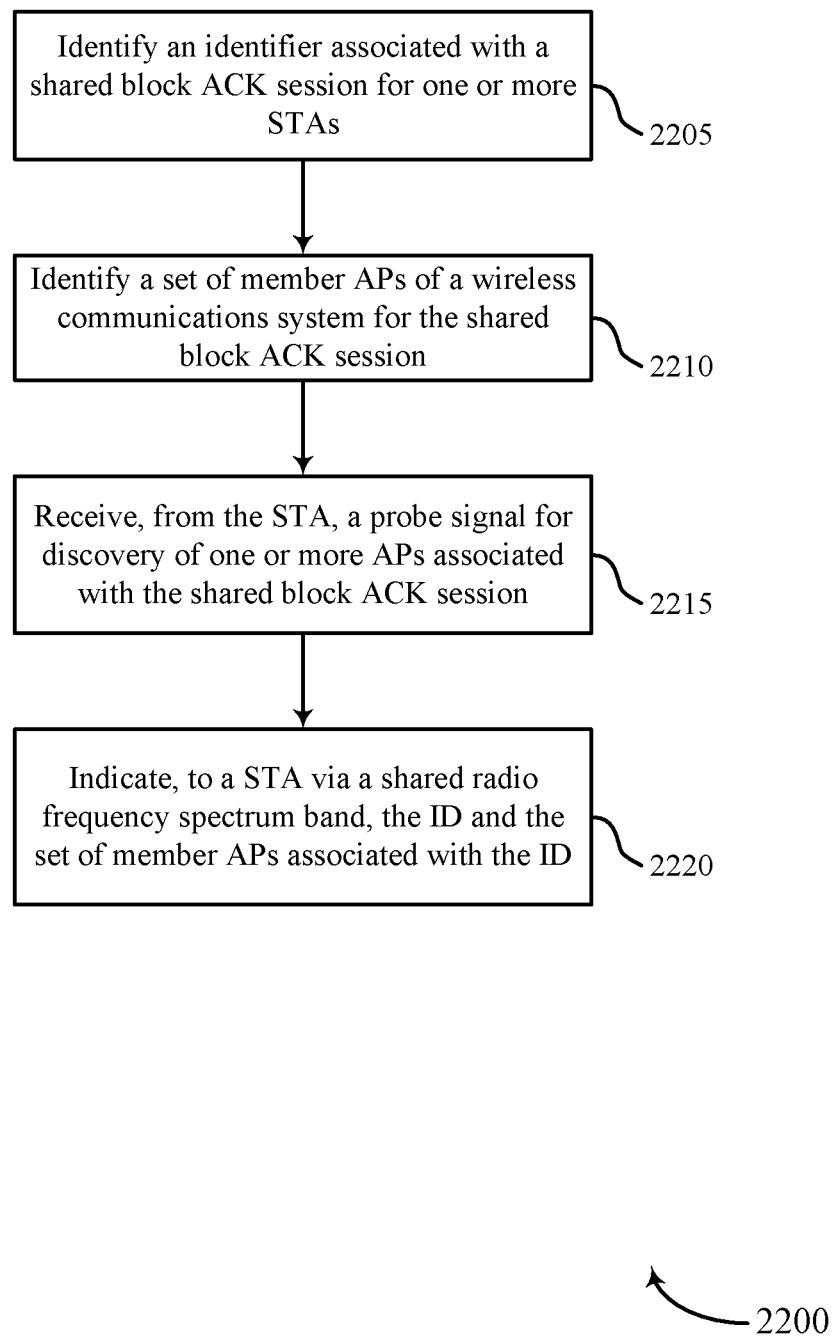

FIG. 22 shows a flowchart illustrating a method 2200 that supports enhanced reliability techniques for shared spectrum in accordance with aspects of the present disclosure. The operations of method 2200 may be implemented by an AP or its components as described herein. For example, the operations of method 2200 may be performed by a block ACK session manager as described with reference to FIGS. 9 through 12. In some examples, an AP may execute a set of instructions to control the functional elements of the AP to perform the functions described herein. Additionally or alternatively, an AP may perform aspects of the functions described herein using special-purpose hardware.

At 2205, the AP may identify an ID (e.g., a group ID) associated with a shared block ACK session for one or more STAs. The operations of 2205 may be performed according to the methods described herein. In some examples, aspects of the operations of 2205 may be performed by an ID component as described with reference to FIGS. 9 through 12.

At 2210, the AP may identify a set of member APs of a wireless communications system for the shared block ACK session. The operations of 2210 may be performed according to the methods described herein. In some examples, aspects of the operations of 2210 may be performed by a member AP manager as described with reference to FIGS. 9 through 12.

At 2215, the AP may receive, from the STA, a probe signal for discovery of one or more APs associated with the shared block ACK session. The operations of 2215 may be performed according to the methods described herein. In some examples, aspects of the operations of 2215 may be performed by a reception component as described with reference to FIGS. 9 through 12.

At 2220, the AP may indicate, to a STA via a shared radio frequency spectrum band, the ID and the set of member APs associated with the ID. The operations of 2220 may be performed according to the methods described herein. In some examples, aspects of the operations of 2220 may be performed by an indication component as described with reference to FIGS. 9 through 12.

Figure 23:
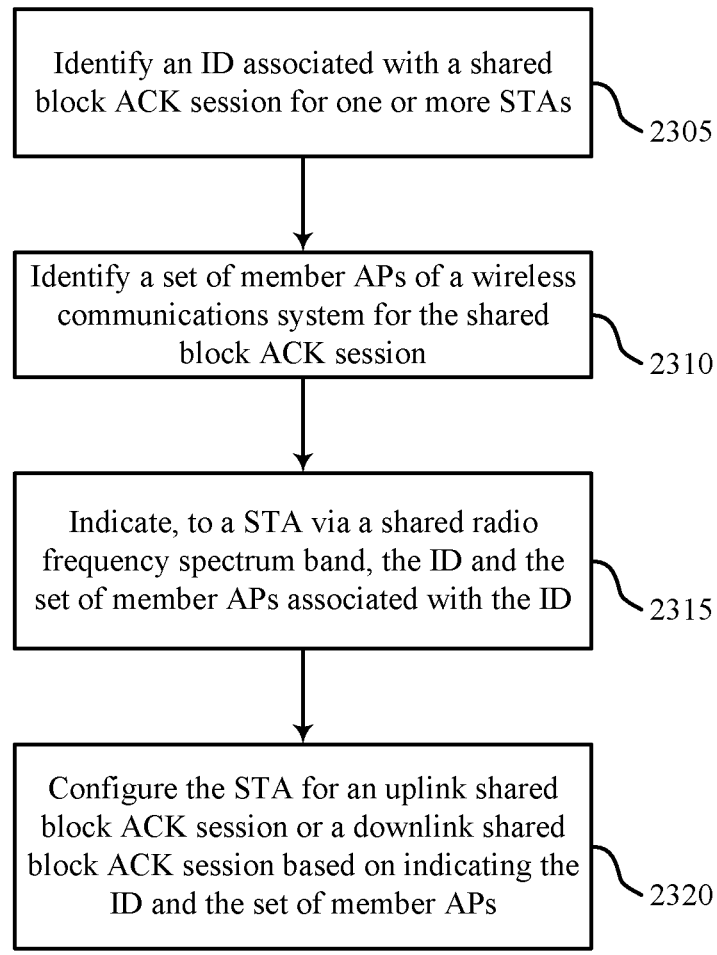

FIG. 23 shows a flowchart illustrating a method 2300 that supports enhanced reliability techniques for shared spectrum in accordance with aspects of the present disclosure. The operations of method 2300 may be implemented by an AP or its components as described herein. For example, the operations of method 2300 may be performed by a block ACK session manager as described with reference to FIGS. 9 through 12. In some examples, an AP may execute a set of instructions to control the functional elements of the AP to perform the functions described herein. Additionally or alternatively, an AP may perform aspects of the functions described herein using special-purpose hardware.

At 2305, the AP may identify an ID (e.g., a group ID) associated with a shared block ACK session for one or more STAs. The operations of 2305 may be performed according to the methods described herein. In some examples, aspects of the operations of 2305 may be performed by an ID component as described with reference to FIGS. 9 through 12.

At 2310, the AP may identify a set of member APs of a wireless communications system for the shared block ACK session. The operations of 2310 may be performed according to the methods described herein. In some examples, aspects of the operations of 2310 may be performed by a member AP manager as described with reference to FIGS. 9 through 12.

At 2315, the AP may indicate, to a STA via a shared radio frequency spectrum band, the ID and the set of member APs associated with the ID. The operations of 2315 may be performed according to the methods described herein. In some examples, aspects of the operations of 2315 may be performed by an indication component as described with reference to FIGS. 9 through 12.

At 2320, the AP may configure the STA for an uplink shared block ACK session or a downlink shared block ACK session based on indicating the ID and the set of member APs. The operations of 2320 may be performed according to the methods described herein. In some examples, aspects of the operations of 2320 may be performed by a configuration component as described with reference to FIGS. 9 through 12.

Figure 24:
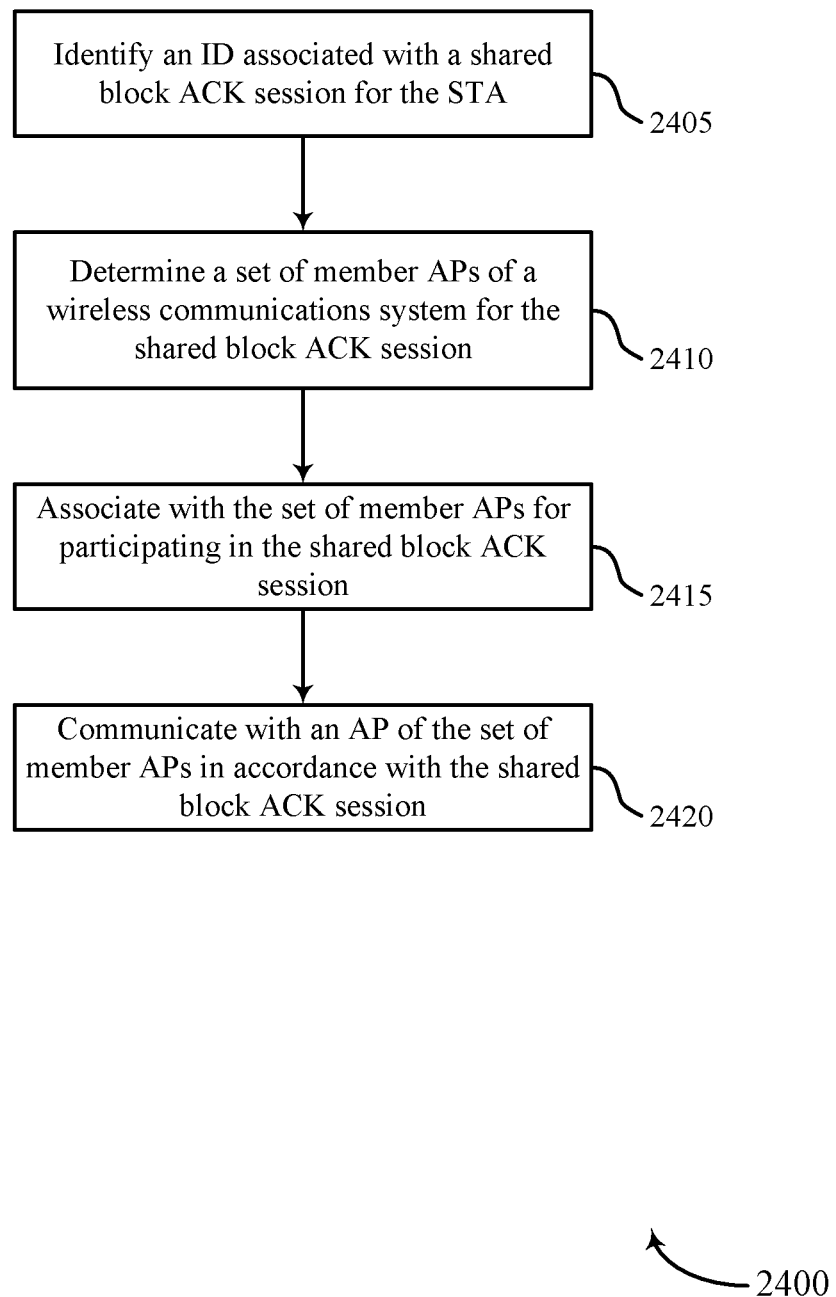

FIG. 24 shows a flowchart illustrating a method 2400 that supports enhanced reliability techniques for shared spectrum in accordance with aspects of the present disclosure. The operations of method 2400 may be implemented by a STA or its components as described herein. For example, the operations of method 2400 may be performed by a block ACK session manager as described with reference to FIGS. 13 through 16. In some examples, a STA may execute a set of instructions to control the functional elements of the STA to perform the functions described herein. Additionally or alternatively, a STA may perform aspects of the functions described herein using special-purpose hardware.

At 2405, the STA may identify an ID (e.g., a group ID) associated with a shared block ACK session for the STA. The operations of 2405 may be performed according to the methods described herein. In some examples, aspects of the operations of 2405 may be performed by an ID component as described with reference to FIGS. 13 through 16.

At 2410, the STA may determine a set of member APs of a wireless communications system for the shared block ACK session. The operations of 2410 may be performed according to the methods described herein. In some examples, aspects of the operations of 2410 may be performed by a member AP manager as described with reference to FIGS. 13 through 16.

At 2415, the STA may associate with the set of member APs for participating in the shared block ACK session. The operations of 2415 may be performed according to the methods described herein. In some examples, aspects of the operations of 2415 may be performed by an association component as described with reference to FIGS. 13 through 16.

At 2420, the STA may communicate with an AP of the set of member APs in accordance with the shared block ACK session. The operations of 2420 may be performed according to the methods described herein. In some examples, aspects of the operations of 2420 may be performed by a communications component as described with reference to FIGS. 13 through 16.

Figure 25:
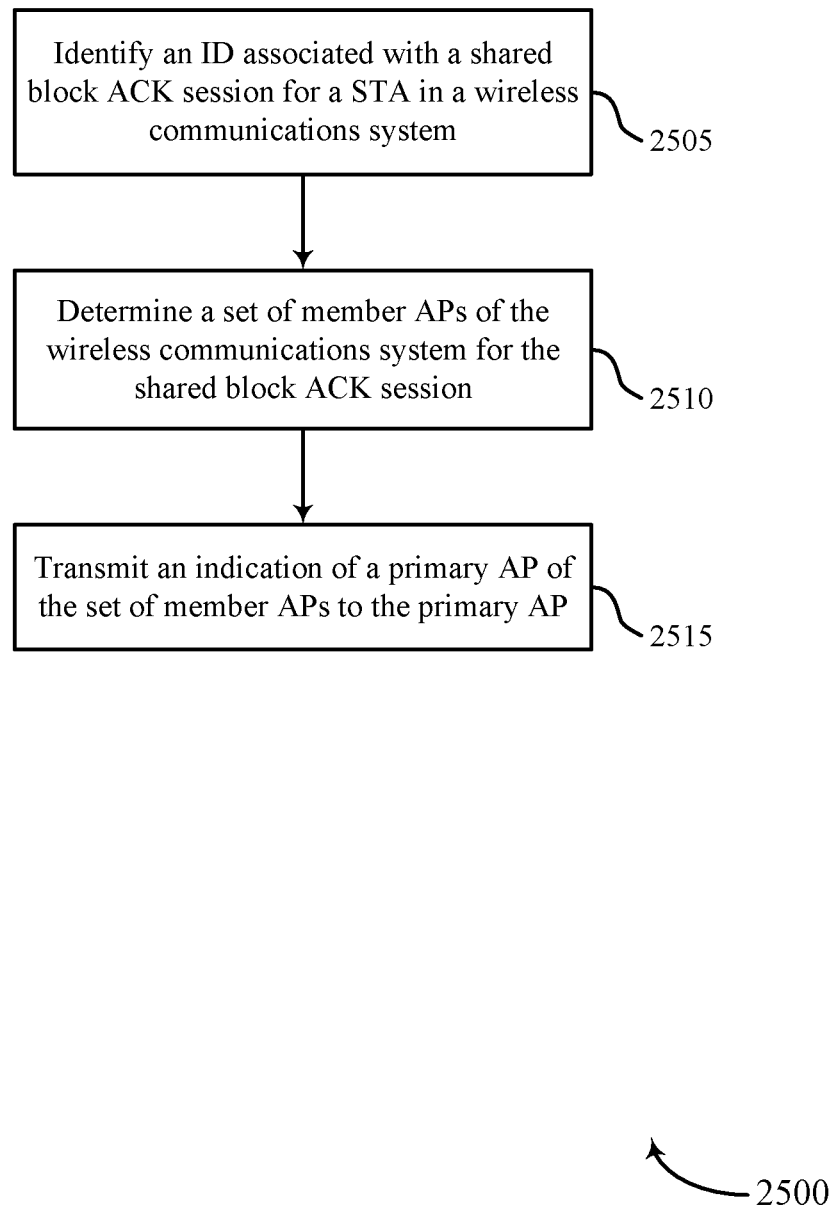

FIG. 25 shows a flowchart illustrating a method 2500 that supports enhanced reliability techniques for shared spectrum in accordance with aspects of the present disclosure. The operations of method 2500 may be implemented by a device or its components as described herein. For example, the operations of method 2500 may be performed by a block ACK session manager as described with reference to FIGS. 17 through 20. In some examples, a device may execute a set of instructions to control the functional elements of the device to perform the functions described herein. Additionally or alternatively, a device may perform aspects of the functions described herein using special-purpose hardware.

At 2505, the device may identify an ID (e.g., a group ID) associated with a shared block ACK session for a STA in a wireless communications system. The operations of 2505 may be performed according to the methods described herein. In some examples, aspects of the operations of 2505 may be performed by an ID component as described with reference to FIGS. 17 through 20.

At 2510, the device may determine a set of member APs of the wireless communications system for the shared block ACK session. The operations of 2510 may be performed according to the methods described herein. In some examples, aspects of the operations of 2510 may be performed by a member AP manager as described with reference to FIGS. 17 through 20.

At 2515, the device may transmit an indication of a primary AP of the set of member APs to the primary AP. The operations of 2515 may be performed according to the methods described herein. In some examples, aspects of the operations of 2515 may be performed by an indication transmitter as described with reference to FIGS. 17 through 20.

Figure 26:
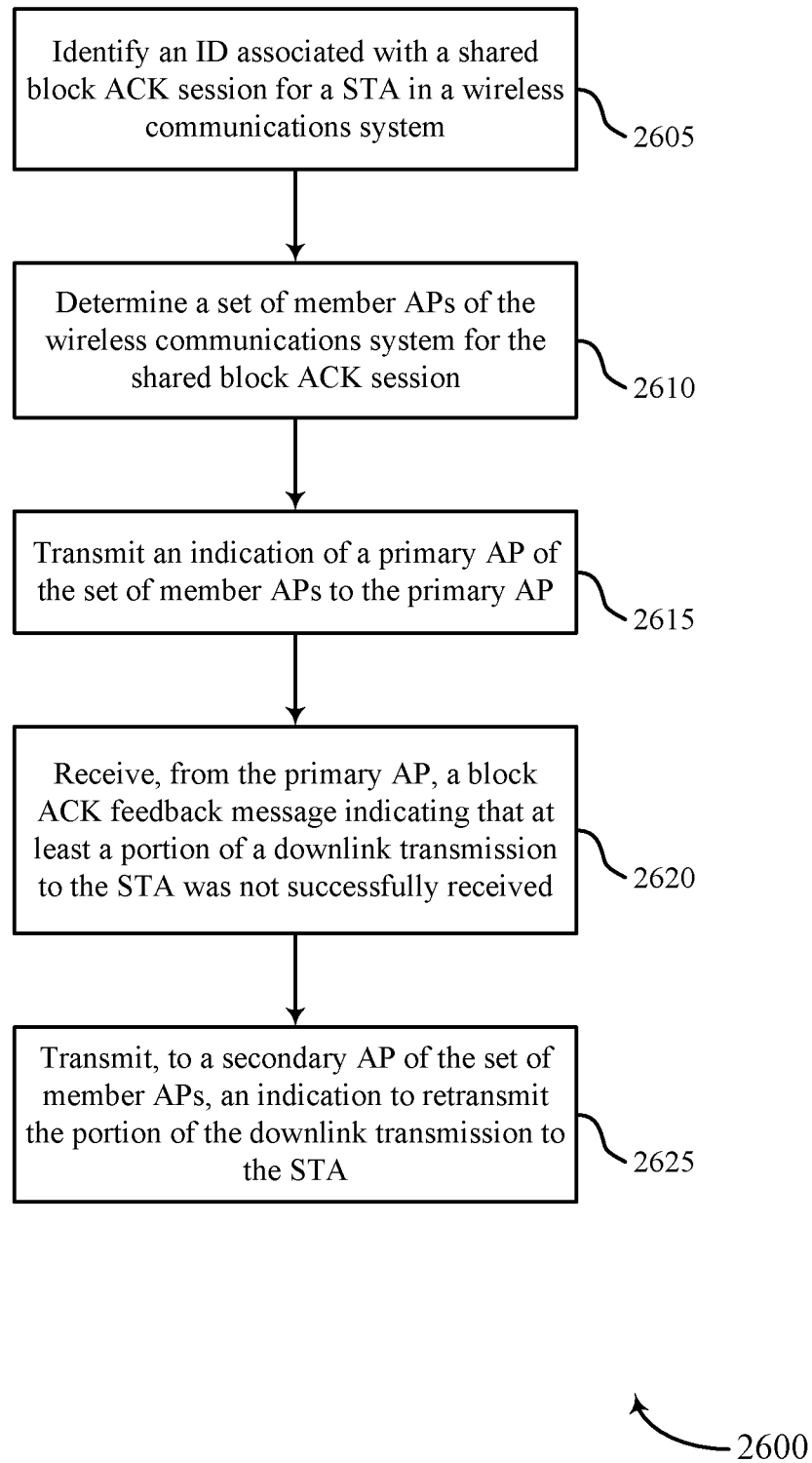

FIG. 26 shows a flowchart illustrating a method 2600 that supports enhanced reliability techniques for shared spectrum in accordance with aspects of the present disclosure. The operations of method 2600 may be implemented by a device or its components as described herein. For example, the operations of method 2600 may be performed by a block ACK session manager as described with reference to FIGS. 17 through 20. In some examples, a device may execute a set of instructions to control the functional elements of the device to perform the functions described herein. Additionally or alternatively, a device may perform aspects of the functions described herein using special-purpose hardware.

At 2605, the device may identify an ID (e.g., a group ID) associated with a shared block ACK session for a STA in a wireless communications system. The operations of 2605 may be performed according to the methods described herein. In some examples, aspects of the operations of 2605 may be performed by an ID component as described with reference to FIGS. 17 through 20.

At 2610, the device may determine a set of member APs of the wireless communications system for the shared block ACK session. The operations of 2610 may be performed according to the methods described herein. In some examples, aspects of the operations of 2610 may be performed by a member AP manager as described with reference to FIGS. 17 through 20.

At 2615, the device may transmit an indication of a primary AP of the set of member APs to the primary AP. The operations of 2615 may be performed according to the methods described herein. In some examples, aspects of the operations of 2615 may be performed by an indication transmitter as described with reference to FIGS. 17 through 20.

At 2620, the device may receive, from the primary AP, a block ACK feedback message indicating that at least a portion of a downlink transmission to the STA was not successfully received. The operations of 2620 may be performed according to the methods described herein. In some examples, aspects of the operations of 2620 may be performed by a feedback receiver as described with reference to FIGS. 17 through 20.

At 2625, the device may transmit, to a secondary AP of the set of member APs, an indication to retransmit the portion of the downlink transmission to the STA. The operations of 2625 may be performed according to the methods described herein. In some examples, aspects of the operations of 2625 may be performed by an indication transmitter as described with reference to FIGS. 17 through 20.

Figure 27:
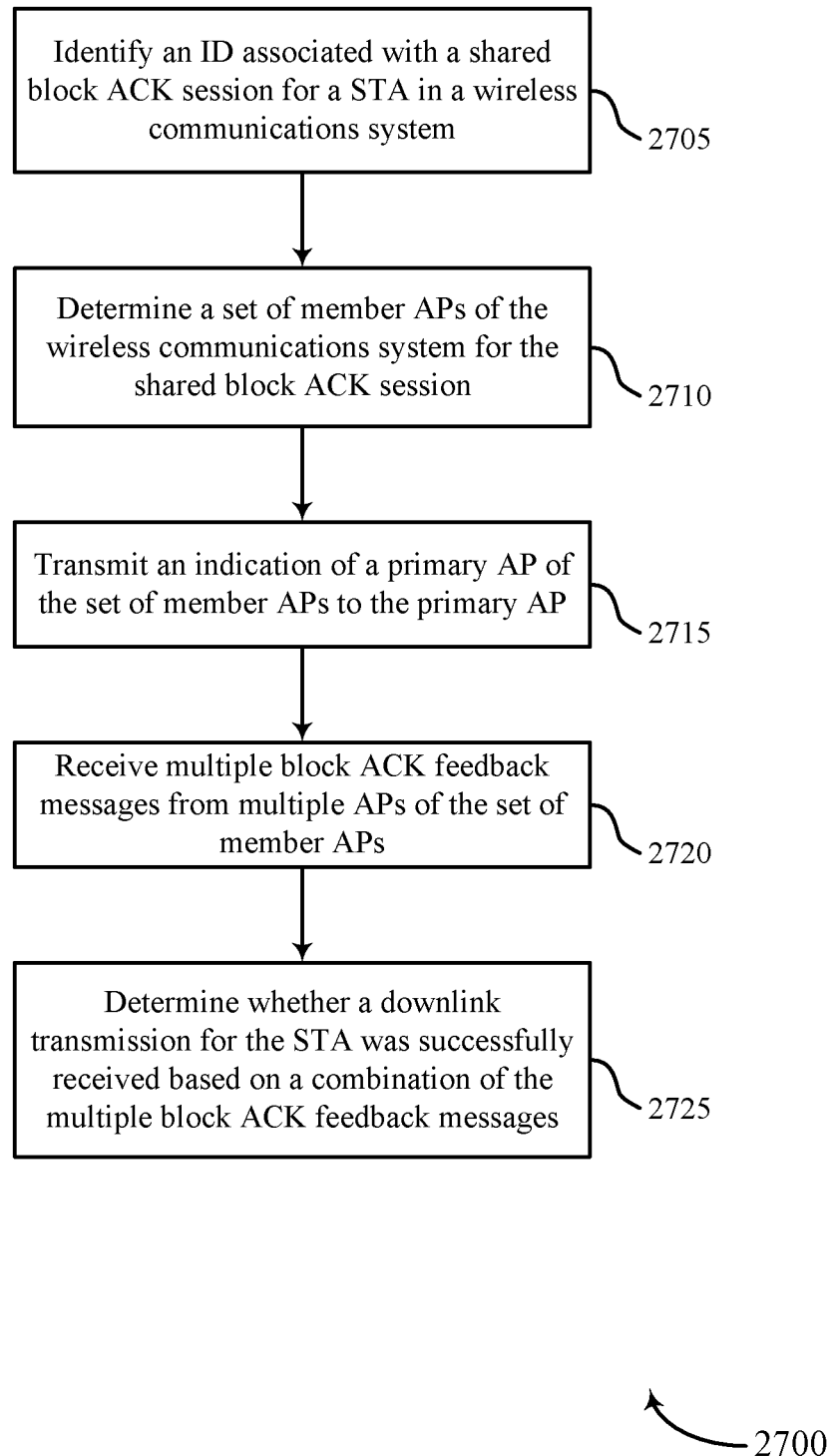

FIG. 27 shows a flowchart illustrating a method 2700 that supports enhanced reliability techniques for shared spectrum in accordance with aspects of the present disclosure. The operations of method 2700 may be implemented by a device or its components as described herein. For example, the operations of method 2700 may be performed by a block ACK session manager as described with reference to FIGS. 17 through 20. In some examples, a device may execute a set of instructions to control the functional elements of the device to perform the functions described herein. Additionally or alternatively, a device may perform aspects of the functions described herein using special-purpose hardware.

At 2705, the device may identify an ID (e.g., a group ID) associated with a shared block ACK session for a STA in a wireless communications system. The operations of 2705 may be performed according to the methods described herein. In some examples, aspects of the operations of 2705 may be performed by an ID component as described with reference to FIGS. 17 through 20.

At 2710, the device may determine a set of member APs of the wireless communications system for the shared block ACK session. The operations of 2710 may be performed according to the methods described herein. In some examples, aspects of the operations of 2710 may be performed by a member AP manager as described with reference to FIGS. 17 through 20.

At 2715, the device may transmit an indication of a primary AP of the set of member APs to the primary AP. The operations of 2715 may be performed according to the methods described herein. In some examples, aspects of the operations of 2715 may be performed by an indication transmitter as described with reference to FIGS. 17 through 20.

At 2720, the device may receive multiple block ACK feedback messages from multiple APs of the set of member APs. The operations of 2720 may be performed according to the methods described herein. In some examples, aspects of the operations of 2720 may be performed by a feedback receiver as described with reference to FIGS. 17 through 20.

At 2725, the device may determine whether a downlink transmission for the STA was successfully received based on a combination of the multiple block ACK feedback messages. The operations of 2725 may be performed according to the methods described herein. In some examples, aspects of the operations of 2725 may be performed by a determination component as described with reference to FIGS. 17 through 20.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single-carrier frequency-division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and wireless communications system 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A apparatus for wireless communications at a station (STA), comprising:
   a first interface;
   a second interface; and
   a wireless modem configured to:
   identify an identifier associated with a shared block acknowledgment (ACK) session for the STA, the identifier comprising a transmitter address (TA), receiver address (RA), or a transmission identifier (TID) for the shared block ACK session;

determine a set of member access points (APs) of a wireless communications system for the shared block ACK session;

associate, via a communication link between the STA and each of the set of member APs, with the set of member APs for participating in the shared block ACK session; and communicate with each AP of the set of member APs via the communication link in accordance with the shared block ACK session, the communicating comprising:

obtaining information over the first interface or outputting information over the second interface; and outputting or obtaining, in accordance with the shared block ACK session, a block ACK feedback message associated with a data packet for each AP in the set of member APs, wherein the block ACK feedback message indicates that at least one AP from the set of member APs successfully obtained the data packet.

2. The apparatus of claim 1, wherein each member AP of the set of member APs is not co-located with another member AP of the set of member APs.

3. The apparatus of claim 1, wherein the wireless modem is further configured to:

obtain, over the first interface from at least one AP of the set of member APs, a beacon comprising an information element that indicates the identifier and the set of member APs, wherein the information element comprises a neighbor report element that carries the identifier and the set of member APs, and wherein the neighbor report element is associated with each of the set of member APs.

4. The apparatus of claim 1, wherein the wireless modem is further configured to:

obtain, over the first interface from an AP of the set of member APs, an indication that the AP is a primary AP for the STA, wherein the indication that the AP is the primary AP is obtained via a public action frame (PAF); and obtain, over the first interface, a change message indicating that the primary AP for the STA has changed from the AP to a second AP.

5. The apparatus of claim 1, wherein the wireless modem is further configured to:

monitor resources for reception of a downlink transmission;

obtain, over the first interface from the AP, a set of protocol data units (PDUs) of the downlink transmission based at least in part on a sequence number associated with the AP;

determine whether to output the block ACK feedback message based at least in part on the monitoring; and output, over the second interface, the block ACK feedback message based at least in part on the set of PDUs.

6. The apparatus of claim 5, wherein the wireless modem is further configured to:

obtain, over the first interface from a second AP of the set of member APs, a second set of PDUs of the downlink transmission based at least in part on a sequence number associated with the second AP, wherein outputting the block ACK feedback message comprises outputting a combined block ACK feedback message based at least in part on the set of PDUs and the second set of PDUs.

7. The apparatus of claim 5, wherein the wireless modem is further configured to:

obtain, over the first interface from a second AP of the set of member APs, a second set of PDUs of the downlink transmission based at least in part on a sequence number associated with the second AP; and output, over the second interface to the second AP, a second block ACK feedback message based at least in part on the set of PDUs.

8. The apparatus of claim 5, wherein obtaining the set of PDUs of the downlink transmission comprises:

obtaining, via the first interface, multiple downlink packets from respective APs of the set of member APs, wherein the block ACK feedback message is outputted based at least in part on the multiple downlink packets;

decoding the multiple downlink packets from the respective APs; and dropping duplicate packets based at least in part on the decoding.

9. The apparatus of claim 5, wherein the wireless modem is further configured to:

obtain, over the first interface, a block ACK request (BAR) message or a block ACK trigger frame from at least one AP of the set of member APs, wherein the block ACK feedback message is outputted in response to the BAR message or the block ACK trigger frame.

10. The apparatus of claim 1, wherein the wireless modem is further configured to:

identify resources for transmission of an uplink data packet, wherein identifying the resources for transmission of the uplink data packet comprises obtaining, over the first interface, a scheduling message that allocates the resources for transmission of the uplink data packet to the STA; and output, over the second interface, the uplink data packet via the resources.

11. The apparatus of claim 1, wherein the wireless modem is further configured to:

output, over the second interface, an uplink data packet on a same channel to each member AP of the set of member APs;

obtain, over the first interface from a first member AP, the block ACK feedback message indicating that at least a portion of the uplink data packet has been successfully obtained;

determining that a complete uplink data packet has not been successfully obtained;

output, over the second interface, a block ACK request (BAR) message to at least a second member AP of the set of member APs; and obtain, over the first interface, a second block ACK feedback message from the second member AP based at least in part on the BAR message, wherein the second block ACK feedback message indicates that a second portion of the uplink data packet has been successfully obtained.

12. The apparatus of claim 11, wherein the wireless modem is further configured to:

determine that the complete uplink data packet has been successfully obtained based at least in part on the block ACK feedback message and the second block ACK feedback messages.

13. The apparatus of claim 11, wherein the wireless modem is further configured to:

output, over the second interface, an uplink trigger frame to each of the member APs; and obtain, over the first interface from each of the member APs, a respective block ACK feedback message in response to the uplink trigger frame, wherein each respective block ACK feedback message indicates whether a portion of the uplink data packet has been successfully obtained by a respective member AP.

14. The apparatus of claim 1, wherein the wireless modem is further configured to:
output, over the second interface, an uplink data packet on a same channel to each member AP of the set of member APs;
obtain, over the first interface, a set of block ACK feedback messages from the set of member APs; and
determine whether the uplink data packet has been successfully obtained based at least in part on a combination of the set of block ACK feedback messages.

15. The apparatus of claim 1, further comprising:
a receiver configured to receive information obtained over the first interface; and
a transmitter configured to transmit information outputted over the second interface, wherein the apparatus is configured as the STA.

16. An apparatus for wireless communications at an access point (AP), comprising:
a first interface;
a second interface; and
a wireless modem configured to:
identify an identifier associated with a shared block acknowledgment (ACK) session for one or more stations (STAs), the identifier comprising a transmitter address (TA), receiver address (RA), or transmission identifier (TID);
identify a set of member APs of a wireless communications system for the shared block ACK session;
output, over the first interface to a STA via a shared radio frequency spectrum band, the identifier and the set of member APs associated with the identifier;
obtain, over the second interface from a wireless controller of the wireless communications system in communication with the set of member APs, an indication that the AP is a primary AP for the STA; and
output or obtain, in accordance with the shared block ACK session, a block ACK feedback message associated with a data packet for each AP in the set of member APs, wherein the block ACK feedback message indicates that at least one AP from the set of member APs successfully obtained the data packet.

17. The apparatus of claim 16, wherein outputting the identifier and the set of member APs comprises:
outputting, over the first interface, a beacon comprising an information element that indicates the identifier and the set of member APs, and wherein outputting the beacon comprises broadcasting the beacon via a discovery reference signal (DRS), the information element comprising a neighbor report element that carries the identifier and the set of member APs, and wherein the neighbor report element is associated with each of the set of member APs.

18. The apparatus of claim 16,
wherein the wireless modem is further configured to:
obtain, over the second interface from the STA, a probe signal for discovery of one or more APs associated with the shared block ACK session;
output, over the first interface to the wireless controller of the wireless communications system in communication with the set of member APs, an indication of the probe signal;
obtain, over the second interface from the wireless controller, a response message indicating that the AP is a member of the set of member APs; and
output, over the first interface to the STA, an association response message in response to the probe signal based at least in part on the response message obtained from the wireless controller.

19. The apparatus of claim 16, wherein the wireless modem is further configured to:
output, over the first interface to the STA, the indication that the AP is the primary AP for the STA;
obtain, over the second interface from the wireless controller, a change message indicating that the primary AP has changed from the AP to a second AP; and
output, over the first interface to the STA, an indication that the second AP is the primary AP for the STA.

20. The apparatus of claim 16, wherein the wireless modem is further configured to:
configure the STA for an uplink shared block ACK session or a downlink shared block ACK session based at least in part on outputting the identifier and the set of member APs, wherein:
configuring the STA for the uplink shared block ACK session comprises associating the uplink shared block ACK session with multiple RAs corresponding to the set of member APs, a TA associated with the STA, and a TID associated with an uplink packet, and wherein each RA of the multiple RAs corresponds to a medium access control (MAC) address, a basic service set identifier (BSSID) of a member AP of the set of member APs, a group address associated with the set of member APs, a MAC address of the wireless controller of the wireless communications system in communication with the set of member APs, or a combination thereof; and
configuring the STA for the downlink shared block ACK session comprises associating the downlink shared block ACK session with an RA associated with the STA, multiple TAs corresponding to the set of member APs, and a TID associated with an downlink packet, and wherein each TA of the multiple TAs corresponds to a MAC address, a BSSID of a member AP of the set of member APs, a group address associated with the set of member APs, a MAC address of the wireless controller of the wireless communications system in communication with the set of member APs, or a combination thereof.

21. The apparatus of claim 16, wherein the wireless modem is further configured to:
configure the STA for an uplink shared block ACK session or a downlink shared block ACK session based at least in part on indicating the identifier and the set of member APs, wherein configuring the STA for the uplink shared block ACK session or the downlink shared block ACK session comprises:
associating the uplink shared block ACK session or the downlink shared block ACK session with a virtual basic service set identifier (BSSID) that corresponds to the set of member APs, wherein each AP of the set of member APs is associated with a respective BSSID, and the virtual BSSID is associated with a master AP of the set of member APs.

22. The apparatus of claim 16, wherein the wireless modem is further configured to:
obtain, over the second interface from the wireless controller of the wireless communications system in communication with the set of member APs, a set of protocol data units (PDUs) for transmission to the STA;
output, over the first interface, the set of PDUs to the STA based at least in part on a sequence number associated with the AP; and
monitor for the block ACK feedback message from the STA based at least in part on the outputting.

23. The apparatus of claim 22, wherein the wireless modem is further configured to:
modify a block ACK window position or duration based at least in part on the monitoring.

24. The apparatus of claim 16, wherein the wireless modem is further configured to:
schedule an uplink transmission for the STA via resources of the shared radio frequency spectrum band;
monitor the resources for the uplink transmission from the STA; and
determine whether to output the block ACK feedback message to the STA based at least in part on the monitoring; and
output, over the first interface, the block ACK feedback message based at least in part on obtaining the uplink transmission from the STA, wherein the block ACK feedback message indicates that at least a portion of the uplink transmission has been successfully obtained.

25. The apparatus of claim 16, wherein the wireless modem is further configured to:
schedule an uplink transmission for the STA via resources of the shared radio frequency spectrum band;
monitor the resources for the uplink transmission from the STA;
obtain, over the first interface from a second AP of the set of member APs, a set of protocol data units (PDUs) obtained by the second AP;
determine whether to output the block ACK feedback message to the STA based at least in part on the monitoring; and
output, over the second interface, the block ACK feedback message based at least in part on obtaining the set of PDUs from the second AP.

26. An apparatus for wireless communications, comprising:
a first interface;
a wireless modem configured to:
identify an identifier associated with a shared block acknowledgment (ACK) session for a station (STA) in a wireless communications system;
determine a set of member access points (APs) of the wireless communications system for the shared block ACK session;
output, over the first interface, an indication of a primary AP of the set of member APs to the primary AP and the STA based at least in part on a connection characteristic between the primary AP and the STA; and
output or obtain, in accordance with the shared block ACK session, a block ACK feedback message associated with a data packet for each AP in the set of member APs, wherein the block ACK feedback message indicates that at least one AP from the set of member APs successfully obtained the data packet.

27. The apparatus of claim 26, wherein the wireless modem is further configured to:
determine a change in channel conditions for the STA;
assign a second AP of the set of member APs as the primary AP for the STA; and
output, over the first interface, an indication of the change of the primary AP to at least one AP of the set of member APs or the STA.

28. The apparatus of claim 26, further comprising:
a second interface, wherein the wireless modem is further configured to:
obtain, over the second interface from the primary AP, the block ACK feedback message indicating that at least a portion of a downlink transmission to the STA was not successfully obtained; and
output, over the first interface to a secondary AP of the set of member APs, an indication to output the portion of the downlink transmission to the STA via a different channel.

29. The apparatus of claim 26, further comprising:
a second interface, wherein the wireless modem is further configured to:
obtain, over the second interface, multiple block ACK feedback messages from multiple APs of the set of member APs; and
determine whether a downlink transmission for the STA was successfully obtained based at least in part on a combination of the multiple block ACK feedback messages.

30. The apparatus of claim 26, wherein the wireless modem is further configured to:
determine a retransmission scheme for a downlink transmission to the STA; and
output, over the first interface, information indicating the retransmission scheme to each of the set of member APs, wherein the retransmission scheme indicates one of a simultaneous retransmission scheme for multiple APs of the set of member APs or a sequential retransmission scheme for multiple APs of the set of member APs.

* * * * *